US009721321B1

(12) United States Patent
Nayeri

(10) Patent No.: US 9,721,321 B1
(45) Date of Patent: Aug. 1, 2017

(54) AUTOMATED INTERACTIVE DYNAMIC AUDIO/VISUAL PERFORMANCE WITH INTEGRATED DATA ASSEMBLY SYSTEM AND METHODS

(71) Applicant: Farshad Nayeri, Carlisle, MA (US)

(72) Inventor: Farshad Nayeri, Carlisle, MA (US)

( * ) Notice: Subject to any disclaimer, the term of this patent is extended or adjusted under 35 U.S.C. 154(b) by 537 days.

(21) Appl. No.: 13/862,351

(22) Filed: Apr. 12, 2013

Related U.S. Application Data

(60) Provisional application No. 61/623,120, filed on Apr. 12, 2012, provisional application No. 61/623,544, filed on Apr. 12, 2012.

(51) Int. Cl.
*G06T 1/20* (2006.01)

(52) U.S. Cl.
CPC ...................... *G06T 1/20* (2013.01)

(58) Field of Classification Search
None
See application file for complete search history.

(56) References Cited

U.S. PATENT DOCUMENTS

| | | | | |
|---|---|---|---|---|
| 6,256,649 | B1* | 7/2001 | Mackinlay et al. | 715/212 |
| 6,707,454 | B1* | 3/2004 | Barg | G06F 17/246 345/440 |
| 6,750,864 | B1* | 6/2004 | Anwar | G06F 17/30489 345/440 |
| 2005/0060300 | A1* | 3/2005 | Stolte | G06F 17/30554 |
| 2006/0010147 | A1* | 1/2006 | Arras | G06F 17/30592 |
| 2006/0095276 | A1* | 5/2006 | Axelrod | G06Q 99/00 717/104 |
| 2008/0008458 | A1* | 1/2008 | Gudipaty et al. | 386/131 |
| 2008/0263010 | A1* | 10/2008 | Roychoudhuri et al. | 707/3 |
| 2009/0252475 | A1* | 10/2009 | Chiba et al. | 386/83 |
| 2009/0254836 | A1* | 10/2009 | Bajrach | 715/745 |
| 2011/0115799 | A1* | 5/2011 | Imbruce | 345/473 |
| 2011/0307477 | A1* | 12/2011 | Dasari | G06F 17/30489 707/723 |
| 2012/0128322 | A1* | 5/2012 | Shaffer et al. | 386/241 |
| 2012/0240064 | A1* | 9/2012 | Ramsay | G06T 11/00 715/762 |
| 2013/0086031 | A1* | 4/2013 | Marantz et al. | 707/706 |
| 2013/0086459 | A1* | 4/2013 | Folting | G06F 17/246 715/212 |
| 2013/0091412 | A1* | 4/2013 | van den Broek | G06F 17/30572 715/227 |
| 2013/0103677 | A1* | 4/2013 | Chakra et al. | 707/723 |
| 2013/0159901 | A1* | 6/2013 | Wolge | G06F 17/30572 715/765 |
| 2014/0047385 | A1* | 2/2014 | Ruble | G06T 15/10 715/810 |
| 2016/0092408 | A1* | 3/2016 | Lagerblad | G06F 3/04842 715/243 |

* cited by examiner

*Primary Examiner* — Michael J Cobb
(74) *Attorney, Agent, or Firm* — Andrew F. Bodendorf

(57) ABSTRACT

The computer applications, user devices, methods, and/or systems described herein provide a user with automated tools to facilitate creating dynamic, interactive performances of visualizations that utilize datasets of various digital/web content provided from various data sources and types without loss of access to underlying data used to create the performance.

24 Claims, 60 Drawing Sheets

FIG. 43

AUTOMATED INTERACTIVE DYNAMIC AUDIO/VISUAL PERFORMANCE WITH INTEGRATED DATA ASSEMBLY SYSTEM AND METHODS

CROSS-REFERENCE TO RELATED APPLICATIONS

This application claims the benefit under 35 U.S.C. §119 (e) of U.S. Provisional Applications No. 61/623,120, titled "AUTOMATED INTERACTIVE DYNAMIC AUDIO/VISUAL PERFORMANCE WITH INTEGRATED DATA ASSEMBLY SYSTEM AND METHODS" filed on Apr. 12, 2012 in the U.S. Patent and Trademark Office and U.S. Provisional Application No. 61/623,544, titled "AUTOMATED INTERACTIVE DYNAMIC AUDIO/VISUAL PERFORMANCE WITH INTEGRATED DATA ASSEMBLY SYSTEM AND METHODS" filed on Apr. 12, 2012 in the U.S. Patent and Trademark Office, all of which are herein incorporated by reference in their entirety for all purposes.

TECHNICAL FIELD

The application generally relates to a computer tool, a method, and a system and in particular, with specialized computer tools, applications, methods, and system for automated interactive audio/visual performance assembly with integrated data.

BACKGROUND

Visual storytelling at large, whether in a personal or business context, has been stagnated for many years now. The prominent technological tool that most people use to give presentations or visual stories is the same one they used twenty years ago: POWERPOINT™ or other equivalent "slide deck" software. While this technology was an improvement over the overhead slide and projectors of the past, this approach has been the subject of much criticism because of its low density of information, use of unpleasing fonts and clip arts, and the propensity of its users to deploy "chart junk." Data in such presentations is static and is typically not linked to the source. To reflect any change in the underlying source, one generally must repeat the entire workflow required to generate the presentation (usually using manual steps). This process is slow and error-prone. In addition, this process discourages people from using more data or even updating the data they have already used.

In recent years, video sharing web sites, such as YOUTUBE™ and VIMEO™ have added to the entertainment value of visual communication; however, these technological shifts have not increased the information density in any significant way. In addition, video's insatiable need for bandwidth, the prevalent use of lossy video compression codecs, and the lack of pixel-perfect transfer turn out to be serious obstacles for use of video for visual communication of quantitative data.

At the same time, the amount of data and content available is exploding exponentially. Problem solving today requires harnessing the information gems hidden within large amounts of data. To keep up with this growth, expert technicians use advanced analytic techniques (to collect data and compute patterns) and sophisticated visualization techniques (to see the patterns and show them to others). A large collection of analytic software has been introduced to address this need; however, these tools are generally unavailable, incomprehensible, or cost prohibitive for most users since their use requires deep knowledge of logic, statistics, and mathematics beyond the capabilities of a broad spectrum of users in addition to be cost prohibitive.

In addition, once the data is analyzed, the data needs to be processed by professional "info-graphics" technicians using advanced video and sound production processes to create a compelling visual presentation. For example, to produce a professional-grade data-rich movie, one has to combine the skills of analysts, statisticians, computer scientists, graphic artists, and movie production crew. At the high end, data-rich documentaries, such as "An Inconvenient Truth" cost as much as $1M or more to produce. Even small programs, such as Hans Rosling's "Joy of Stats" cost thousands of dollars to produce. Not only are these visual presentations expensive to make, but the essence of the original story gets lost as it is stretched through the different processes, skill sets, and people.

SUMMARY

In one general aspect, the computer applications, user devices, methods, and/or systems described herein provide a user with automated tools to facilitate creating dynamic, interactive performances of visualizations that utilize datasets of various digital/web content provided from various data sources and types without loss of access to underlying data used to create the performance. As a result, performances may be easily modified, updated, and manipulated (even during a performance) encouraging the use of robust datasets that are accurate and easy to maintain to keep up-to-date. In addition, data sets used to create the visualization presented during the performances may be easily shared to facilitate creation of additional performances by others while rewarding the creators of the data sets. Furthermore, professional performances may be easily, quickly, inexpensively created, modified, shared, and manipulated (even during a performance) without specialized knowledge or other analytical or special productions skills.

Various functions enable the production of professional-quality, data-rich, audio/visual performances at a fraction of cost of alternatives. In addition, these innovations may be implemented on many types of processing devices, including, for example, integrated portable device, such as a notebook, a tablet, or smart phone, working on-line or off-line, without requiring skills of analysts, statisticians, programmers, professional sound technicians and videographers. Together, these innovations create an "ecosystem" of audio/visual performances created by a community of users. In addition, server computing may be used to augment the power of the individual processing devices for assembling and presenting any particular performance.

Each performance includes the underlying data, complete with references to the original source. The underlying data may be imported from many sources; however, creation of performances does not destroy or otherwise impede access to the data. As a result, each performance may be reshaped to show different perspectives by changing visualizations or configurations of visualizations using the same data (even on the fly during a performance). This is particularly helpful when different visualizations may appeal to or be better understood by different audiences. Users also may build on other user's performances by importing a dataset of one performance and creating their own performances. In one example, users may pay for such use, which results in compensation of the original data owner. The system also provides for assembly of images, sounds, video, and multimedia as part of a performance, as independent content or tied to the performance timeline.

A performance or story may have one or more scenes, which comprise of one or more visualizations played over time. Each scene can be "played" or presented via a user interface provided by the Perspective application operating on a data set. Data may be loaded from any provider. Data can be static (on same system), static (remote), and dynamic (from data provider) or dynamic (from another program on the same system). For each type of data multiple users may enter data shown in one screen, multiple visualizations may be provided on the same screen, and multiple visualizations may be synced on multiple device screens. Stories may be encrypted, thus stories may contain proprietary and/or rights-managed information. Stories may be Public (visible to anyone), Private (visible to myself) or Protected (visible to designated set of people.) Stories also may have references to other stories (pixxa:// URLs). Hypertext references to scenes in stories are marked directly to a scene and can adjust for the insertion and the deletion of scenes. There may be one or more story servers, for example, corporations may have their own story servers. All scenes, all stories, and everything may be addressable in the system has a URL. A live session may take place alongside of live audio, where live audio is carried using other means independent of the Application.

In one general aspect a method, a system, software automating a performance from a raw dataset having related data elements are provided. The raw dataset is received and digested. The raw dataset is digested without assuming any data schemas to create a native data set. The native data set is visually interpreted to provide a visualization of the data for a scene in the performance.

A visualization engine may digest the raw dataset without assuming any data schemas to create the native data set; and to interpret the stored native data set according to a scene to provide one or more visualizations of the related data as a visual performance.

Multiple dimensions of the native data may be mapped to a visual aspect of the performance via at least one visualization.

The native dataset may have multiple dimensions one or more of the multiple dimensions may be determined as pivot points to automatically animate the visualizations presentation according to the scene.

The pivot point may be varied to change elements of the visualization to reflect the data that mapped to the elements without changing the data of the dataset.

A scene comprises may comprise multiple visualizations presented simultaneously and a timeline including a sequence of beats. The timeline for the scene maps to the pivot points of the visualizations of the scene.

A user interface may be configured to interact with and manipulate the scene of the performance. The user interface also may be configured to add multiple scenes for the native dataset to a performance to create a story.

User interaction with a performance of a scene may be recorded and stored for replay with the scene during a future performance.

The user interface is may be configured to publish the story to a server by providing the native dataset and the scene specified to interpret the native dataset to create a corresponding visualization and to share the story by transmitting a link to the publication.

The user interface also may be configured to publish the story to a server by providing native dataset, the scene specified to interpret the native dataset to create a corresponding visualization, and the recorded user interaction with the scene, and to share the story by transmitting a link to the publication.

The details of various embodiments are set forth in the accompanying drawings and the description below. Other features and advantages will be apparent from the following description, the drawings, and the claims.

DESCRIPTION OF THE DRAWINGS

FIG. 43 shows an example of that World Coffee Consumption is a spreadsheet.

FIG. 48 shows an example of how a user may further configure the chart, setting the chart in ascending order and turning labels on.

DETAILED DESCRIPTION

Overview

Figure 1:
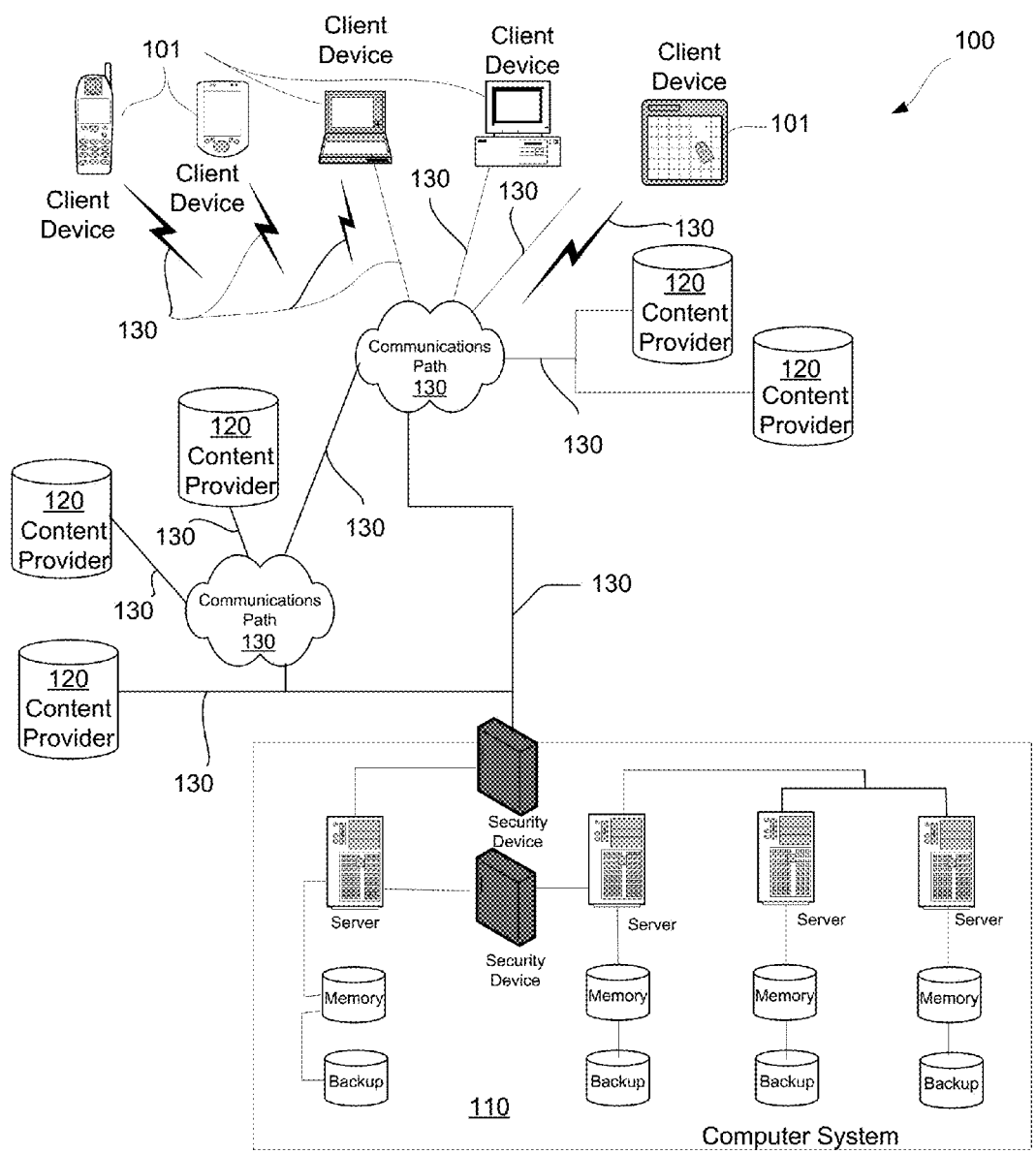
FIG. 1 is an example of a block diagram showing a system for use with the Perspective application and feature.

The computer applications, user devices, methods, and/or systems described herein provide a user with automated tools to facilitate creating dynamic, interactive performances of visualizations that utilize datasets of various digital/web content provided from various data sources and types without loss of access to underlying data used to create the performance. As a result, performances may be easily modified, updated, and manipulated (even during a performance) encouraging the use of robust datasets that are accurate and easy to maintain to keep up-to-date. In addition, data sets used to create the visualization presented during the performances may be easily shared to facilitate creation of additional performances by others while rewarding the creators of the data sets. Furthermore, professional performances may be easily, quickly, inexpensively created, modified, shared, and manipulated (even during a performance) without specialized knowledge or other analytical or special productions skills.

Generally, as described herein a "dataset" comprises of one or more data points that are linked or have a relationship to each other, such as, for example, part of an Excel spreadsheet, a database table, or an XML, JSON, Text, or HTML file, to name by a few. However, almost any data can be considered to be a structured dataset depending on how the data is interpreted. For example, a bullet list of three text items can be considered a "list" structure (or structured dataset) with the text elements.

Each dataset has an external representation or raw format (e.g., in Excel file format) referred to as "Raw Data." Raw data may be a standard format or a proprietary format. A dataset also has a native representation within the system, methods, and applications describe herein.

A dataset typically has multiple dimensions, for example, a "Country" dataset may have dimensions named Capitals, Population, GDP, Continent, and Flag.

A "content provider" is an entity that creates, maintains, and/or provides a dataset. The content provider may own or be responsible for the data that forms the dataset. For example, YAHOO FINANCE™ may be responsible for providing a "stock" dataset. The content provider typically maintains the dataset in an external format; however, in some cases a content provider may provide a native representation as well (e.g., a provider may create an internal representation of "stock" in a format more convenient for interpretation by the App) Internal representations do not have to be digested, as explained in further detail below.

A "visualization" is a depiction of a dataset using some method and/or device to present a dataset to a user or an audience, for example, a user interface of the Perspective application on a display screen of a user device. A visualization maps multiple dimensions of data to some visual aspect on the screen, for example, the X dimension, the Y dimension, a color, and/or size of objects. Visualizations may be quantitative (e.g., bar chart) or abstract (Venn diagram).

A "motion visualization" is a visualization that designates one or more of the dimensions as a "pivot" point or points. A pivot dimension is used by the application to animate visualizations. When the pivot dimension is varied, the elements of the visualization change to reflect the data that was mapped to that element; however, the data does not change.

A "scene" comprises multiple visualizations presented simultaneously. A scene includes a timeline. A "timeline" is a sequence of "beats." The timeline for the scene is mapped to the pivot dimension of the visualizations of the scene. The pivot dimension is controlled by the scene, directly or indirectly in response to a user action (e.g., hitting the play button or dragging a lever). A beat is the mark for an instance of time as depicted by a scene.

A "performance" (also referred to herein as a "Story") comprises of a set of scenes that may be presented to a user and/or audience. A user can easily switch between different scenes and watch each scene perform.

The Perspective application may refer to one or more software elements that are implemented by one or more processing devices to facilitate creation of native datasets, performances, in addition to presenting and sharing the performances with others, and is described in greater detail below System Architecture FIG. 1 shows a block diagram of one example of computer system network architecture 100 that may be used to implement the methods and the Perspective applications described herein. The network 100 includes one or more computer or client devices 101, one or more content/data provider systems 120, in addition to other computer systems 110, such as service provider systems, servers and server systems, Internet Service Providers, and websites, connected by various communication paths 130.

A computer device or client device 101, referred to herein and throughout as a user device, may be any type of electronic device that creates, manipulates, presents, or otherwise facilitates the use of performances. Typically, a user device 101 includes one or more processing devices, as described below. Examples of various user devices include a consumer electronics device, a mobile phone, a smart phone, a personal data assistant, a digital tablet/pad computer, a hand held/mobile computer, a personal computer, a note/ultrabook computer, a work station, a vehicle computer, a game system, a set-top-box, or any other device that can present digital content.

Figure 2:
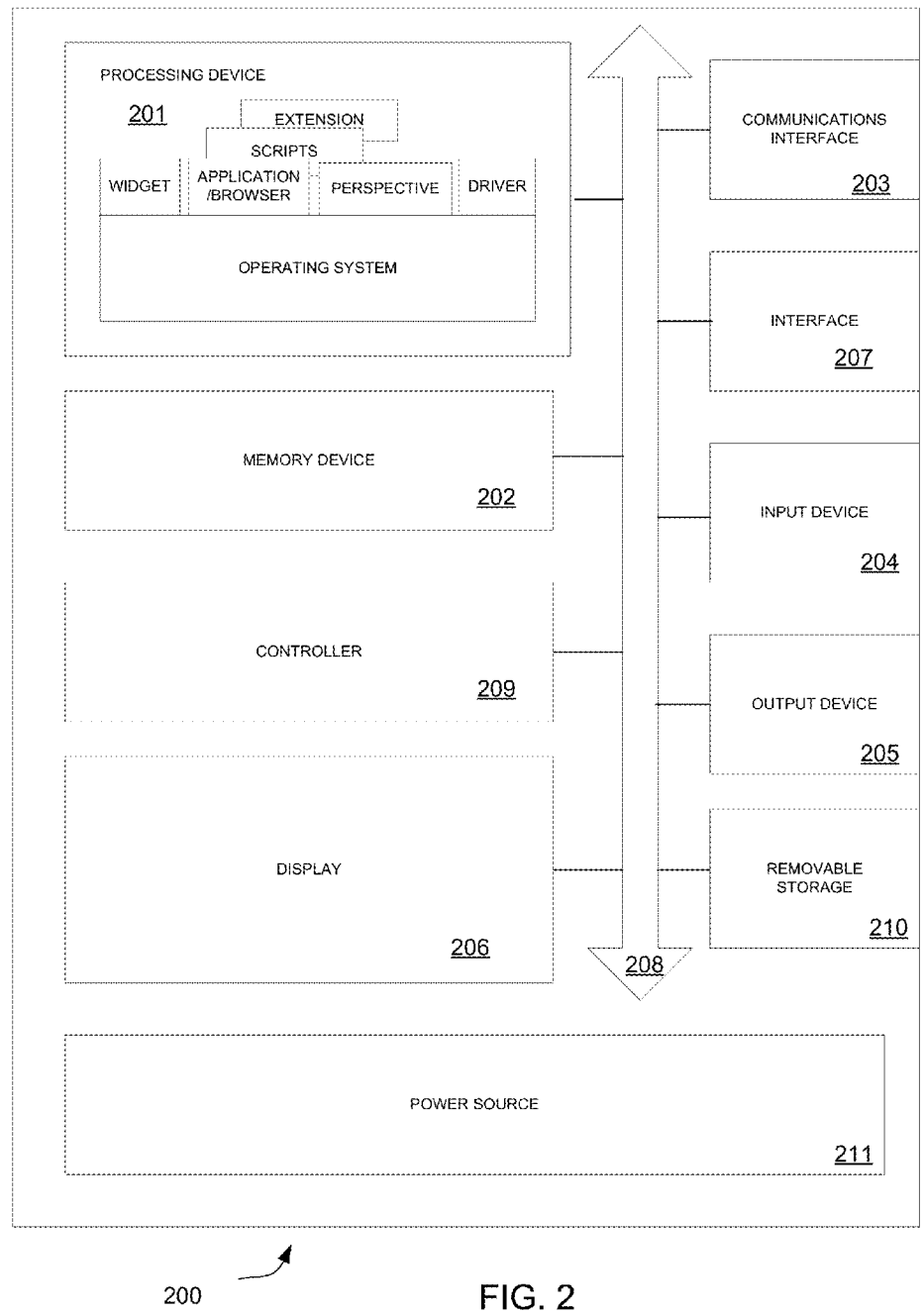
FIG. 2 is an example of a flow block diagram showing user device for implementing a Perspective application.

One example of a user device is shown in FIG. 2; however, it will be appreciated that this device is only exemplary and that any number of, types of, or configurations of different components and software may be incorporated into or omitted from a particular user device. For example, the user device may include a number of components including one or more of the following: one or more processing devices 201, one or more storage devices 202, and one or more communications interfaces 203. A user device also may include additional elements, such as one or more input devices 204 (e.g., a display, a keyboard, a key pad, a mouse, a pointer device, a trackball, a joystick, a touch screen, microphone, etc.), one or more output devices 205 (e.g., speakers), a display 206, one or more interfaces 207, communications buses 208, controllers 209, removable storage devices 210, and at least one power source 211. Additional elements not shown may include components of a digital camera, an optical reader (e.g., a bar code scanner or an infrared scanner), an RFID reader, a projector, and antennas/transmitters and/or transceiver. A user device also may include one or more associated peripheral devices (not shown), such as, for example, a display, a memory, a printer, an input device, an output device, and speakers. As is appreciated by those skilled in the art, any of these components (other than at least one processing device) may be included or omitted to create different configurations or types of user devices, for example, to perform specific or specialized needs or tasks, generalized needs or multiuse tasks, or for various performance criteria, such as, mobility, speed, cost, efficiency, power consumption, ease of use, among others.

The processing device 201 may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS including applications, such as a Perspective application, that communicate with content provider systems, present content received from the content provider systems to the user, and facilitate creation of native datasets, performances, in addition to presenting and sharing the performances and datasets with others. The processing device also may access, store, manipulate, process, and create data (including datasets) in response to execution of the applications.

For purpose of simplicity, the description herein generally refers to a processing device in the singular form; however, one skilled in the art will appreciated that a processing device may include multiple processing elements or devices and multiple types of processing elements or devices. For example, a processing device may include multiple processors or a processor and a controller. In addition, different processing configurations are possible, such as serial processers, parallel processors, specific processing configurations, such as a quad processor, and dedicated processors, such as a main processor, a display processor, or caching processor, among others. As used herein, a processing device configured to implement a function A includes a processor programmed to run specific software providing function A. In addition, a processing device configured to implement a function A, a function B, and a function C may include configurations, such as, for example: a processor configured to implement functions A, B, and C; a first processor configured to implement function A, and a second processor configured to implement functions B and C; a first processor to implement function A, a second processor configured to implement function B, and a third processor configured to implement function C; a first processor configured to implement functions A and B, and a second processor configured to implement function C; a first processor configured to implement functions A, B, C, and a second processor configured to implement functions A, B, and C, and so on.

The software applications may include a computer program, a piece of code, an instruction, or some combination thereof, for independently or collectively instructing or configuring the processing device to operate in a desired way. Examples of software applications include: an operating system, drivers to control and/or operate various components of the user device (e.g., display, communications interface, input/output devices, etc.). In addition a user interface application may be provided, such as a browser, a mini browser, a mobile device browser, a widget, or other programs that interact with the content provider systems to provide or present content and a user interface or conduit for presenting the content, among other features including browser based tools, plug-in, and extension applications, such as JAVA, ACROBAT READER, QUICKTIME, or WINDOWS MEDIA PLAYER, and a FLASH PLAYER (e.g., ADOBE or MACROMEDIA FLASH). In addition, a Perspective application or applications are provided to facilitate creation of native datasets, performances, in addition to presenting and sharing the performances with others. The applications may be resident in the processing device, loaded from a storage device, or accessed from a remote location or a storage device, as described in greater detail below. Once the applications, such as a browser or a performance assembly and presentation application are loaded (i.e., a Perspective application) in or executed by the processing device, the processing device becomes a specific machine or apparatus configured to perform a function, such as to provide a user interface to access content/data and to assemble, manipulate, and present performances, among other things. That is to say, a user device with a processing device programmed in a certain way is physically different machine than that of a user device without that program as its memory elements are differently arranged and/or configured.

The software, applications, content, and data may be embodied permanently or temporarily in any type of machine, component, physical or virtual equipment, computer storage medium or device, or in a propagated signal wave capable of providing instructions or data to or being interpreted by the processing device. In particular, the software, applications, content, or data may be stored by one or more computer storage devices 202, 210 including volatile and non-volatile memories that store digital data (e.g., a read only memory (ROM), a random access memory (RAM), a flash memory, a solid state memory or drive (SSD), a floppy disk, a hard disk, a compact disk, a tape, a DROM, a flip-flop, a register, a buffer, an SRAM, DRAM, PROM, EPROM, OPTROM, EEPROM, NOVRAM, or RAMBUS), such that if the storage device is read or accessed by the processing device, the specified steps, processes, and/or instructions are performed and/or data is accessed, processed, and/or stored. The computer storage device may include an I/O interface, such that data and applications may be loaded and stored in or accessed or read from the computer storage device allowing the applications, programming, and data to be used, updated, deleted, changed, augmented, or otherwise manipulated. The computer storage device may be removable, such as, for example, a disk drive, a card, a stick, or a disk that is inserted in or removed from the user device.

The communications interface 203 may be used to exchange data and content with the computer network using various communications paths 130. The communications interface may be implemented as part of the processing device or separately to allow the processing device to communicate or send and receive data using the communications paths. The communications interface may include two or more types of interfaces, including interfaces for different types of hardware and/or software to interact with different types of communications media and protocols and to translate information/data into a format that may be used by the processing device. Similarly, the interface may translate information/data received from the processing device to a format that may be transmitted to the service or content/data provider systems via a communications path.

The communications paths 130 may be configured to send and receive signals (e.g., electrical, acoustic, electromagnetic, or optical) that convey or carry data representing various types of analog and/or digital data including programming, software, media, and content, among others, for presentation to a user. For example, the communications paths may be implemented using various communications media and one or more networks comprising one or more network devices (e.g., network interface cards, fiber media converter, servers, routers, switches, hubs, bridges, repeaters, blades, processors, and storage devices). The one or more networks may include a local area network (LAN), a wide area network (WAN), an Ethernet, a global area network (GAN), a cloud network, a plain old telephone service (POTS) network, a digital subscriber line (DSL) network, an integrated services digital network (ISDN), a synchronous optical network (SONNET)/SDH, Passive and Active Optical Networks (PON or AON), a packet switched network, V.92 telephone network modems, IRDA, USB, FIREWIRE, EIA RS-232, EIA-422, EIA-423, RS-449, RS-485, ITU, T1 and other T-carrier links, and E1 and other E-carrier links, varieties of 802.11, GSM Um radio interface, BLUETOOTH, IEEE 802.11x Wi-Fi, TRANSFERJET, ETHERLOOP, ARINC 818 AVIONICS Digital Video Bus, G.hn/G.9960, or a combination of two or more of these networks to name a few.

In addition, the communications paths may include one or more wireless links (e.g., microwave, radio, and satellite) that transmit and receive electromagnetic signals, such as, for example, radio frequency, infrared, and microwave signals, to convey information/data signal using any one of a number of communications protocols, for example, communications links may include IMT-2000, such as 2G (GSM, GPRS, EDGE, EDGE Evolution, CSD, HSCSD), 2.5G, 2.75G, 3G (W-CDMA, HSPDA, HSUPA, UMTS-TDD, FOMA), 4G LTE, and IEEE 802.11 standards, such as Wi-Fi or WLAN. In one example, a communications path may include the Internet or World Wide Web or components found therein.

Data and content may be exchanged between the content provider system and the user device through the communication interface and communication paths using any one of a number of communications protocols. In particular, data may be exchanged using a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose, the Internet Protocol defines addressing methods and structures for datagram encapsulation. Of course, other protocols also may be used. Examples of an Internet protocol include Internet Protocol Version 4 (IPv4) and Internet Protocol Version 6 (IPv6).

The content provider system 120 facilitates access to, organization of, and presentation of content, including raw datasets to users in addition to providing many services. Examples of services provided by content provider systems include storefronts, news sources, blogs, entrainment media, social media and networks, companies, and other institutional entities such as governments, churches, universities, among many others. The content provider system may store and manage content, such as web pages, websites, and other digital content such as datasets, in a location that is centralized and/or remote from the perspective of the user. The central location may be one physical location, such as a room, building, or campus providing the hardware components of the system. However, in reality the central location may be virtual or distributed where services are provided, content are accessed from, and data is stored over a number of distributed systems and/or locations. In other words, although the content provider systems are shown in FIG. 1 as being a single entity, other configurations wherein the applications, processing, services, content, and data are distributed both in terms of devices and geographical location are within the meaning of the content provider system. Additionally, the content provider system may use third parties to host the web page or website and may initiate services as needed on demand, for example, using cloud computing wherein the locations and structure providing the services changes size, and physical location, distribution, and even equipment dynamically over time.

The content provider system may include one or more communications devices, processing devices, memories/storage devices, communications interfaces, network devices, and communications paths (as described in detail above for computer devices 101) to store, process, manipulate, organize, consolidate, maintain, and present communications, content, and data for a user. Descriptions of communications devices, processing devices, storage devices, software, communications interfaces, network devices, and communications paths are all described above and are incorporated herein by reference and are not repeated in the interest of brevity.

The Perspective application may be configured to work in conjunction with a computer system 110 (e.g., Pixxa.com). The computer system provides a mechanism to digest datasets, share stories, update datasets, purchase datasets and stories, provide the functionality partially online (i.e., for access or display using browser) create stories, among other things, as describe herein. The computer provides a server to the user device's client.

In one example, the computer system 110 is a service provider system that may include a one or more security devices (e.g., firewalls), web servers, application servers, an SQL server, MySQL server and database system and mirror servers, and associated memory and backup memory devices. The web server may provide initial communication with client devices and provide services, such as a web page and/or portal configured to provide access to the services provided by the service provider system. Application server may be configured to provide a performance assembly and presentation application in addition to services such as collaborative performance creation, performance sharing and distribution, data sharing, dataset creations and updating, as explained in greater detail below. Additional servers may provide database management services and analytic services, and may store descriptive metadata and analytical information used in performance creation and sharing. It is understood, however, that the example given in FIG. 1 is for illustrative purposes only, and that many different configurations, combinations of devices, and numbers of devices may be provided for any particular service provider system. However, one or more processing devices, such as the servers, are provided to provide the services and functionality described herein for the service provider system. For example, cloud architecture also may be used to implement a service provider system, as described below. In addition, it will be appreciated that in actual implementation, other configurations of servers or combining of servers may be provided or banks of a number of these machines as necessary may be provided to handle the number of users, data, and traffic that a particular implementation of a service provider system handles.

Although, one configuration is shown in FIG. 1, others may be used. For example, other types of hardware may be used, such as various types of computers (e.g., a PC or a MACINTOSH) featuring any of various processors (e.g., an INTEL CORE, PENTIUM, CELERON Server or Workstation processors) running any of several operating systems (e.g., WINDOWS, MAC OS X, UNIX, or LINUX). In addition, languages such as hypertext markup language (HTML), eXtensible Markup Language (XML), Active Server Pages (ASP), Ajax, Cascading Style Sheet (CSS), and various other protocols may be used.

In addition, service provider system may be configured to provide a location that is centralized and/or remote from the perspective of the user. The central location may be one physical location, such as a room, building, or campus providing the hardware components of the system. However, in reality the central location may be virtual or distributed where services are provided, content are accessed from, and data is stored over a number of distributed systems and/or geographic locations. In other words, although the content provider systems are shown in FIG. 1 as being a single entity, other configurations wherein the applications, processing, services, content, and data are distributed both in terms of devices and geographical location are within the meaning of the service provider system. Additionally, the service provider system may use third parties to host the web page or website and may initiate services as needed on demand, for example, using cloud computing wherein the locations and structure providing the services change size, and physical location, distribution, and even equipment dynamically over time.

In another example, the service provider system may be hosted utilizing an accelerated cloud infrastructure. A cloud processing network includes a virtualizer network of accelerators for virtual servers. The virtualizer utilizes a Storage Domain Servers (SDS), network switchers, and a Storage Area Network (SAN) to provide a variety of server capacity and functionality that is emulated and provided as a load-balanced resource. The network is connected to various servers and their corresponding data storage and databases of one or more content providers allowing easy access to many different servers having multiple operating systems (e.g., LINUX, WINDOWS, MAC OS, and BACKUP). As a result, a variety of server operating systems and capacity may be provided to the end user of the user devices. The cloud processing network may be part of the service provider system or hosted by a third party.

Perspective Application(s) & Functionality

As explained above, a performance or story may have one or more scenes, which comprise of one or more visualizations played over time. Each scene can be "played" or presented via a user interface provided by the Perspective application operating on a dataset. Data may be loaded from any provider (e.g., user devices 101, the computer system 110, or content providers 120). Data can be static (on the same system), static (on a remote system), or dynamic (from data provider). For each type of data multiple users may enter data shown in one screen, multiple visualizations may be provided on the same screen, and multiple visualizations may be synced on multiple device screens. FIGS. 3-10 illustrate varies features and elements of the Perspective application and its underlying operations that provide these features.

Figure 3A:
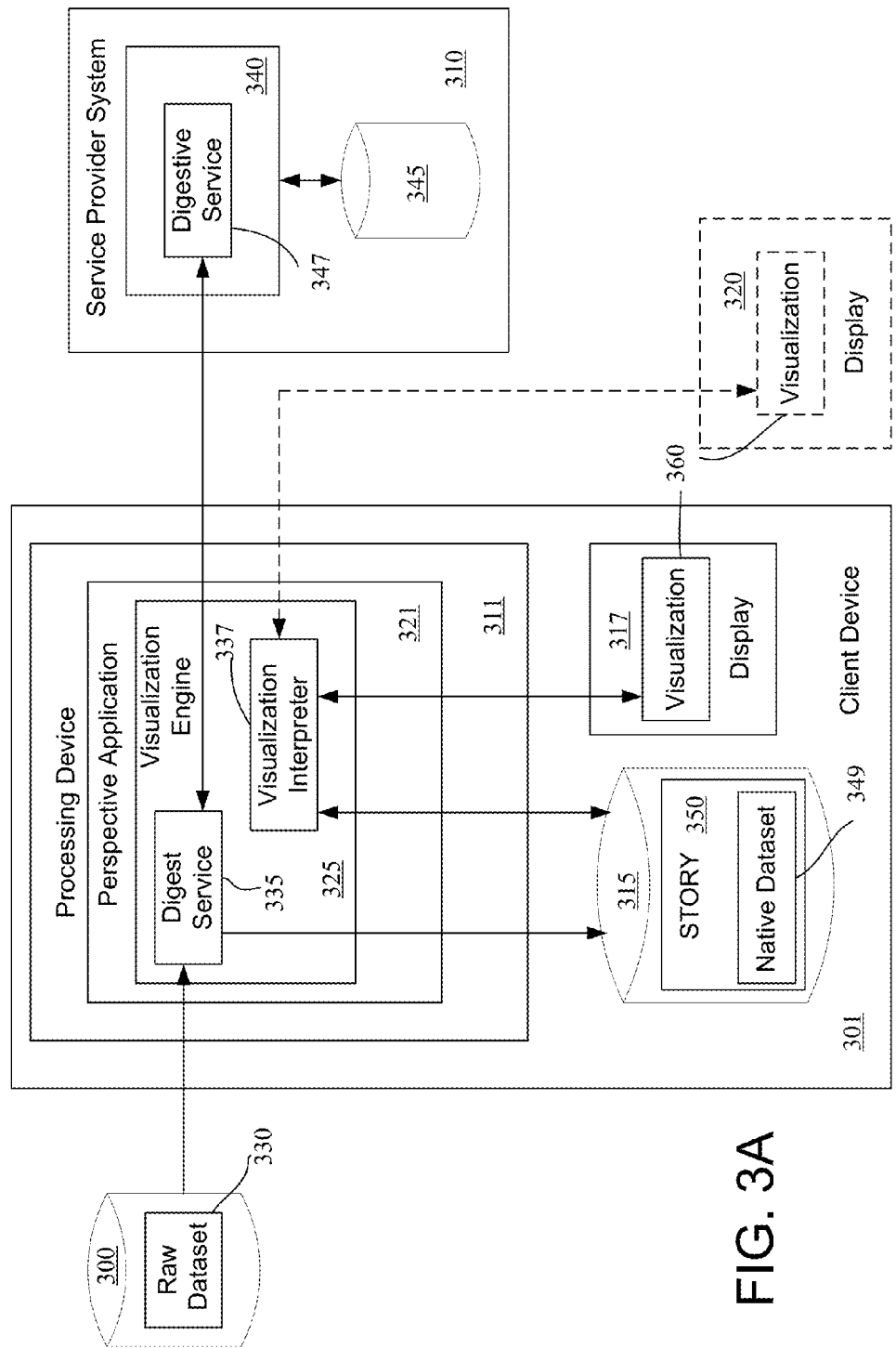
FIG. 3A is an example of a flow block diagram showing a visualization system and FIG. 3B is an example of a data structure for a story.

FIG. 3A illustrates one example of a visualization assistant system. The system includes data source 300, a client device 301, and a server 310. The client device 301 includes a processing device 311, storage device 315, and optionally a display device 317. Of course, one will appreciate that an external display 320 may be used. In one example, the client device is a tablet computer, such as, for example, and IPAD™ in which the display device is a touch screen and may be used for user input and interface with visualization. Obviously, if a touch screen is not used, the client device includes some other form of user input device (not shown).

Currently with the explosion of content being created and made accessible by the Internet, there are many types of data available. The visualization assistant system provides a mechanism to painlessly turn data into a visualization. The assistant answers given a dataset, what is the best manner to visualize the dataset. Given any dataset, it can be problematic for people to visualize the data. The visualization assistant system also provides a flexible way to analyze data to determine axes, min/max settings, tabular organization (e.g., matrix vs. row-wise), and what visualization types best fit the data. In one aspect, the visualization assistant system processes incoming data results into a plurality of metadata that is used by the client device to display the plurality of visualizations (e.g., as scenes). The data or datasets may be in the form of text, tables, CSV, Excel, HTML, RSS, XML, JSON, Text, or any other type of structured data.

The assistance can be implemented on the client device or on a server (e.g., for larger data types or ones requiring other services that may not be provided by the digest service of the client device.) For example, given a column of text dataset in an Excel spreadsheet, the digest service running on the client device may determine the dataset is "list of text." However, sending the same dataset (or a sample thereof) to the server, allows the server to provide a more robust digestions of the dataset to determine that the dataset is a "list of city names," and because of this the server can recommend a type of visualization, such as a map mash up. Of course, one will appreciate that the assistance may be implemented according to the processing power, power consumption, and storage capacity of the client device. For example, smaller client devices, such as smart phones may include a less robust assistance and use the server digest service to complement the client's service when a data connection is available. In one example, the assistance is provided by a digest service.

As shown in FIG. 3, the processing device 301 executes the Perspective Application 321. The Application 321 includes a visualization engine 325 configured to process raw datasets 330 to aid a user to create and perform stories based on a given raw dataset 330. The visualization engine 325 includes a digest service 335 and a visualization interpreter 337. In addition, a service provider system 310 may include a server 340 and storage 345 and also provide a digest service 347. The Perspective Application 321 executed by the client device 301 accesses a raw dataset 330 from a content provider 300.

The digest service on the client or the server does not assume any data schemas of the raw dataset. The digest service 335, 347 uses statistics techniques and heuristics to process the data into a format that may be used by the visualization interpreter (i.e., transforming raw data sets into native data set 349). The processed data 349 may be stored in the client storage 325 as a story 350, which is accessed by the visualization interpreter 327. The digest service processes the data and determines, for example, what type of chart to use, what dimension is used for axes of the chart, what are the min and max settings, what is the most compelling way to present the data using a selected scene (e.g. a motion chart).

It is appreciated that users need access to data from multiple data sources; however, casual users may not know the specific type of data they need to use. A heuristics-based type system uses a statistical sample of data from a data source to create a metadata schema definition used by the Perspective application to create specific visualizations. The Perspective application is able to determine the data type without requiring up-front user engagement, thus simplifying the user interface for most users. Users also can modify the choices made by the heuristic algorithm once the visualization is completed.

The visualization interpreter 337 provides an interface that allows a user to access the native dataset 350, create, and play stories created from the dataset. In particular, the visualization interpreter allows the user to create, interact with, and perform visualizations 360 that make up stories.

Figure 3B:
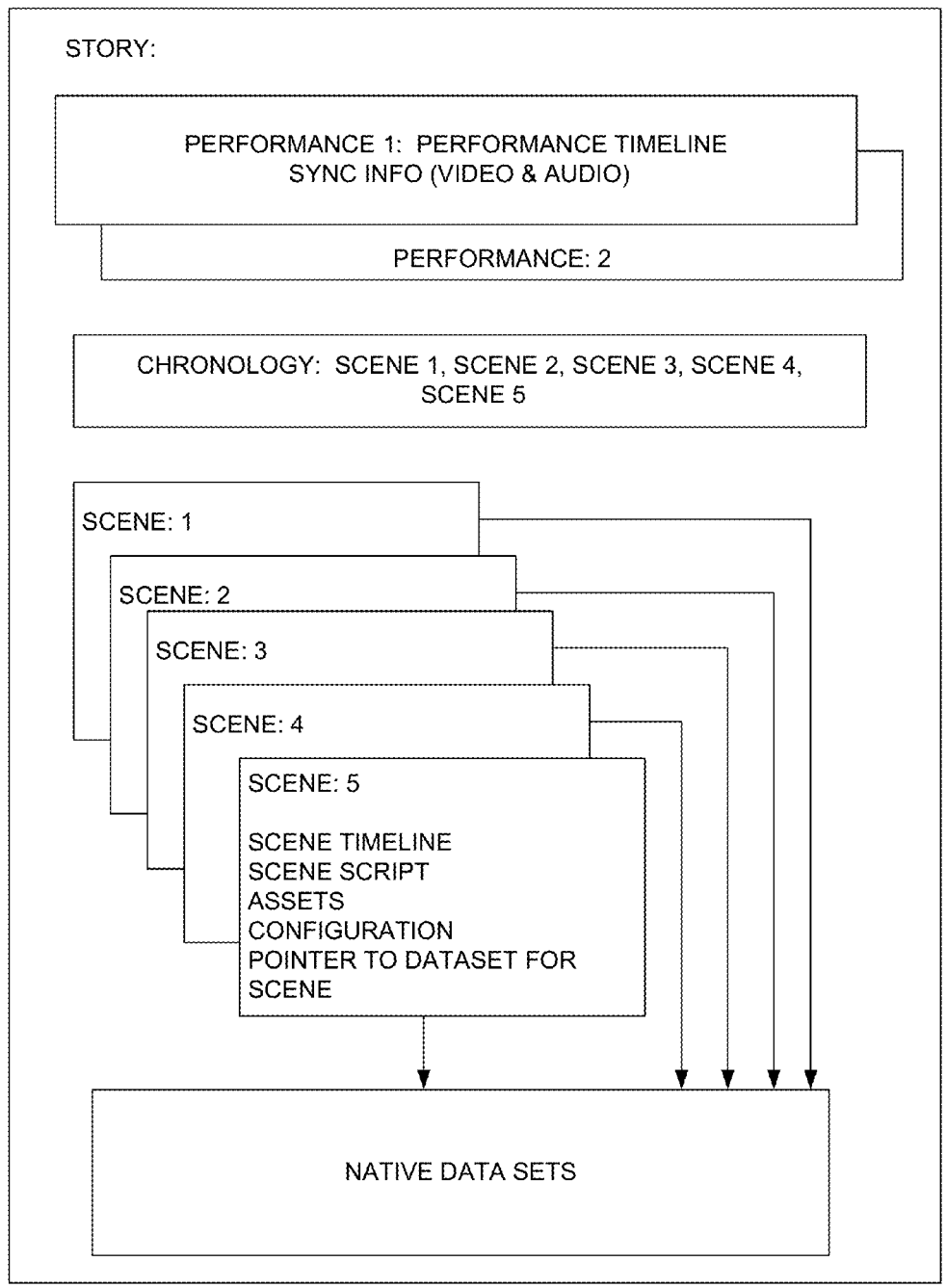

FIG. 3B illustrates an example of a data structure for a story. The data structure includes performance information, scenes, and one or more native dataset created from raw data by the digest service. The story may include multiple performances for the same data. The performance information may include a performance timeline and synchronization information (e.g., for audio and video). In addition, a scene chronology shows the ordering of scenes is provided. Records for one or more scenes are stored. The records may include an identifier (e.g., scene 1) configuration information (dimensions, pivot points, etc.), asset information (e.g., pointers to additional information used in the scene, such as images, audio, video, not shown), scene scripts (e.g., for recordings to show how a user interacted with a scene in a recorded performance), and pointers to a data set among the raw datasets that are used in the scene.

Figure 4:
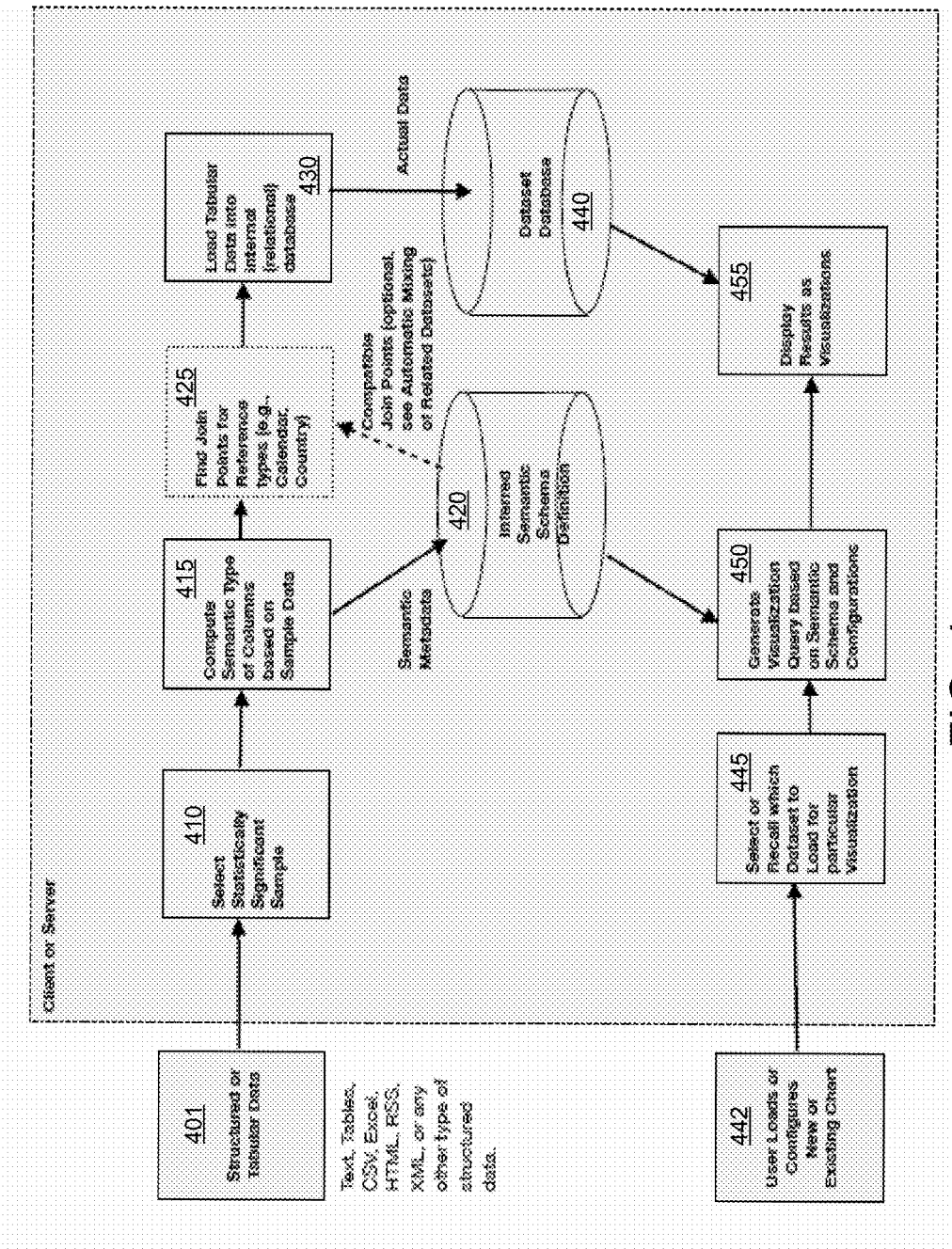
FIG. 4 is an example of a flow block diagram illustrating a semantic type inference without schema knowledge.

FIG. 4 illustrates an example of a process of how a visualization is created. The process is implemented by the digest service 335 and the semantic interpreter 337.

According to the process, semantic types may be inferred without schema knowledge according to the digest service 337. As shown in FIG. 4, structured raw data 401 (e.g., text, tables, CSV, Excel, HTML, RSS, XML, or any other type of structured data) is input to the client device 301 (or server 310). The client/server selects a statistically significant sample of the structured data 410 and determines or computes a semantic type (e.g., columns of a table) based on the sample of data 415. Semantic metadata is output as an inferred schema definition 420. The inferred schema definition may in turn provide compatible join points (for automatic mixing of related datasets). Join points are determined for reference types 425, which are loaded into tabular data in a native format or relational database 430 and saved in a dataset database 440.

The user loads or configures a type of scene (e.g., a new chart) 442, selects or recalls which dataset to load for a particular visualization 445. Once the scene type and dataset are selected, a visualization query is automatically generated for the inferred schema definition database based on the semantic schema and configurations of the visualization 450. For example, if a story is created on an IPAD™ and played on an IPHONE™, the aspect ratio is automatically changed to best use the whole screen of the IPHONE™. The results access the dataset database to display the dataset as a visualization 455. In this manner, the system can infer semantic types without schema knowledge as provided by the digest service.

Figure 5:
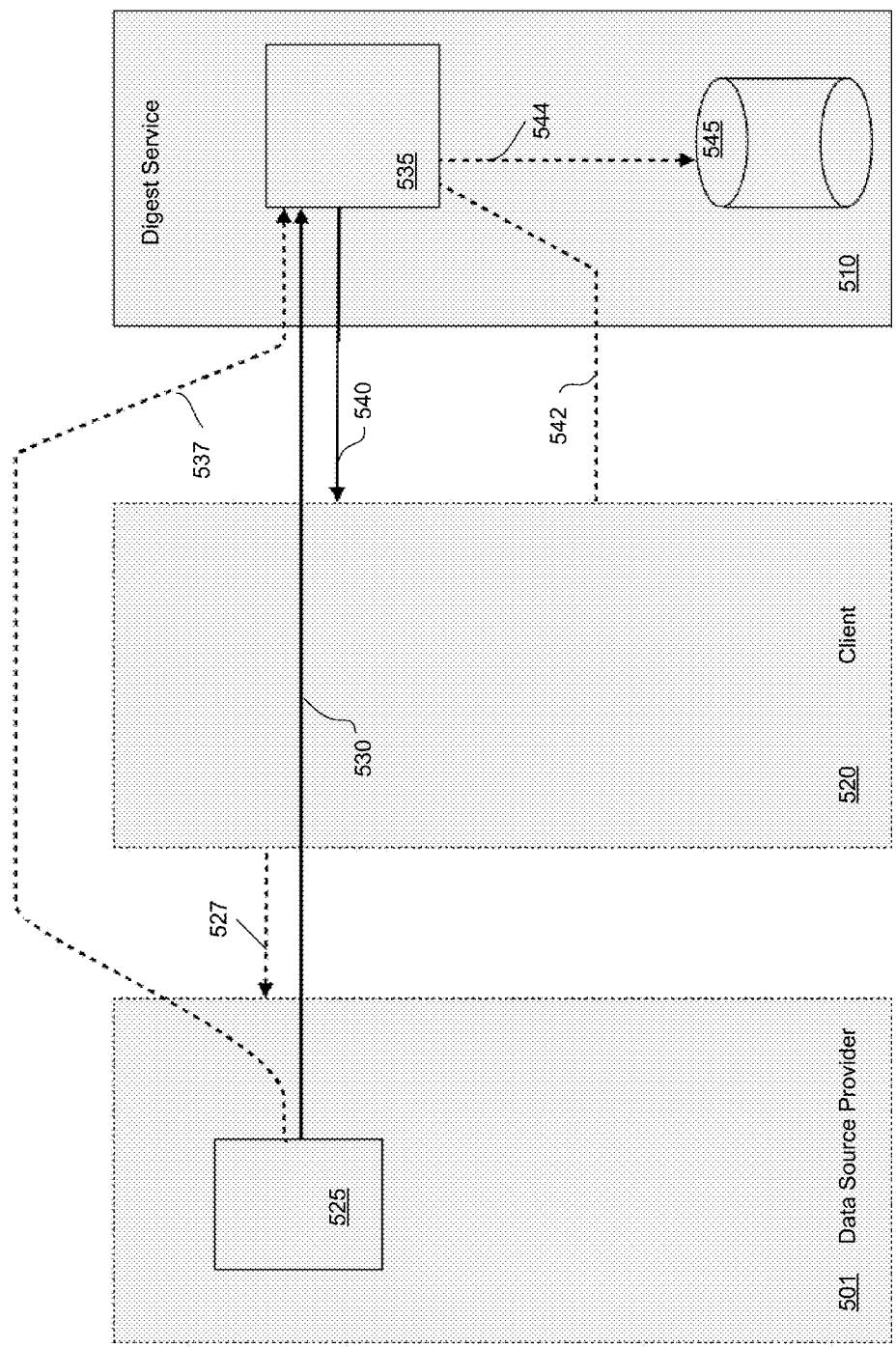
FIG. 5 is an example of a flow block diagram showing a content digest service.

FIG. 5 is an example of a flow diagram showing operation of a content digest service. As shown in FIG. 5 a data source provider 501 is shown in conjunction with a digest service 510 and a client 520. The data source provider provides raw data 525 (e.g., data in the form or one or more of text, tables, CSV, Excel, HTML, RSS, XML, or any other type of structured data, images, videos, sounds, archive files corresponding to multiple data types). Raw data may be accessed 527 by the client 520 (e.g., a client device 101) from the data source provider 501 (e.g., a content provider 120) and provided to the digest service 530 (of the client 301 or the server 340). The digest service includes a configuration recommendation engine 535. In one example, peering agreements allow data to flow to a server-based recommendation engine without the need for an intervening the client in between 537. In this case the server keeps any required credentials. The configuration recommendation engine 535 provides a working database and visualization configuration (e.g., what kind of chart, columns, column types, Min/Max Values, dimension configuration, image color scheme, attachment to particular timelines, etc. to the client) that may be recommended to a user 540. The client 520 may override the recommendations 542, which are optionally sent back to the digest service to store 544 for future use in the digest hint storage 545. As a result, the digest service also can learn from user behavior to pick appropriate defaults for different data sets by tracking what scene types are used for a particular type of dataset.

One core of aspect of the visualization engine of the Perspective application is an auto summarization feature. The digest service uses heuristics to determine specifics (e.g., statistical distribution of words, numbers, duplication, range, and other characteristics of the dataset) about the datasets used by the client to visualize the data. Therefore, incoming data is processed by the digest service in order to create a scene database that can be used by the visualization engine to facilitate scene creation. The scene database is persistent, so if the user configures the Perspective application in a certain manner, that configuration can be reused by the digest service. In one example, peering agreements allow a server of the system service provider 110 to pre-fetch data required for the visualization and motion chart engine without having to obtain the data through an intervening client.

Data provided or identified by users often has characteristics, such as, for example, duplicate values that may exist in one or more columns of a data structure, that can otherwise easily disrupt simplistic loading of data for creation of a visualization. Therefore, the auto summarization feature of the visualization engine automatically processes the data, for example collapsing rows with duplicate values, depending on the configuration set by the server. According to this feature, the visualization engine may process the data, for example, according to a generalization of SQL "group by" or Excel "pivot tables" used, for example, in the context of graphs. This processing of the data dramatically increases the type of data that can be imported into the Perspective application without creating errors or disrupting the scene creation process (e.g., "duplicate row" errors).

Figure 6:
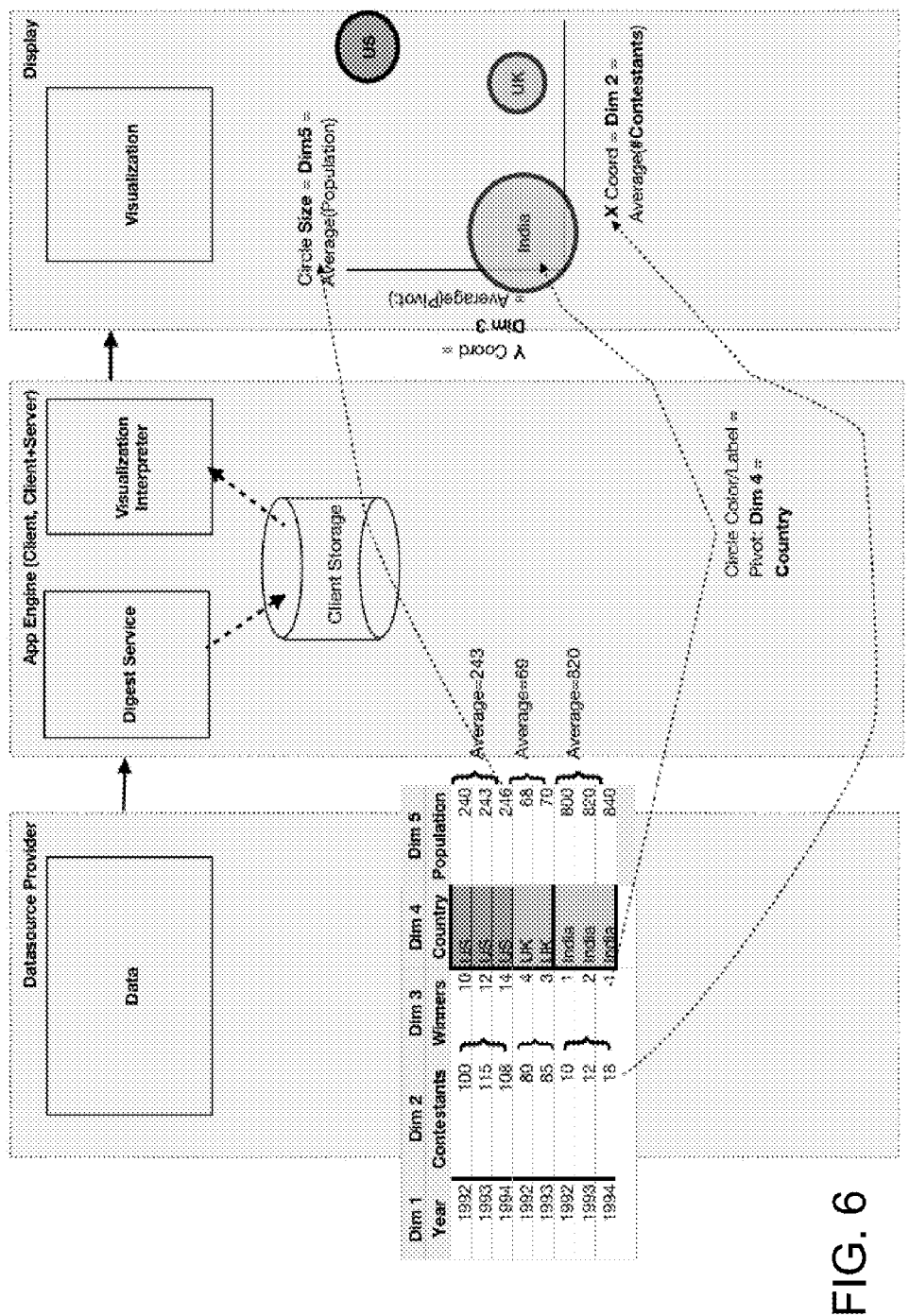
FIG. 6 is an example of a flow block diagram showing an auto summarization feature.

FIG. 6 shows an example of the auto summarization process for a system that includes a data source provider, a client (or client and service provider) and a display. The data source provider includes raw data. In this example, the raw data is a table with five columns including: year, contestants, winner's country, and population. In the raw data format: the first column is 1992, 1993, 1994, 1992, 1993, 1992, 1993, 1994; the second column: 100, 115, 108, 80, 85, 10, 12, 18; the third column is 10, 12, 14, 4, 3, 1, 2, −1; the fourth column is US, US, US, UK, UK, UK, India, India, India; the fifth column is 240, 243, 246, 68, 70, 800, 820, 840. The raw data is provided to the client (or client and server). The client and/or client/server implements the visualization engine. The visualization engine includes a digest service and a visualization interpreter. As described above, the digest service "digests" the raw data to provide a native data set which is stored in the client data storage device. The visualization interpreter accesses the client storage device to create a visualization for the display (e.g., a bubble chart).

According to the auto summarization feature, given a data source with multiple dimensions, one or more dimensions are chosen as pivot points by the visual interpreter. In the example of FIG. 6, there are five dimensions: year, contestants, winner's country, and population. The pivot points are used to group certain rows of data together. The pivot point is used to "fold" a set of rows that have the same value for a column. For example, if the pivot point is the country in the data set shown in FIG. 6, in order to display each cluster of rows represented by a certain country, the values of the other columns are summarized, where summarize means a function F({v1: V, v2: V, v3: V})=s: V. Examples of auto summarization functions are: Count, Sum, Average, Min, Max, and so on. Of course, one will appreciate that other summarization functions may be used consistent with the description herein. As a result, unlike prior use of pivots, the visualization engine is able to use the auto summarization feature to automatically produce motion for visualizations, such as charts where the Perspective App uses statistical analysis to automatically choose the proper pivots to create the visualization. For example, as shown in FIG. 6 the digest service determines that the raw data is a spreadsheet with five columns. Each column is determined to be a dimension of the dataset by the digest service, which stores the data as native data. A scene "bubble chart" is selected for the visual interpreter and the native data is accessed and processed to create a visualization. In this example, the bubble chart has a Y Coordinate=Dim 3=Average(Pivot:); Circle/Bubble Size=Dim5=Average(Population); X Coordinate=Dim 2=Average(#Contestants); and Circle Color/Label=Pivot: Dim 4=Country. As a result, motion in visualizations is automatically achieved without the user having to have a background in analytics, statistic, computer science, graphic arts, or video production/editing.

Figure 7:
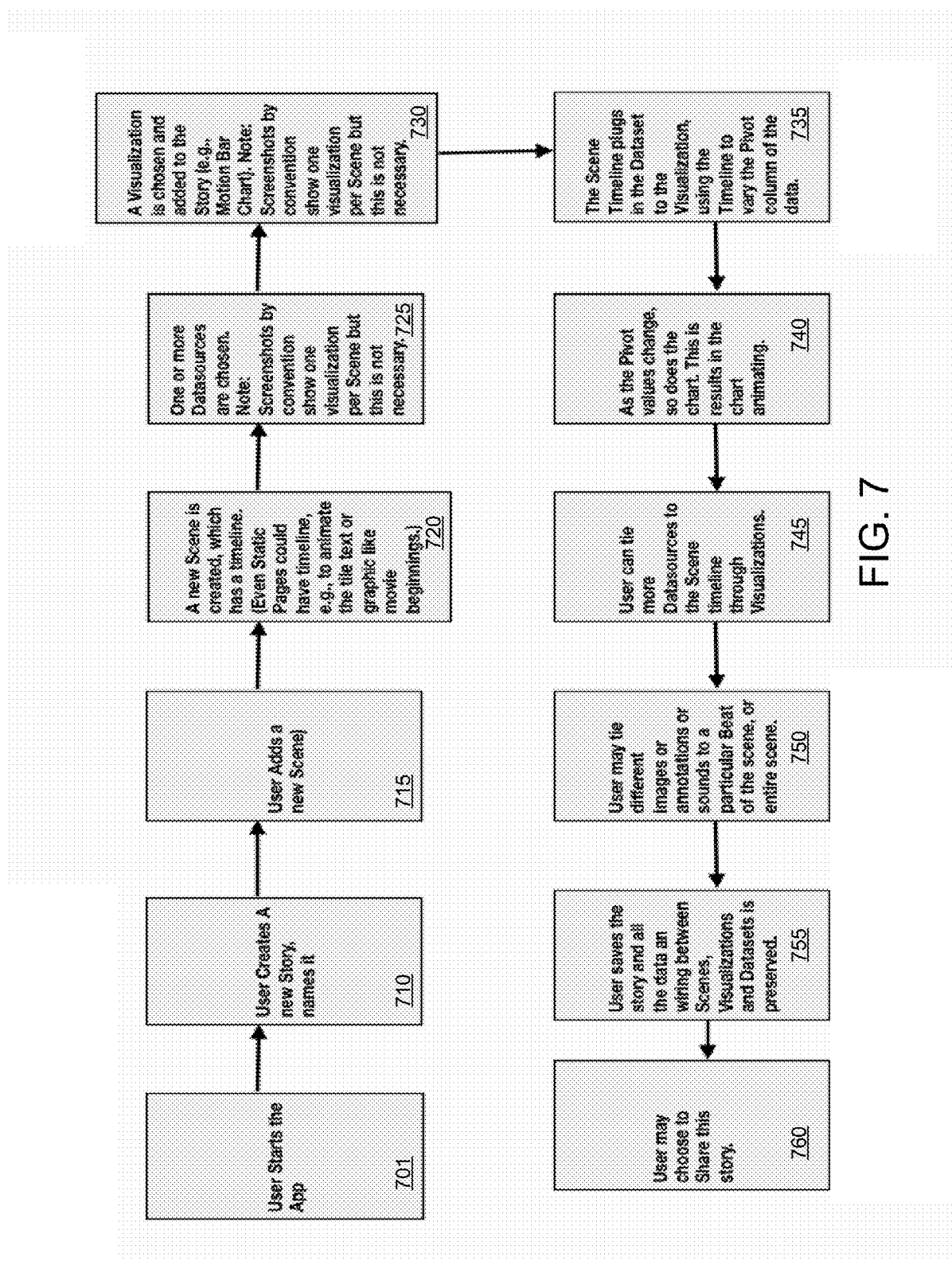
FIG. 7 is an example of a flow block diagram showing construction of a story.

FIG. 7 shows an example of how the visualization engine may be used to construct a story. In this example, a user starts the Perspective App 701. The user selects creation of a new Story and names the story for an input of a user interface of the Perspective application 710. To begin creation of the story, the user then selects an input to add a new scene 715. When the new scene is created, a timeline may be automatically provided by the Perspective application, as described in further detail below 720. Even static pages can have timeline, which may be used to animate tile text or graphic (e.g., like the beginning or intro to a movie).

One or more data sources are selected or specified by the user 725. A visualization may be chosen and added to the story (e.g., Motion Bar Chart) 730. Screenshots by convention show at least one visualization per scene, but this is not required, and multiple visualizations may be added to the scene via the timeline.

The scene timeline is used to process the selected dataset to create the visualization through use of the timeline to vary the pivot point (e.g., column) of the data 735. As the pivot point values change so does the visualization (e.g., a chart) resulting in the appearance of animation of the chart to a user or audience, as described above, for example, using the auto summarization feature 740.

The user can add additional data sources to the scene timeline by providing additional visualizations to add additional content to a scene 745. The user may connect different content (e.g., images, annotations, sounds) to a particular beat of the scene or to the entire scene 750. When the user saves the story, the data and connections between scenes are saved to preserve the visualizations and datasets 755. The user may choose to share the story with one or more other users or present/perform the story for an audience 760.

Visualization scenes may include motion (e.g., Motion Charts.) A single moment or a "beat" in a motion chart may be attached to multiple content (e.g., images, sounds or annotations (whether whiteboard, typed-in, or shapes.) Therefore, as the beats are played by the visualization engine, the tie-in allows the content to animate or "come alive." For example, as the motion chart is played, images may come in and out of focus and sounds can be played.

Figure 8:
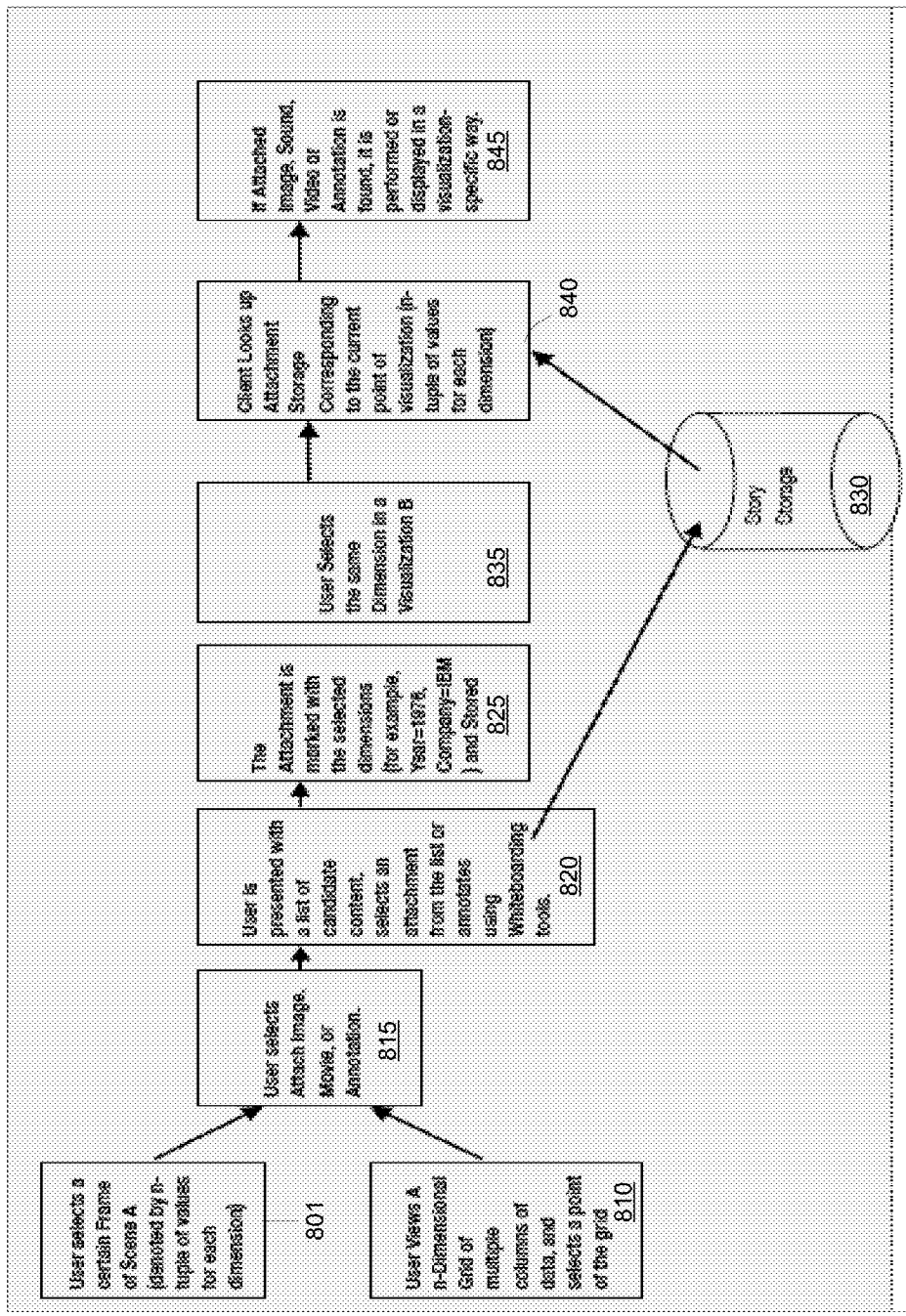
FIG. 8 is an example of a flow block diagram showing the attaching of images, annotations and sounds to the scene timeline.

FIG. 8 shows an example of attaching content to a scene. In this example, images, annotations, and sounds are added to the scene timeline. A user selects a certain frame of scene A (denoted by n-tuple of values for each dimension) from the user interface 801. The user is provided with an n-Dimensional grid of multiple columns of data, and selects a point of the grid 810. The user the selects the "Attach Image, Movie, or Annotation" function of the user interface 815. User is presented with a menu or list of candidate content, and selects an attachment from the list (or annotates using a tool, such as white boarding tools) 820. The attachment is marked with the selected dimensions (e.g., Year=1976, Company=IBM) 825 and is stored 830. The user selects to perform the visualization 835. The Perspective application looks up the attachment corresponding to the current point of the visualization (n-tuple of values for each dimension) from the story storage 840. If the attached image, sound, video or annotation is found, it is performed or displayed in a visualization-specific way 845.

Figure 9:
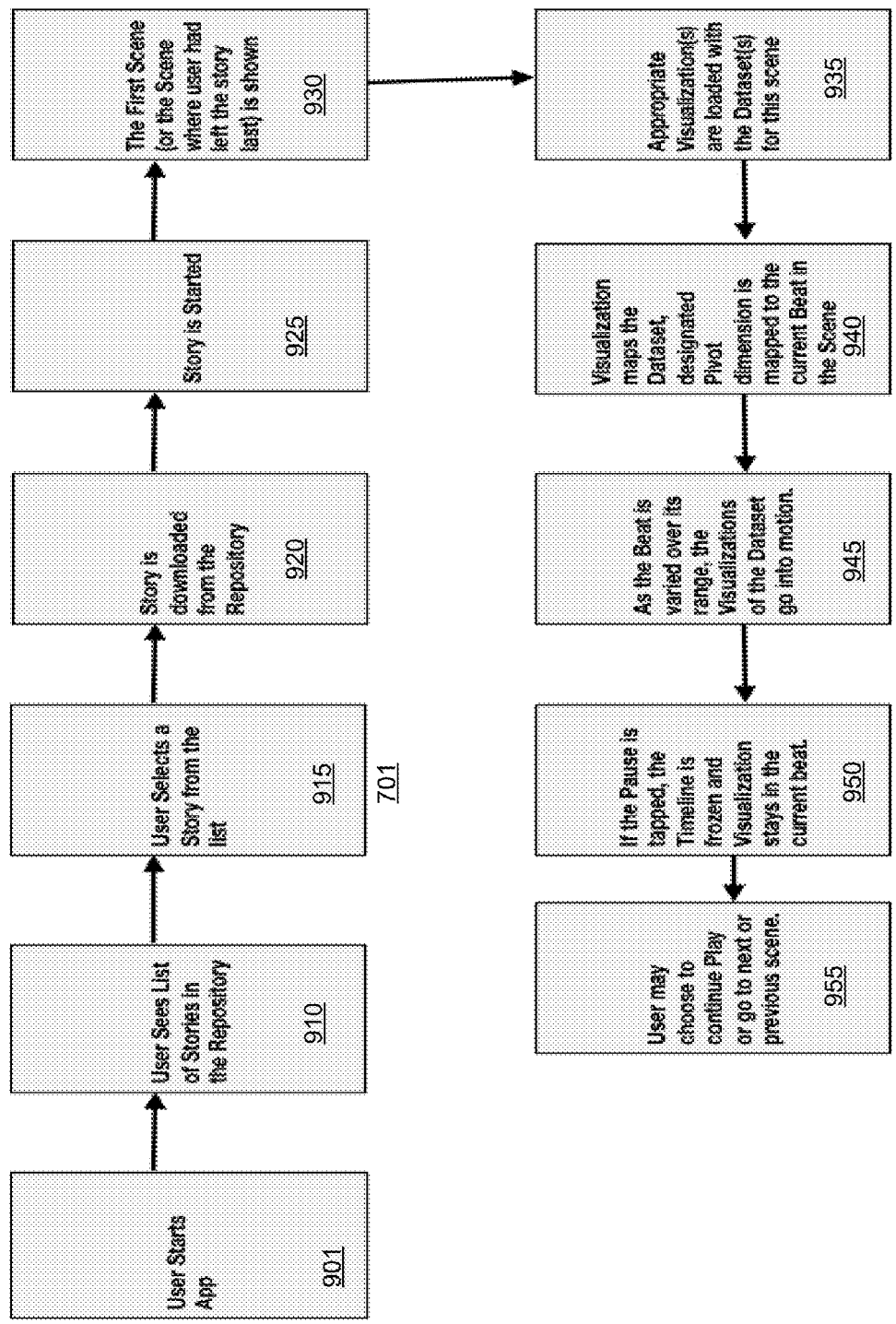
FIG. 9 is an example of a flow block diagram for playing a story.

FIG. 9 shows an example of playing a story. The user starts the Perspective application 901. The user is presented with a menu or list of stories in a repository (e.g., a storage device of the client or service provider system) 910. The user selects a story from the list 915. The story is accessed from the repository (e.g., it may be downloaded from the system service provider) 920. The story is executed 925. The first scene (or the scene where user had left the story last) are presented 930. The Perspective application causes the appropriate visualization(s) to be loaded with the dataset(s) for this scene 935. Each visualization maps the dataset to the scene (e.g. a designated pivot dimension is mapped to the current beat in the scene) 940. As the beats are varied over the range for the scene, the visualizations of the dataset are set into motion 945. The user may select an input during playback of the scene 950. For example, if a pause input is selected, the timeline is frozen and visualization remains in the current beat 950. The user may choose to continue play, rewind, or skip to next or previous scene via other user inputs 955.

Stories can be shared between a plurality of Clients; these shared stories can reside on a server or be shared using other means (e.g., E-mail, drop boxes, or social media). The story may be encrypted to avoid eavesdropping by unwanted audiences. A shared server can serve multiple clients. The server serves a Web URL for any other program running on the Web. The Shared Server redirects http traffic to custom (pixxa://) URLs that invoke the Client with a particular story. This story sharing mechanism allows seamless story sharing with a single input (e.g., tap) from anywhere on the Web.

Figure 10:
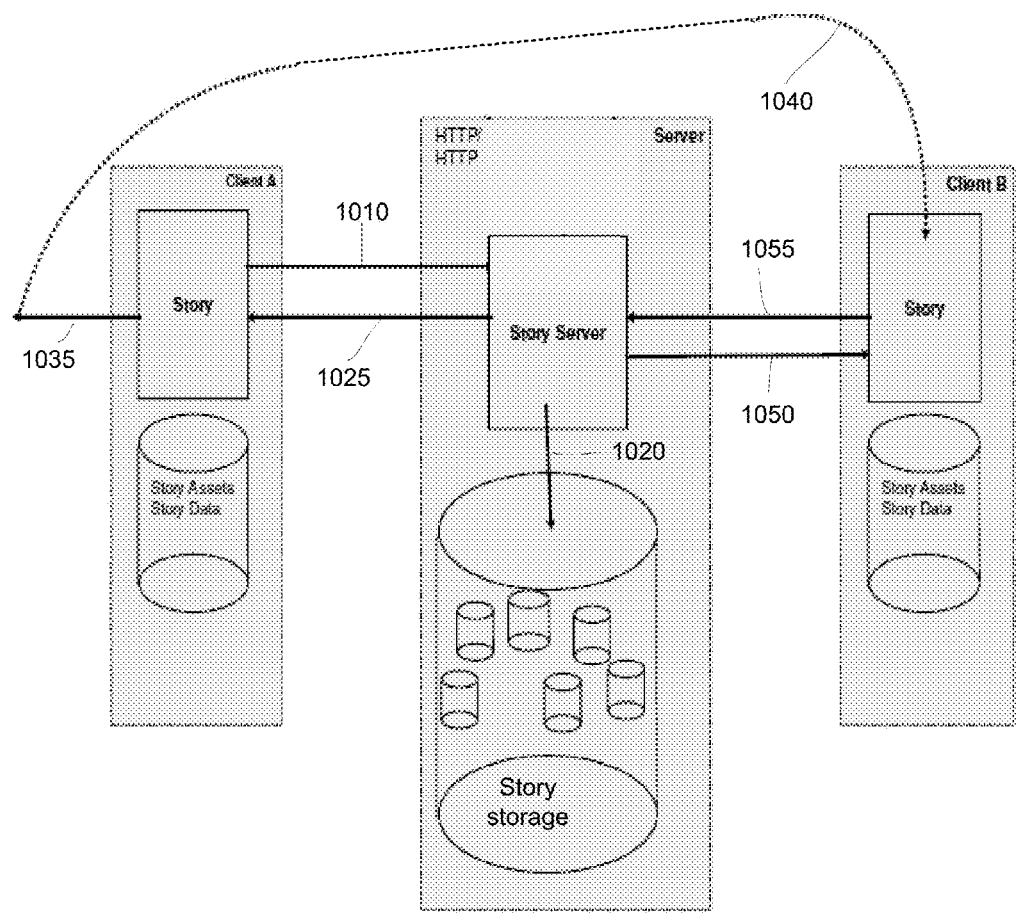
FIG. 10 is an example of a flow block diagram illustrating sharing stories.

FIG. 10 shows an example of a system for sharing stories. The system includes multiple clients 101, at least one service provider system 110, and communications paths 130 connecting the clients to the service provider system 110. In this example, the system includes a client A, a client B, and a server. Client A includes a story. The story includes stored story assets, configuration, and story data. Client A requests to share the story (e.g., assets, data, and configuration) in a custom protocol with the story server 1010. The story server saves the story assets and data to server and adds story metadata to a search index for the story server 1020. The story server may provide Links Web URL to Custom Story URL (e.g., pixxa://storyserver/storyshortname) 1025. The server may keep multiple versions of the story for rollback purposes. The story server may respond to client A with a web URL 1025. The Client A may provide the story Web URL using http or https shared on Web, by Email, TWITTER, etc. to Client B 1035.

Client B receives the custom URL 1040 and invokes the client Prospective Application with story reference, so the client via the application can now open the story seamlessly. The resulting story (assets, data, and configuration) is provided to client B 1050. Depending on the user and story permissions, Client B can save the Story back into the server or as a new version 1055.

Because stories are essentially just data with a set of interpretations and instructions as how to choreograph the interpreted data on the screen, the stores can be efficiently shared without using large amounts of bandwidth. For example, a scene may include a motion chart that shows many different views of the same data. In a conventional system, the user has to create a slide or bitmaps for each individual view (of which there can be hundreds in a single motion chart). However, using the Perspective application, the information shared may be relatively small (e.g., in KBs), and still be visually pleasing even on high density displays, such as retina displays).

User Interface

A user interface provided by the Perspective application running on one or more processing devices facilitates creation and/or importation of native datasets, performances, in addition to presenting and sharing the performances with others.

A user downloads the Perspective application from an app store, or a branded enterprise application may be provided for a particular entity. FIGS. 11-53 show various examples of screenshots of the user interface illustrating the various examples of the functionality and performances described above. The screenshots show an implementation of the user interface and performance for a dataset used by a Perspective App running an IPAD™ using the APPLE™ OS. One skilled in the art will appreciate that this implementation is exemplary and that other OS's and user devices may implement the same functionality. According to this interface, a touch screen is used to provide the interface. The user may touch the screen (e.g., tapping or swiping) to invoke different functionality of the user interface and application. In addition, different manner of touches (e.g., tap once, tap multiple times, tap hold, swipe one or multiple fingers, etc.) may be used to invoke different functionality of the user interface and application.

Figure 11:
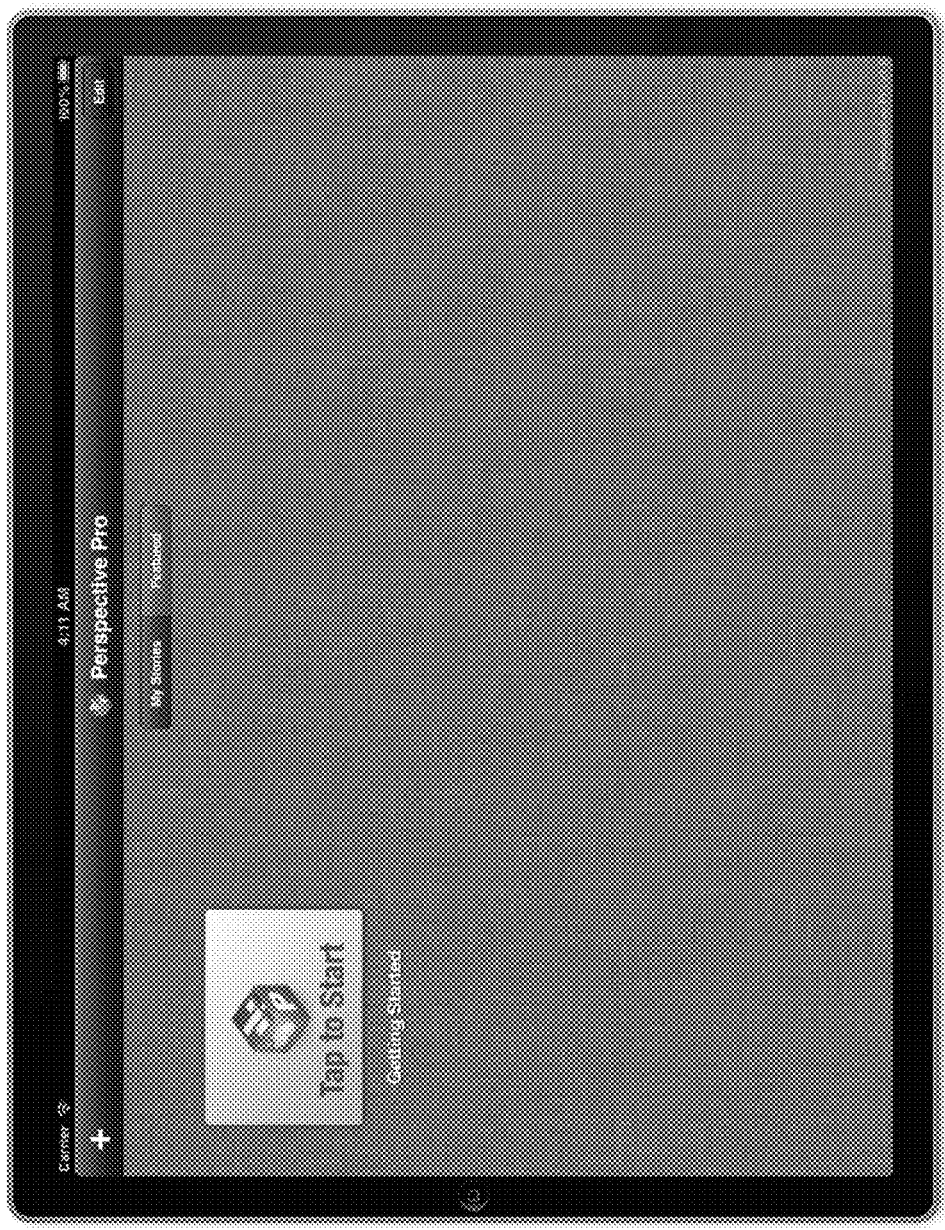
FIG. 11 shows an example of landing screen that lists stories and options.

FIG. 11 shows an example of landing screen that lists stories, options, an inputs, such as, for example, one or more stories bundled with the App; one or more selections for different categories of stories that can be presented (e.g., My stories v. Featured stories); a search function to find a story by name or attribute; and edit to operate on one or more stories at once, e.g., share, delete.

Figure 12:
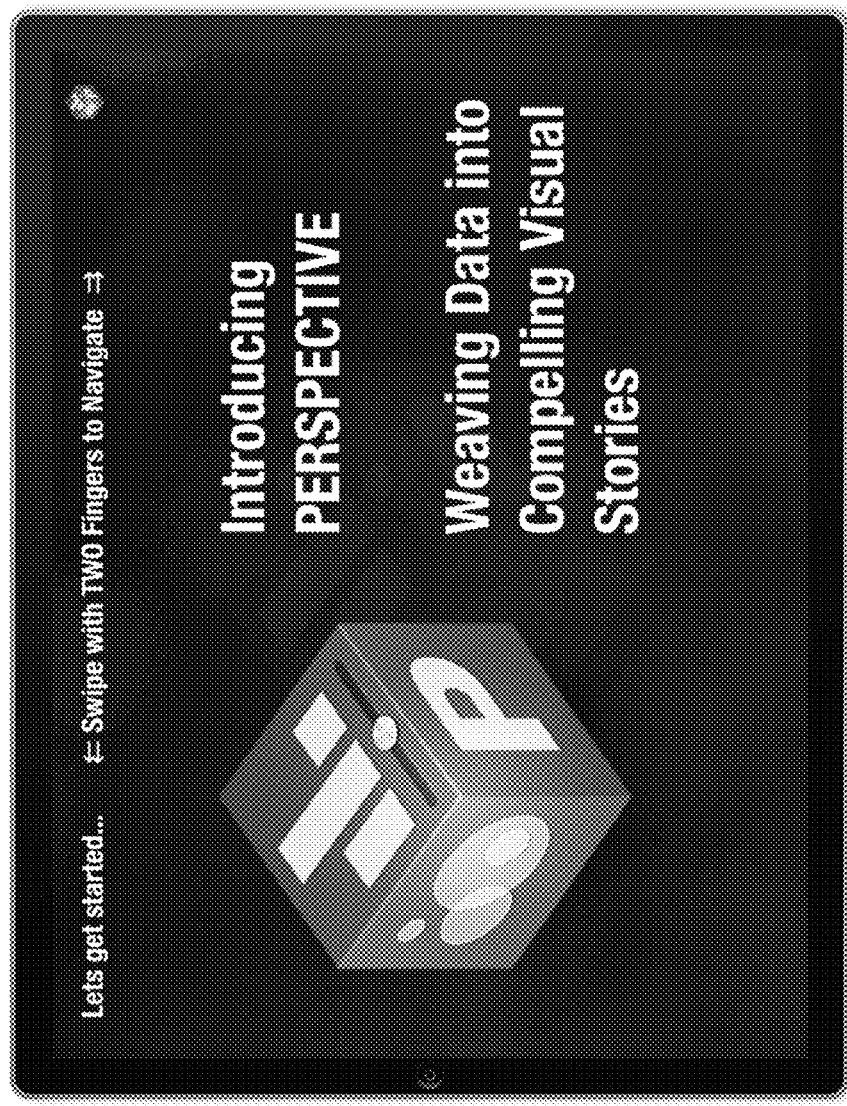
FIG. 12 shows an example of selecting a story.

FIG. 12 shows an example of selecting a story by taping on the screen to start a presentation of a story. In this example, the user tapped on Getting Started in FIG. 11.

Figure 13:
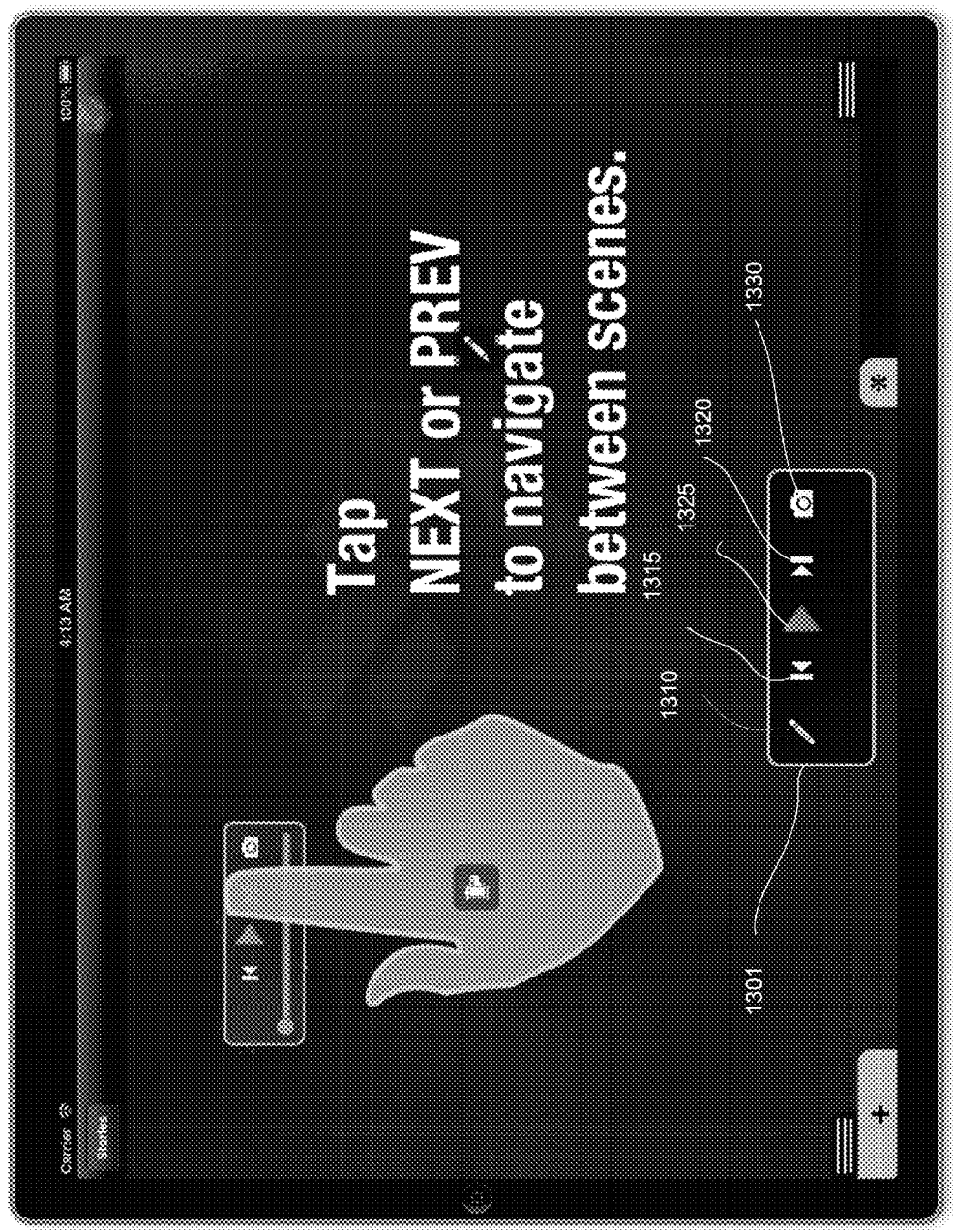
FIG. 13 shows an example of bring up the navigation screen.

FIG. 13 shows an example of bringing up a navigation controller 1301 that allows a user to navigate between scenes of a story. The navigation controller includes one or more inputs to: annotate 1310; navigate to the next or previous scene 1315, 1320, play the current scene 1325; or take a snapshot of the scene 1330. In this example, a user taps the Next/Prev to navigate between scenes. In addition, other forms of navigation based on gestures or other controls may be used but are not illustrated in FIG. 13 (e.g., swiping two fingers across the screen wherein the direction of the swipe dictates selecting the next or previous scene.

As explained above, a story may have one or more scenes, which comprise of one or more visualizations played over time. Each scene can be "played" or presented. In this example, the user interface provides a Playhead 1325 to control presentation of the scene over time (e.g., slower or faster.) As a result, the scene provides a process of animation. Different scenes may have different behaviors when the operating the Playhead. "Title" or "Curtain" scenes however are static and are depicted in a single instance of time. However, even static scenes can be animated by applying special effect transitions. The speed at which the Scene is animated may be variable.

Figure 14:
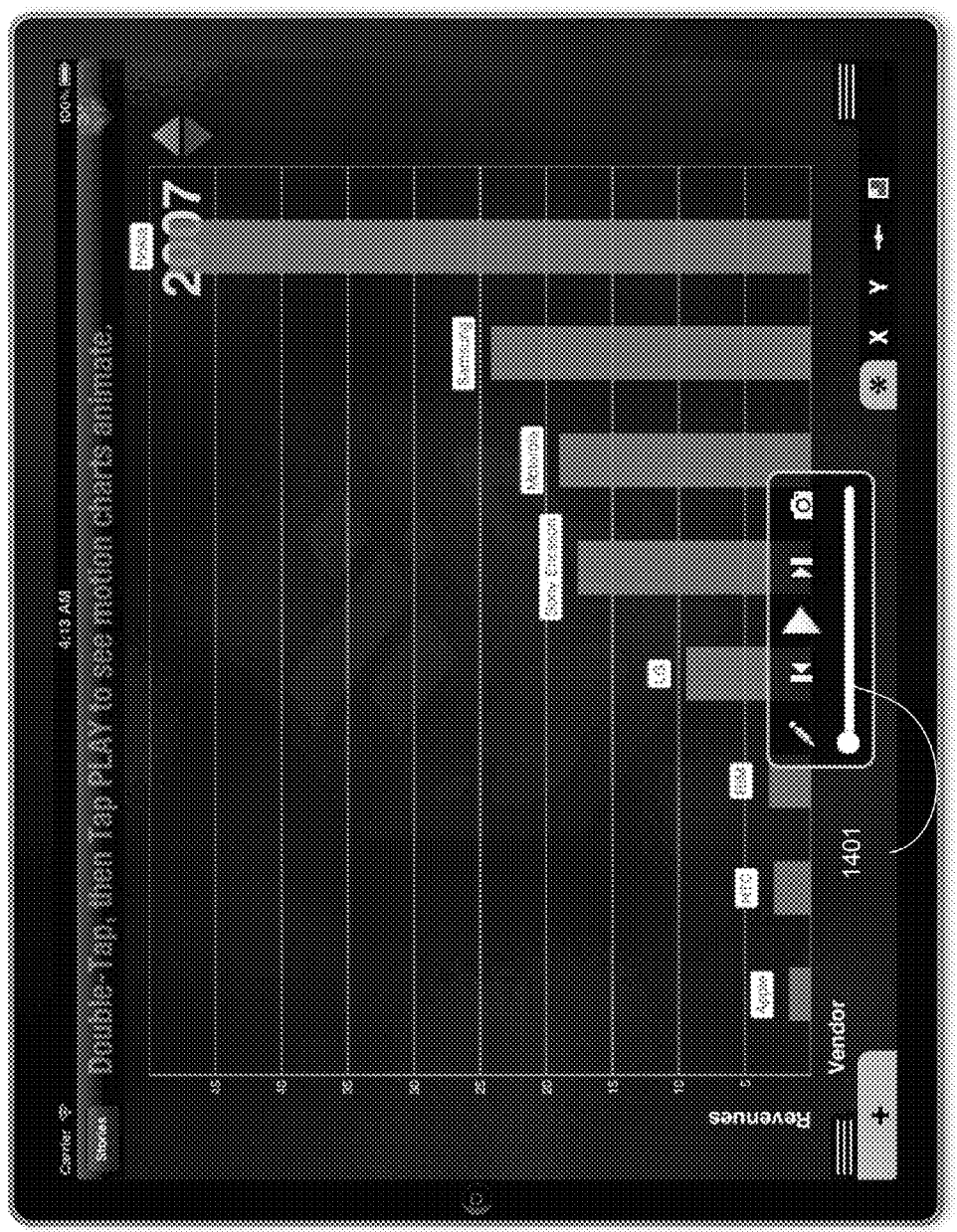
FIG. 14 shows an example of selecting play.

FIG. 14 shows an example of selecting play by tapping in a motion bar chart to animate the bars according the defined parameters of the scene.

Figure 15:
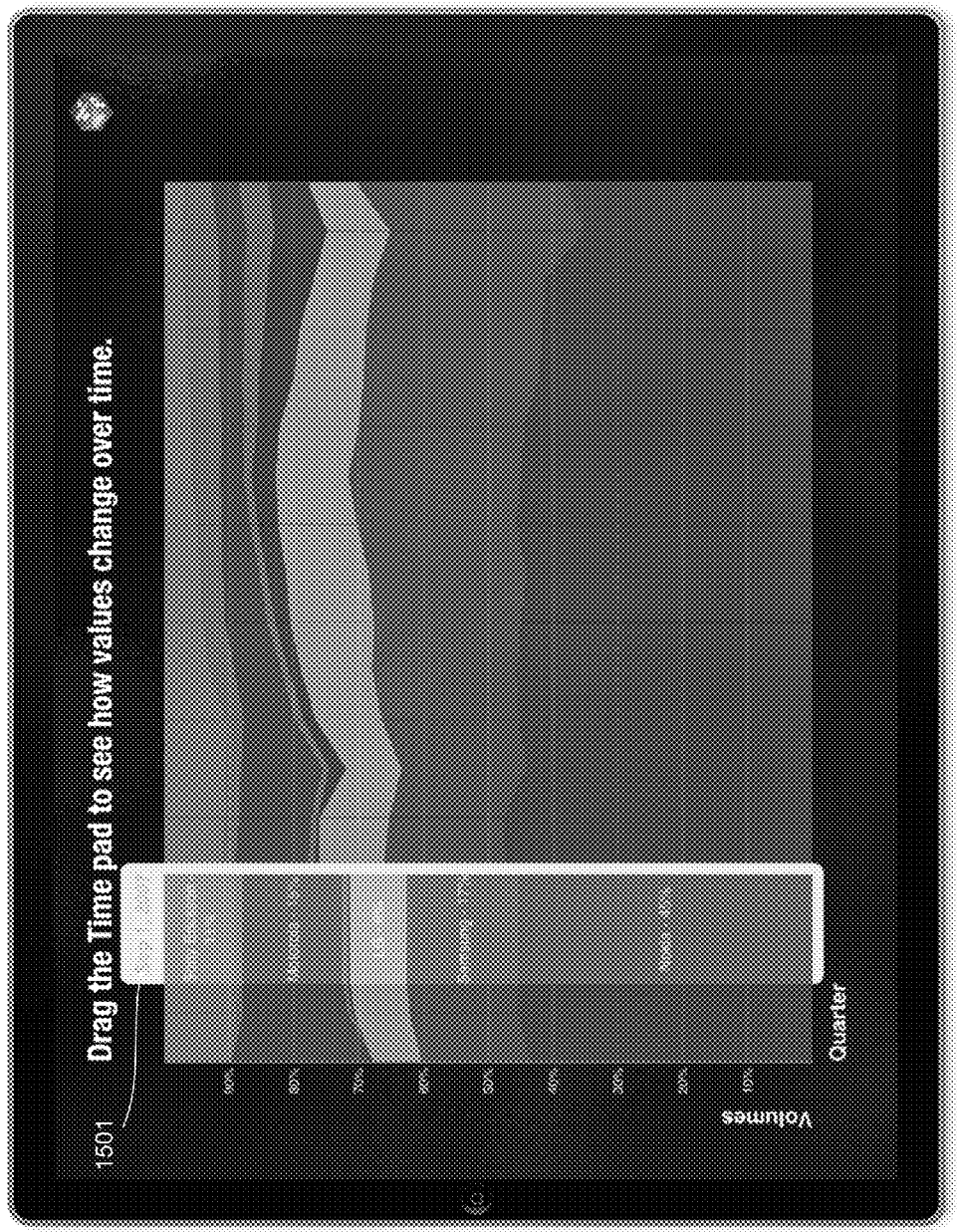
FIG. 15 shows an example of a different visualization operating on the same dataset creating the visualization illustrated in FIG. 14.

FIG. 15 shows an example of a different visualization operating on the same dataset creating the visualization illustrated in FIG. 14. In this example, moving the "Time Pad" 1501 over time in an area chart moves the playhead. In another example, the same function may be accomplished by moving a lever in the navigation area or by selecting play.

Figure 16:
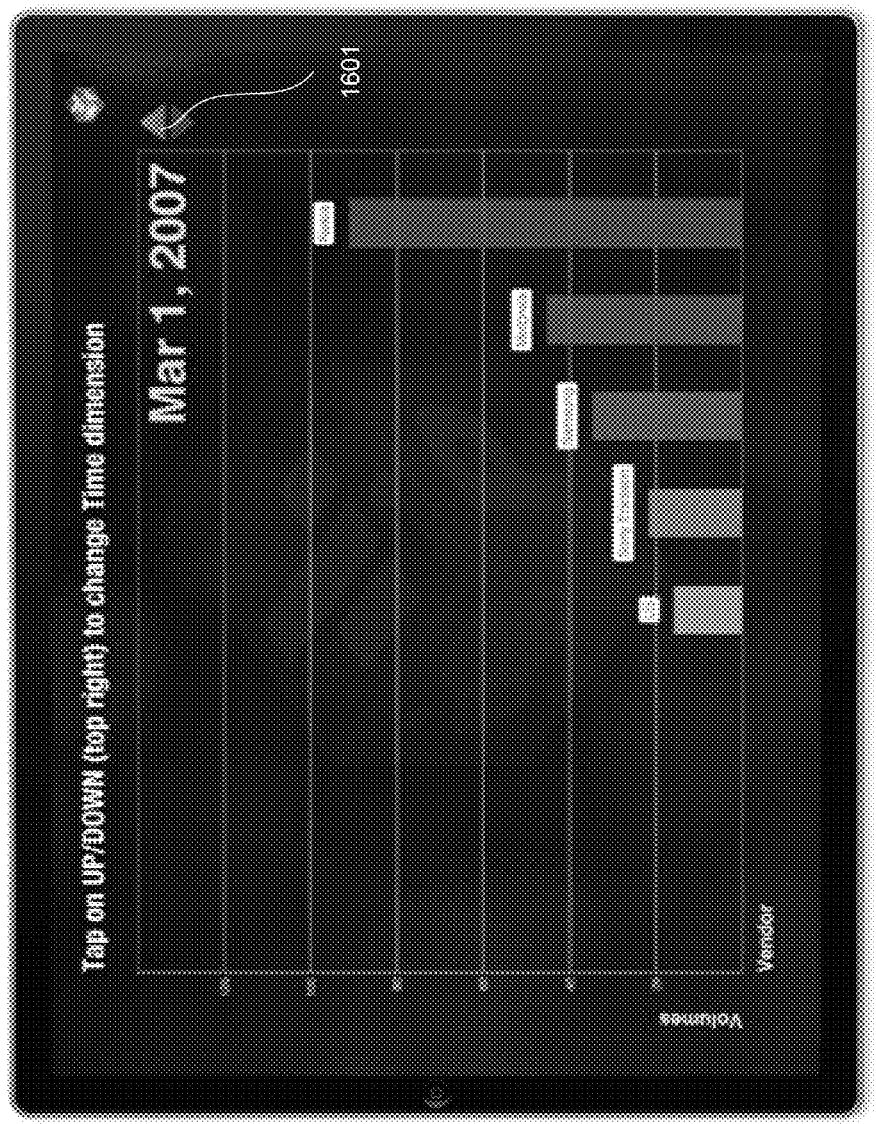
FIG. 16 shows an example of an alternative to using the lever to manipulate the screen.

FIG. 16 shows an example of an alternative to using the lever to manipulate the screen. For example, the user may select the UP/DOWN buttons 1601 to vary the "Z" dimension (in this example shown by Time on the top right of the screen.) As explained above, the Z dimension can be manipulated by the user to take on any of the field values of the dataset.

Figure 17:
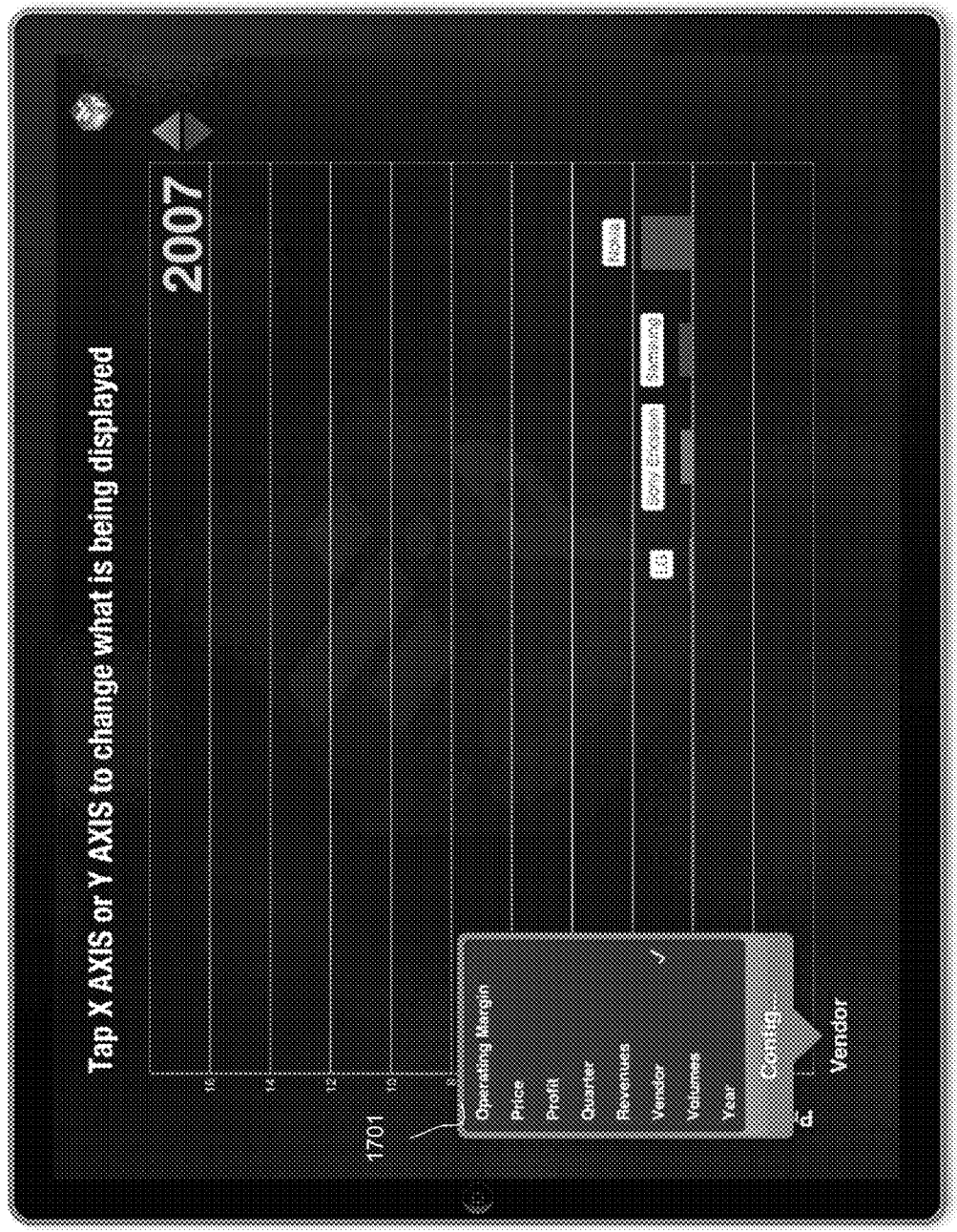
FIG. 17 shows an example of changing dimensions.

FIG. 17 shows an example of changing dimensions of a scene. For example, a user may change any of the dimensions to use another field in the dataset that is used in the scene to create a visualization thereby causing the chart to readjust. FIG. 17 shows an example of tapping the y axis to bring a popup menu 1701 listing fields of the dataset. An indication (e.g., a checkmark) may be used to indicate the current field (e.g., Vendor) being shown on the axis. Selecting a field from the list causes the scene to provide a different visualization using the selected field as a dimension. Conventional charting tools are not as flexible as they are unable to process duplicate values or invalid states automatically from a dataset. However, the Perspective application automatically summarizes equivalent values using the summarization function (e.g., as described above in for auto summarization), such as, for example, Sum, Average, Min, Max, Most Popular, Least Popular, or Random without having the user to intervene or even understand how each function works or is applied to the dataset.

Figure 18:
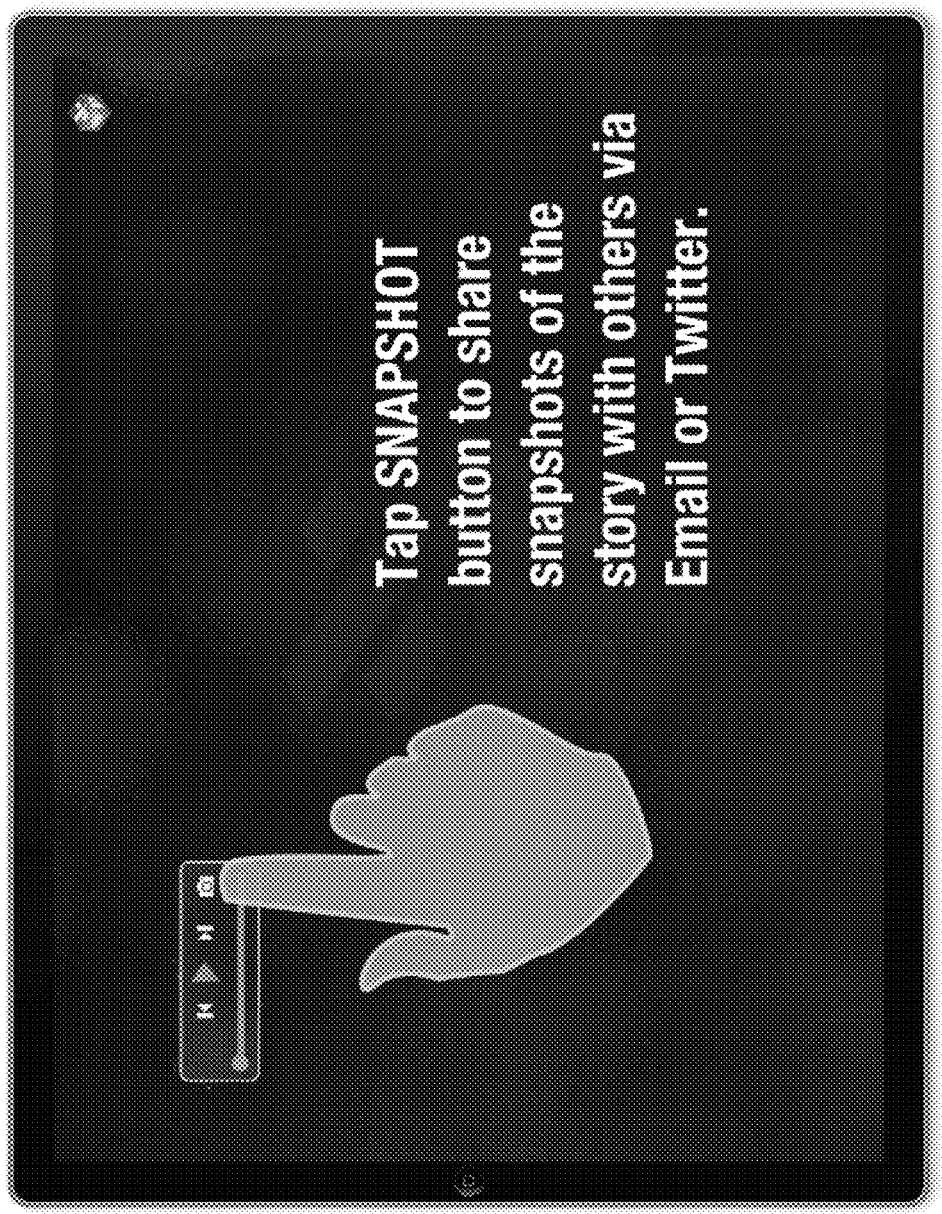
FIG. 18 shows an example of creating a snapshot of a Scene.
Figure 19:
FIG. 19 shows an example of a snapshot of a motion bar chart.

FIG. 18 shows an example of creating a snapshot of a Scene. A user may create a snapshot of any scene in an instance of time using the snapshot tool 1330. FIG. 19 shows an example of a snapshot of a motion bar chart. Selection of the snapshot tool 1330 from the navigation controller 1301 causes a pop menu 1901 of options, such as tweet, email, or save to be presented to the user allowing the user to manipulate the snapshot. Snapshots can be shared through various communication media. Snapshots can accompany other attributes, such as name, permissions.

Snapshots may be given a Short URL (e.g., http://pixxa.com/s/abcd) which is shared with other users who may or may not have downloaded the Perspective application. Selecting the link provided to another user causes a browser to render a central web site (e.g., pixxa.com of the service provider system 110) depicting a graphic representation of the snapshot, such as a thumbnail, or full image of the snapshot. The users may then, depending on the permissions set of the Story from which the snapshot was created, download the snapshot or request permission to download the snapshot. Downloading a snapshot or other such transactions may involve a monetary exchange, as explained in the monetization section.

Figure 20:
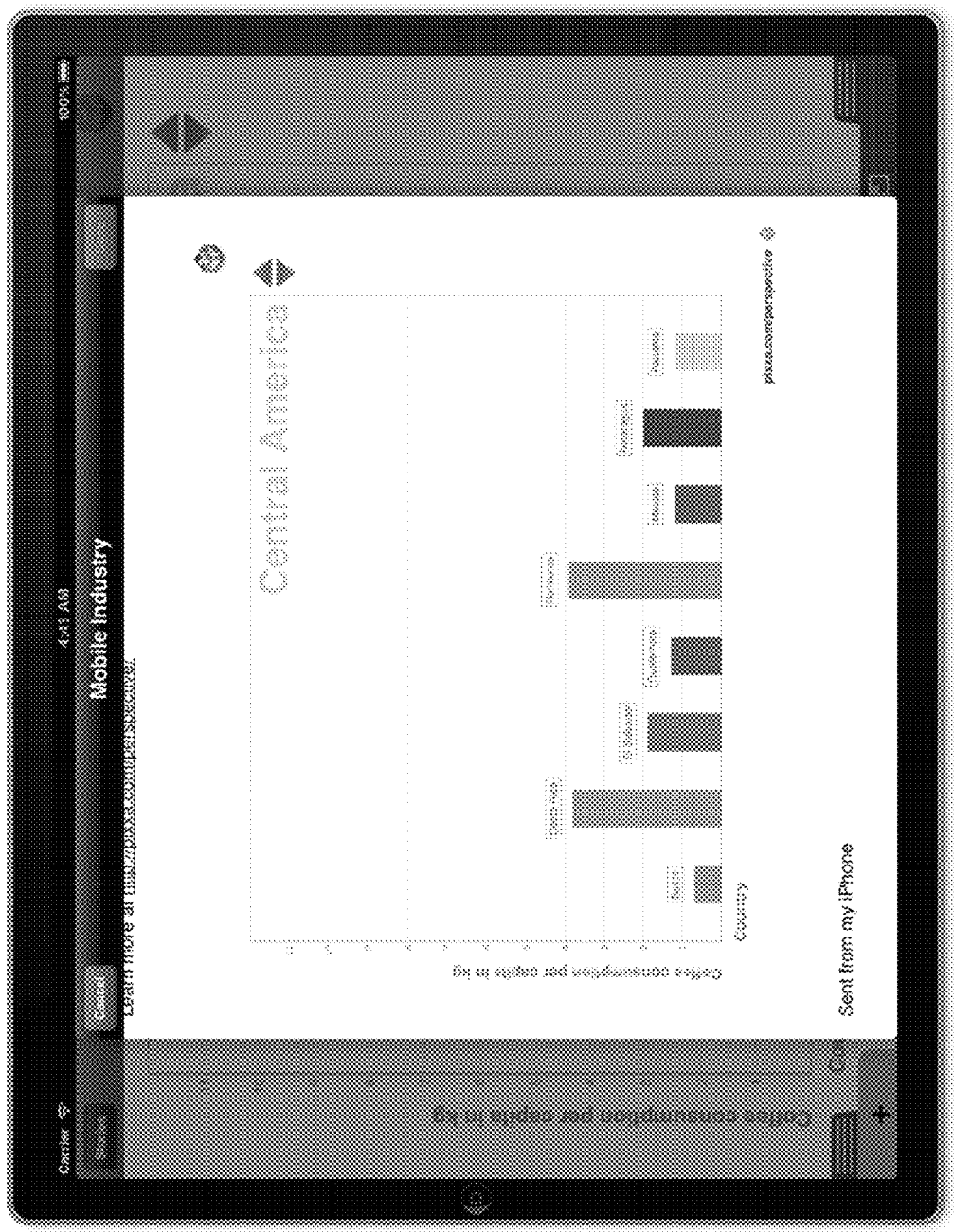
FIG. 20 shows an example of how sharing media includes links back to the story and how the story can be downloaded.

FIG. 20 shows an example of how sharing media includes links back to the story and how the story can be downloaded. A multiplicity of shared media may be used, e.g., Email, TWITTER, Txt, FACEBOOK, IM, to distribute to share the URL.

Figure 21:
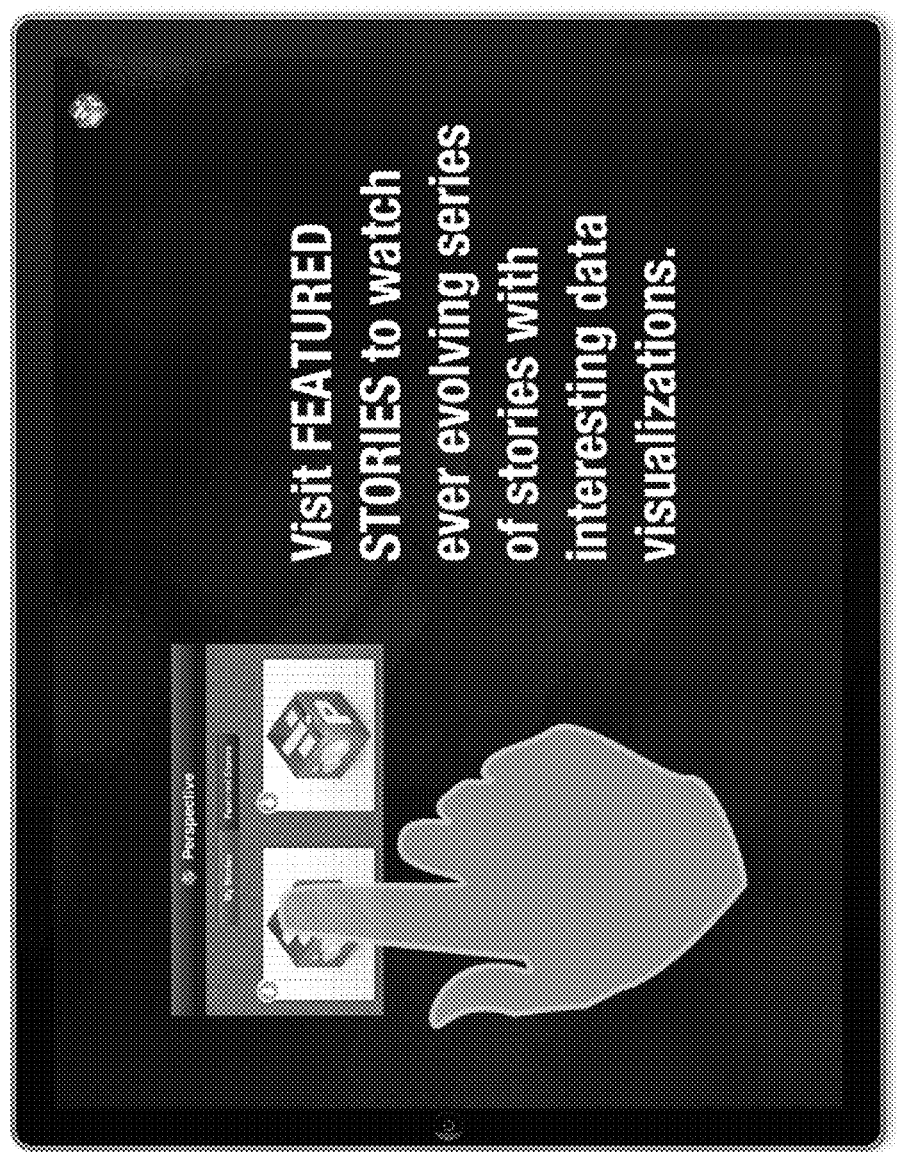
FIG. 21 shows an example selection of Featured Stories.

FIG. 21 shows an exemplary selection of Featured Stories. This landing page or other portions of the website may present the latest stories published by others or by the service provider system.

Figure 22:
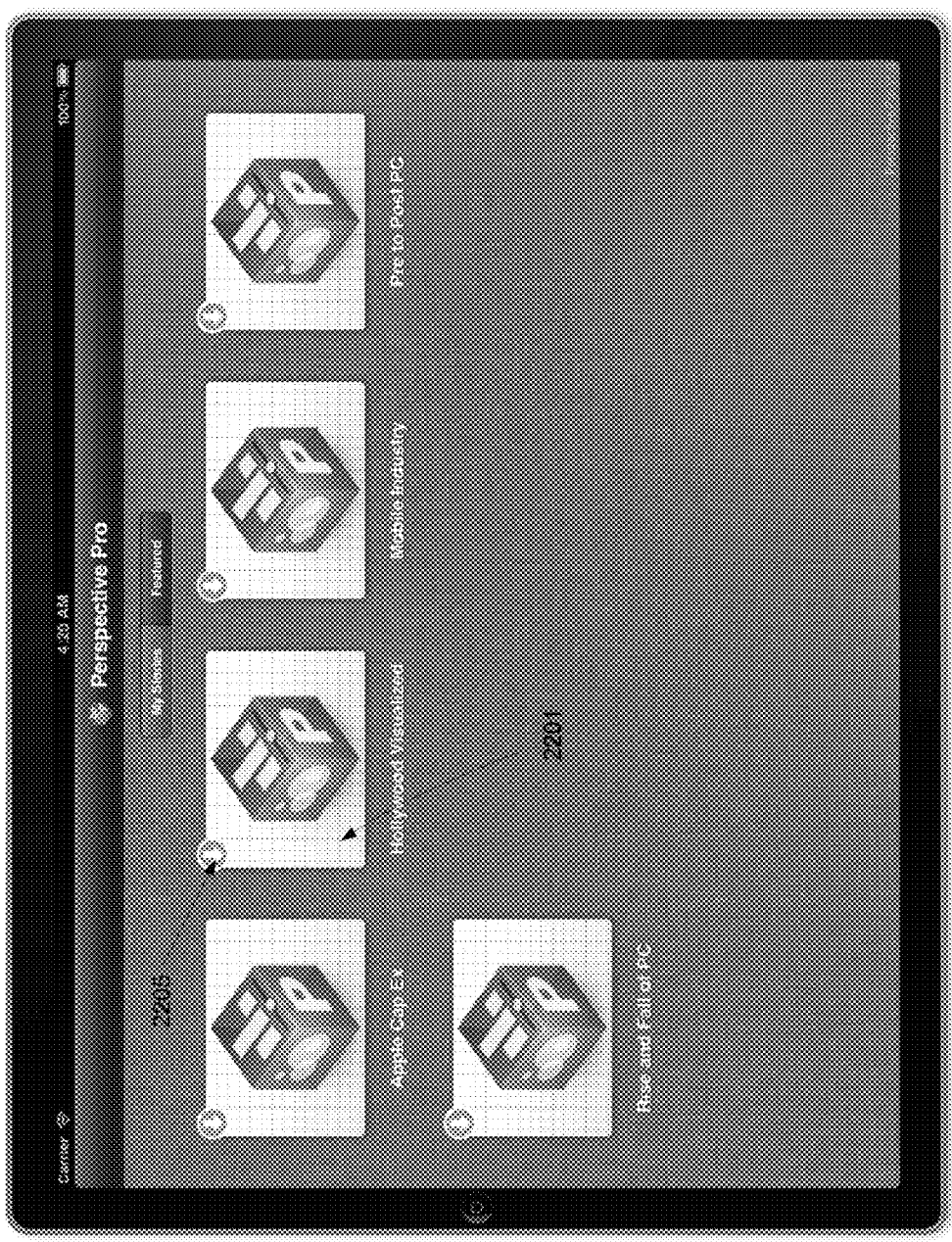
FIG. 22 shows an example of Featured Stories landing page.

FIG. 22 shows an example of the Featured Stories landing page. Selection of thumbnails 2201 associated with the featured stories allow the user to select the Stories to be downloaded from the service provider system or other Network content provider.

Network stories are presented with Name and Thumbnails and other Attributes. An indication 2205 may be provided to show whether the story has been downloaded. Multiple Network repositories may be provided depending on the user and deployment. For example, a corporate user may see their corporate Network. In addition, this screen may be backed by a PIXXA Server or by a Third Party Server that adheres to the published protocol for Stories allowing integrating into other shared media, such as SHAREPOINT.

Figure 23:
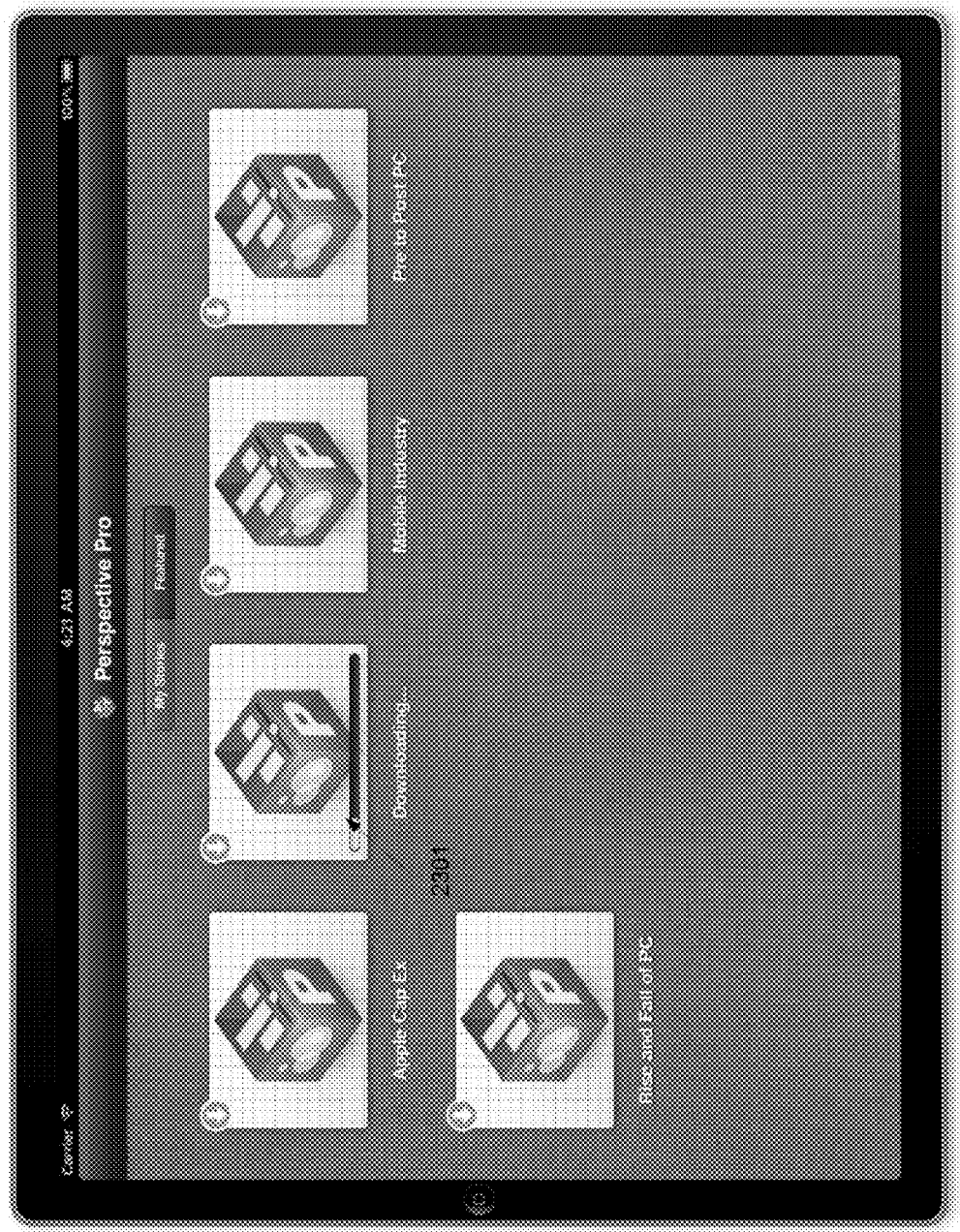
FIG. 23 shows an example of selection of a Story by tapping to download from the network.

FIG. 23 shows an example of selection of a Story by tapping to download from the network. An indication 2301 may be used to provide the status of a download. Once downloaded, the story and all its accompanying datasets, scenes, annotations are resident on the user device. Once downloaded, Network access is no longer necessary to perform core functions. However, in some cases, a custom scene may still access the Internet or network. In addition, if a user has an associated account, rights associated with the downloaded story may provide online or network access to present the story on the network site if the user device storing the story is unavailable.

Figure 24:
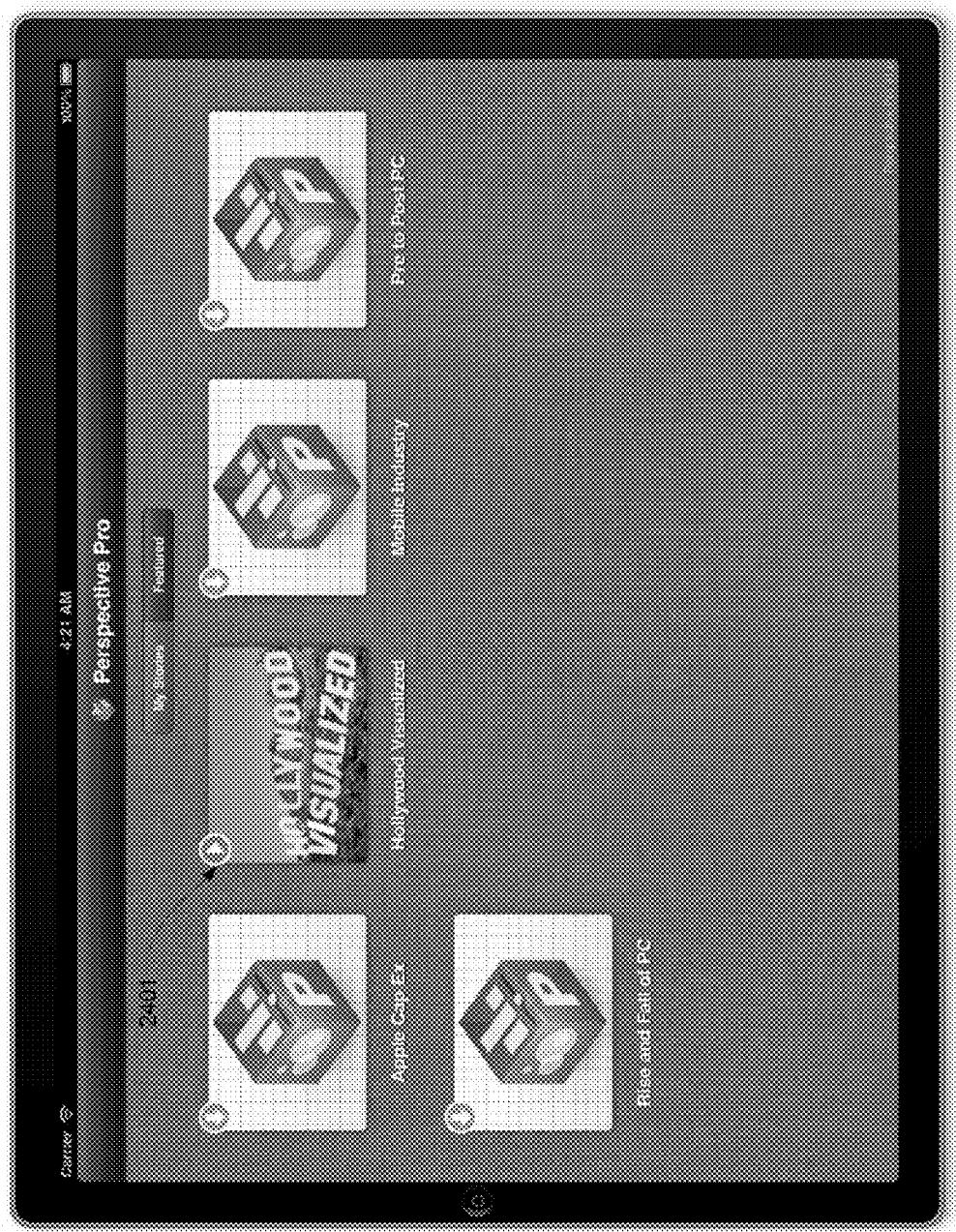
FIG. 24 shows an example of indication of the downloaded stated.

FIG. 24 shows an example of indication 2401 of the downloaded stated. Once downloaded, the story indicator changes to reflect the downloaded state (e.g., from blue download arrow to green play.)

Figure 25:
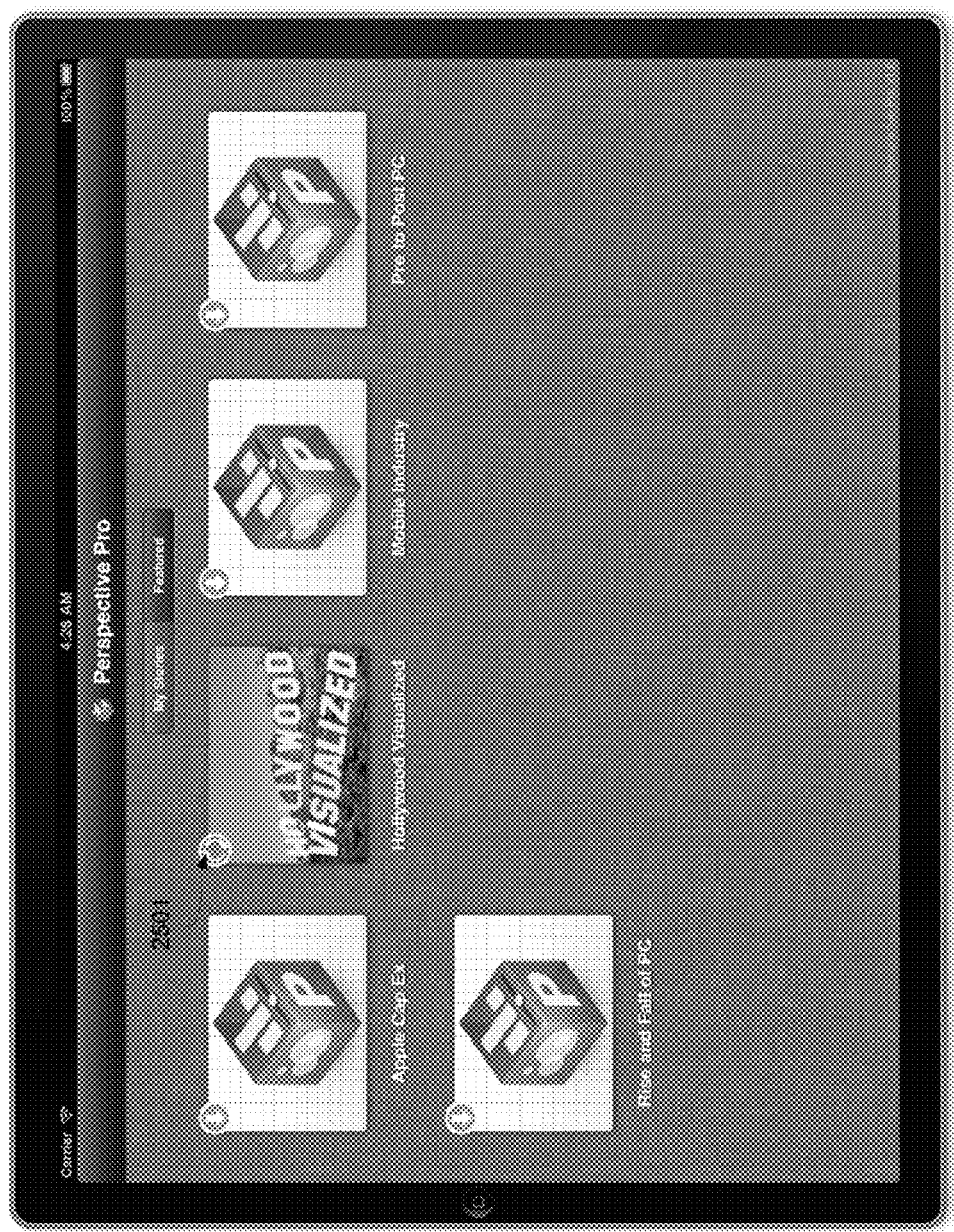
FIG. 25 shows an example of indicated of updated material.

FIG. 25 shows an example of an indication 2501 of updated material. The service provider system may notify a user when a story is updated to a new version. In this example, the orange "reload" indicator 2501 indicates an updated version is available for access and/or download. A user may be notified of updates in other ways. For example, a Push Notification or Email that the story has been updated may be provided to the user. In one example, the story is represented through a URL which is selected (e.g. by tapping on the display) to load the updated version for presentation by their App.

Figure 26:
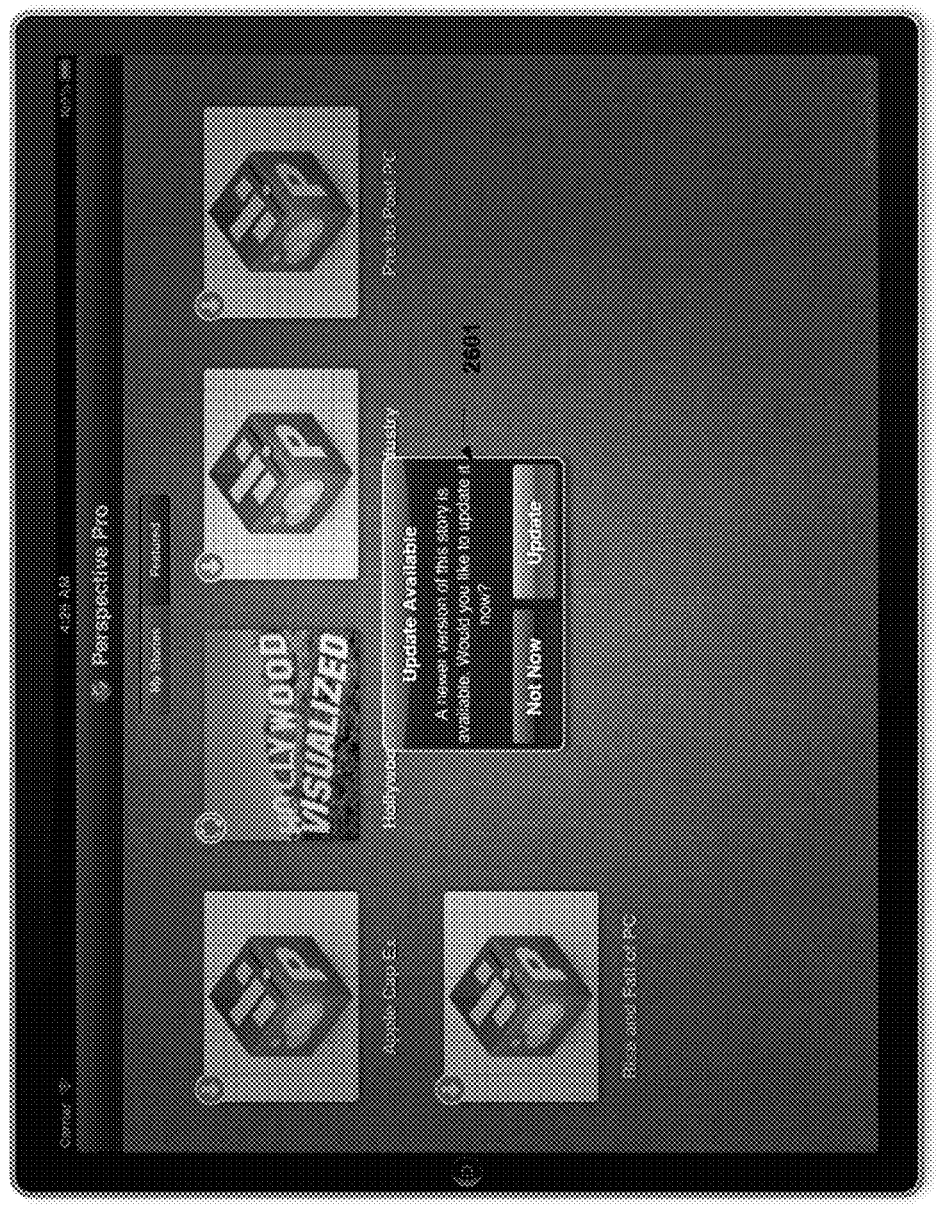
FIG. 26 shows an example of an Updated Story prompting a user before downloading latest version.

FIG. 26 shows an example of an Updated Story prompt 2601 with inputs allowing a user to download or ignore the latest version.

Figure 27:
FIG. 27 shows an example of three stories that have not been downloaded.

FIG. 27 shows an example of the featured story page. In this example three stories have not been downloaded 2701, one story is downloaded and stale 2702 (e.g., Hollywood Visualized) and one story that is downloaded and ready to play 2703.

FIGS. 28-41 show an example of playing a story. In this example, the Mobile Industry story is played.

Figure 28:
FIG. 28 shows an example of playing a story.

FIG. 28 shows the first scene of the story. In this example, the first scene is a Title Scene, which has Text and Image. Any Scene also can have a Theme (not shown) which defines a Background Image and various color palettes for the charts, among other things. Themes are editable from the user interface. In one example, themes are defined by editing of the configuration file associated with the story. Every story has a file representation that presents the story. Every story comprises of multiple other Scenes, and backing Datasets for those scenes.

Figure 29:
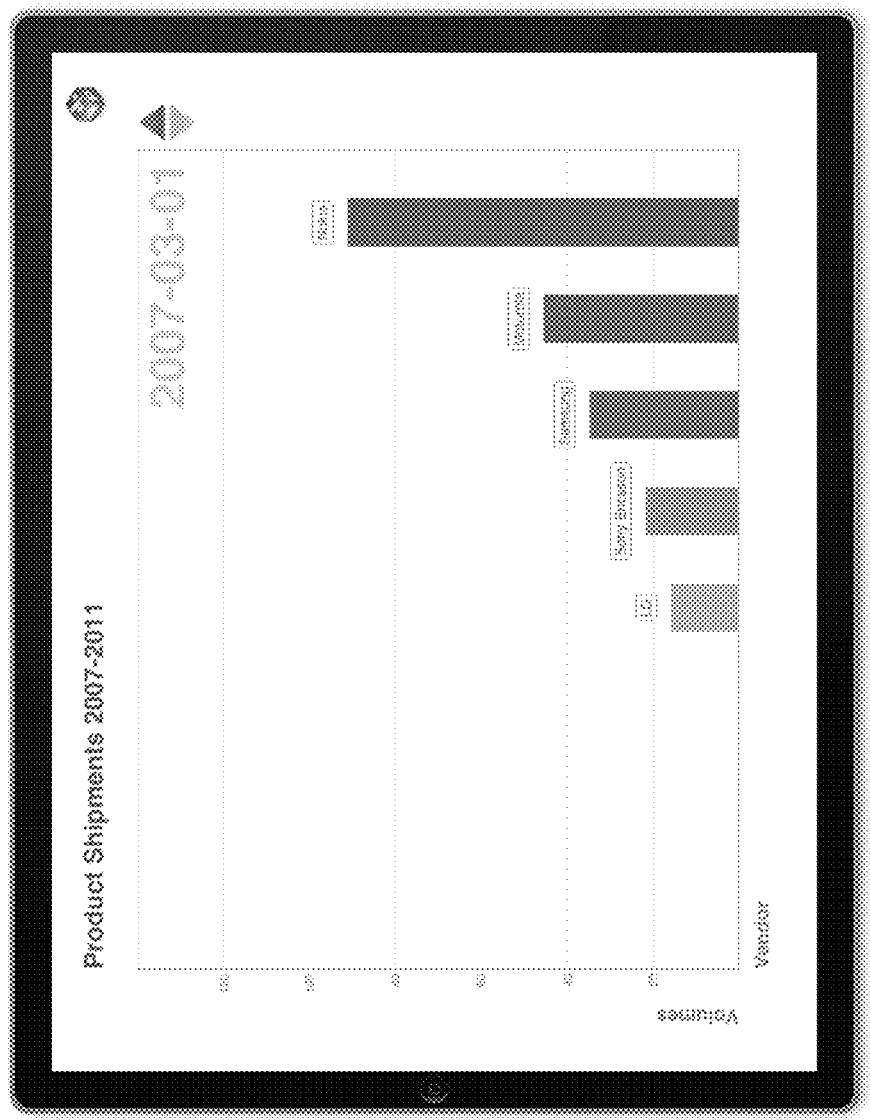
FIG. 29 shows an example of a Motion Bar Chart Scene.

FIG. 29 shows an example of a Motion Bar Chart Scene.

Figure 30:
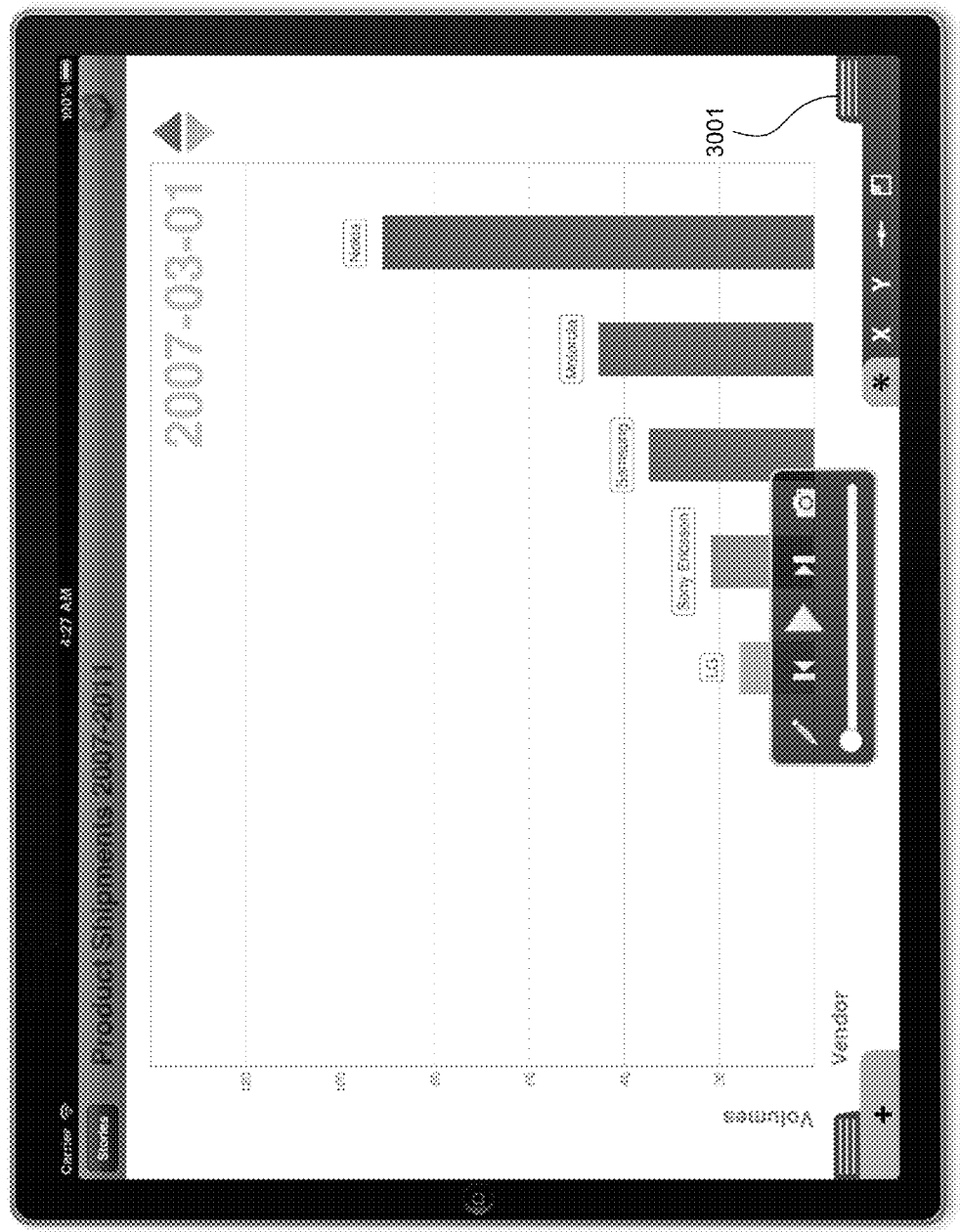
FIG. 30 shows an example of playing the scene and animating through its transitions.

FIG. 30 shows an example of inputs provided by the user interface to manipulate a scene. For example, a controller 1301 for playing the scene and animating through its transitions is shown in addition to a configuration drawer 3001.

Figure 31:
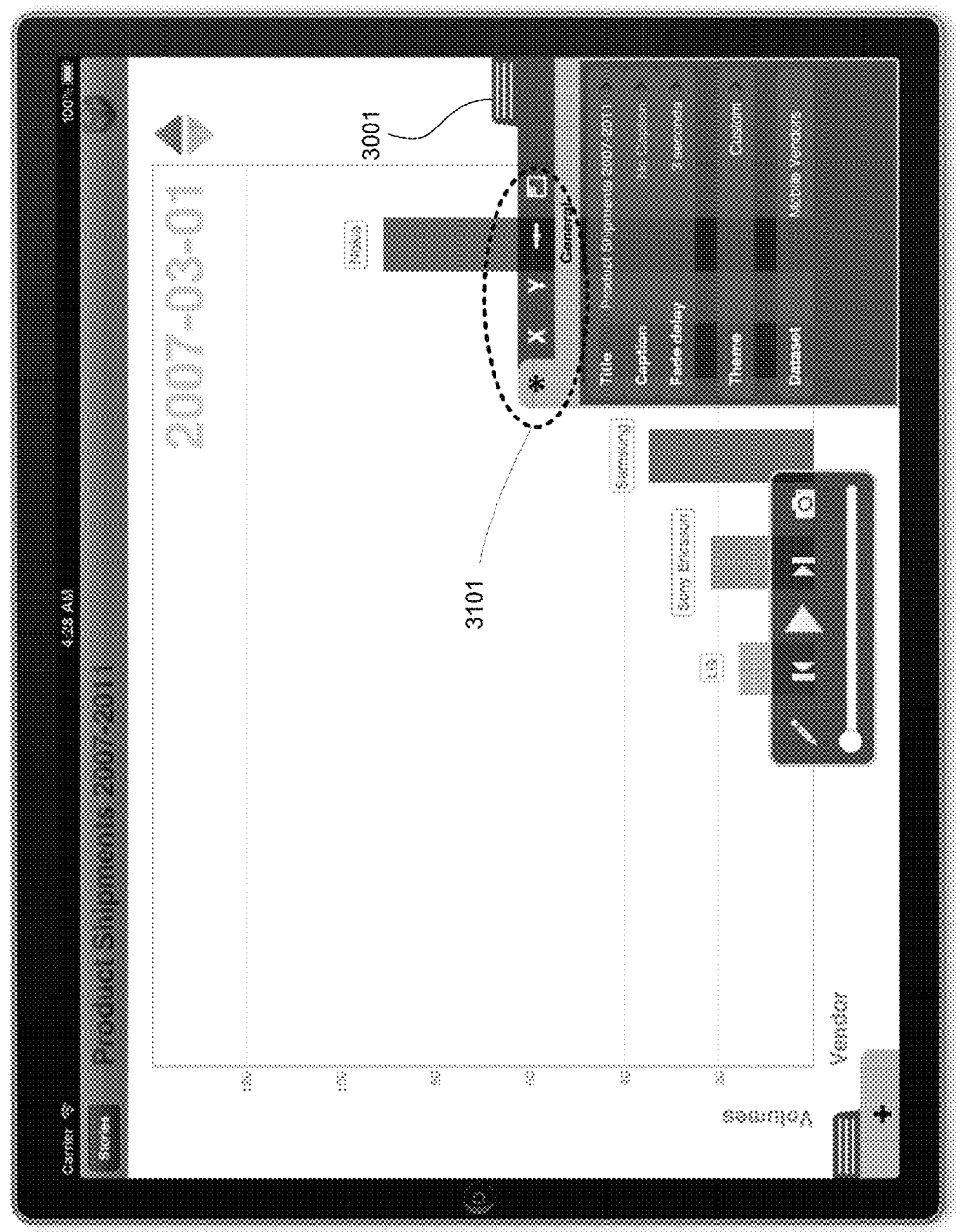
FIG. 31 shows an example of the configuration drawer for manipulating or editing a scene.

FIG. 31 shows an example of the configuration drawer for manipulating or editing a scene. The configuration drawer includes a plurality of input tabs 3101. If a user has permission to edit a scene, the user can modify how this scene is configured using the configuration drawer (bottom left corner), for example, which is opened to present the available options for the scene. In this example, the options provided are general, X dimension, Y dimension, lever, and color in the case of motion bar charts. The set of configurations depends on the type of scene that is presented. If the user does not have rights to edit a scene then the set of configurations are not presented. The general tab includes several items: title of the scene, captions, fade delay, theme, and dataset. Input arrows for each item allow a user to edit that item for the scene.

Figure 32:
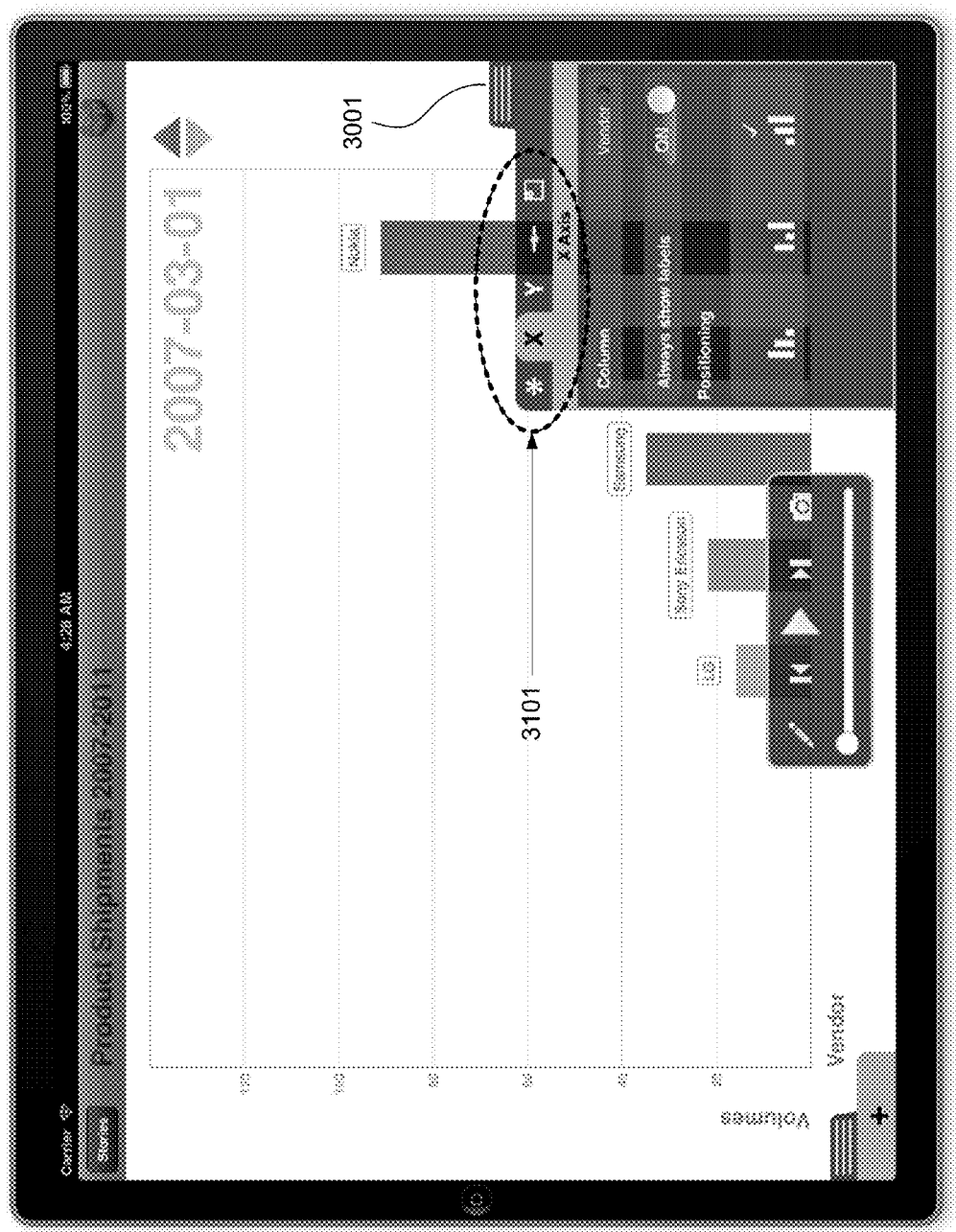
FIG. 32 shows an example of configuration for the X dimension.

FIG. 32 shows an example of the configuration drawer open for the X dimension. This tab includes several input items: column field, labels on toggle, and positioning of the bars of the graph. Input arrows for each item allow a user to edit that item for the scene.

Figure 33:
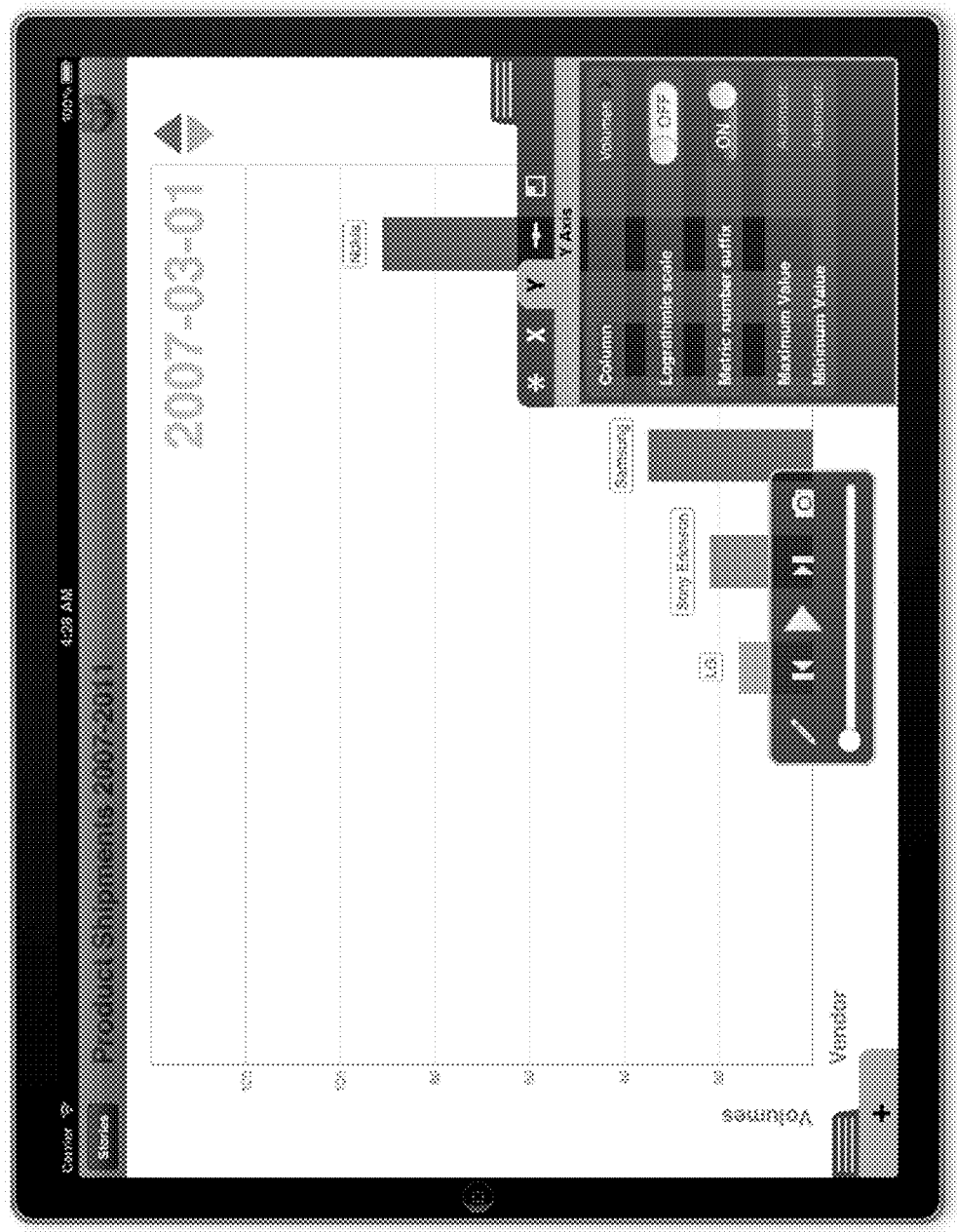
FIG. 33 shows an example of turn on Labels on the Values.

FIG. 33 shows an example the configuration drawer open for the Y dimension. This tab includes several input items: column field, logarithm scale toggle, metric number toggle, maximum value, and minimum value. Input arrows for each item allow a user to edit that item for the scene.

Figure 34:
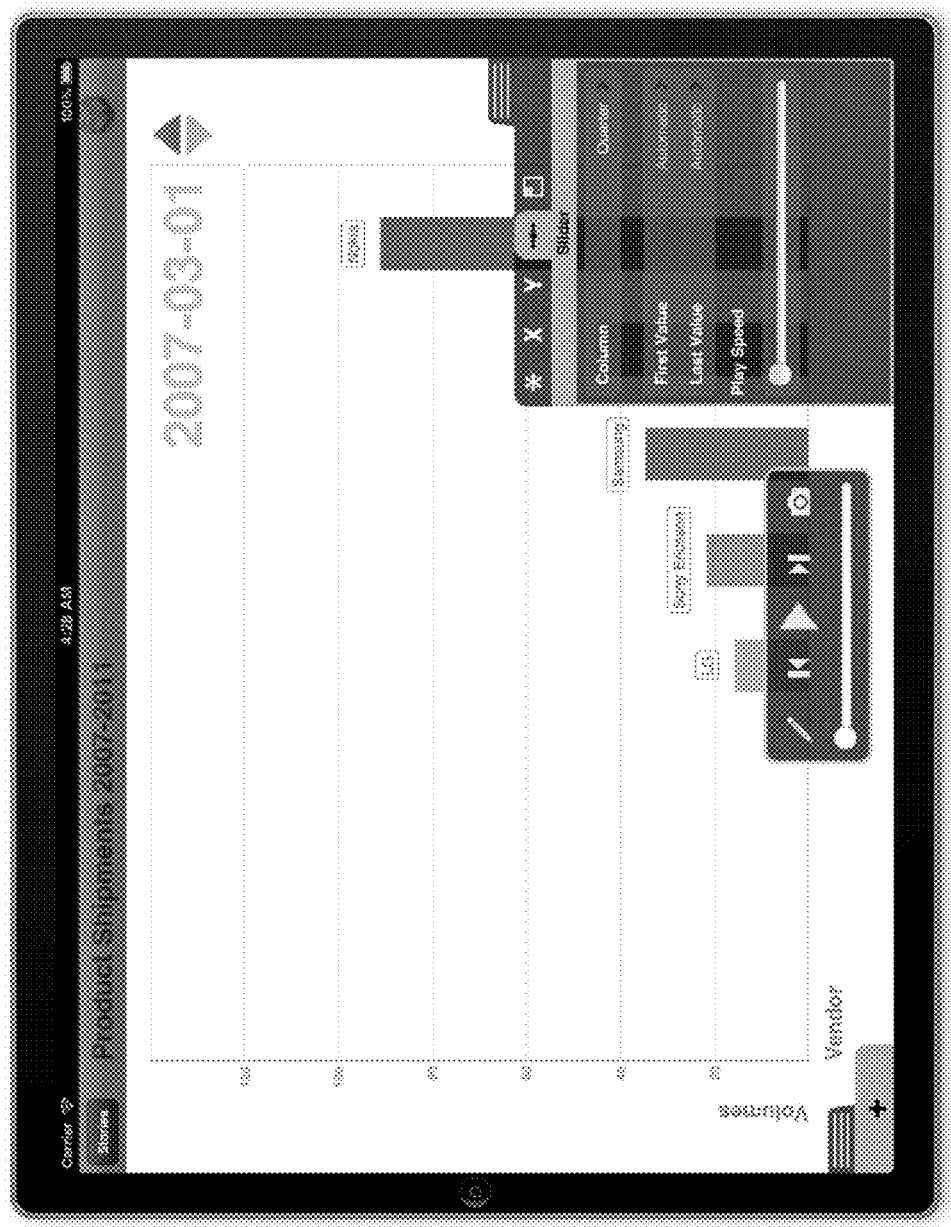
FIG. 34 shows an example of adjusting the slider (also referred to as a lever) and play speed.

FIG. 34 shows an example of the configuration drawer open for the slider (also referred to as a lever) and play speed. This tab includes several input items: timeline for the column, a first value, a last value, and a play speed. Input arrows for each item allow a user to edit that item for the scene.

The user can restrict the data to a smaller subset in any of the dimensions. For example, if the user selects the color tab, the user may then pick what dimension to use to distinguish colors (e.g., company type, or company name.)

Figure 35:
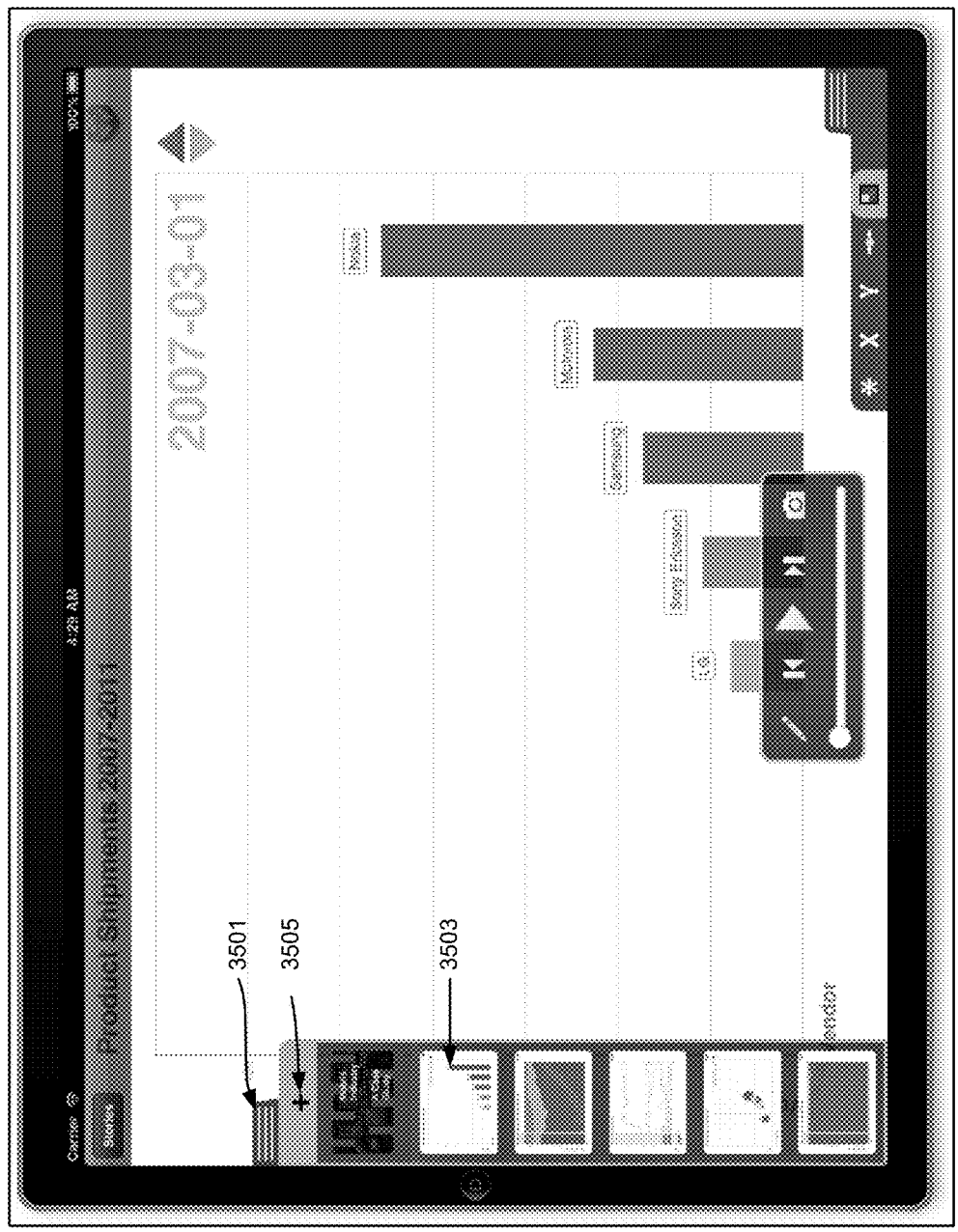
FIG. 35 shows an example of Table of Content drawer. Shown on the left hand side of the screen, a "TOC" or Table of Content drawer may be used to navigate to any other scene (e.g., by scrolling), operate on individual scenes, and move scenes around as part of story editing.

FIGS. 35-39 show an example of use of the Table of Content drawer 3501. As shown on the left hand side of the screen in FIG. 35, a "TOC" or Table of Content drawer may be used to navigate to any other scene (e.g., by scrolling), operate on individual scenes, and manipulate the order of scenes as part of story editing. The content drawer may be expanded, as shown in FIG. 35, to show several thumbnails 3503 corresponding to different scenes in the story in addition to a create scene button 3505.

Figure 36:
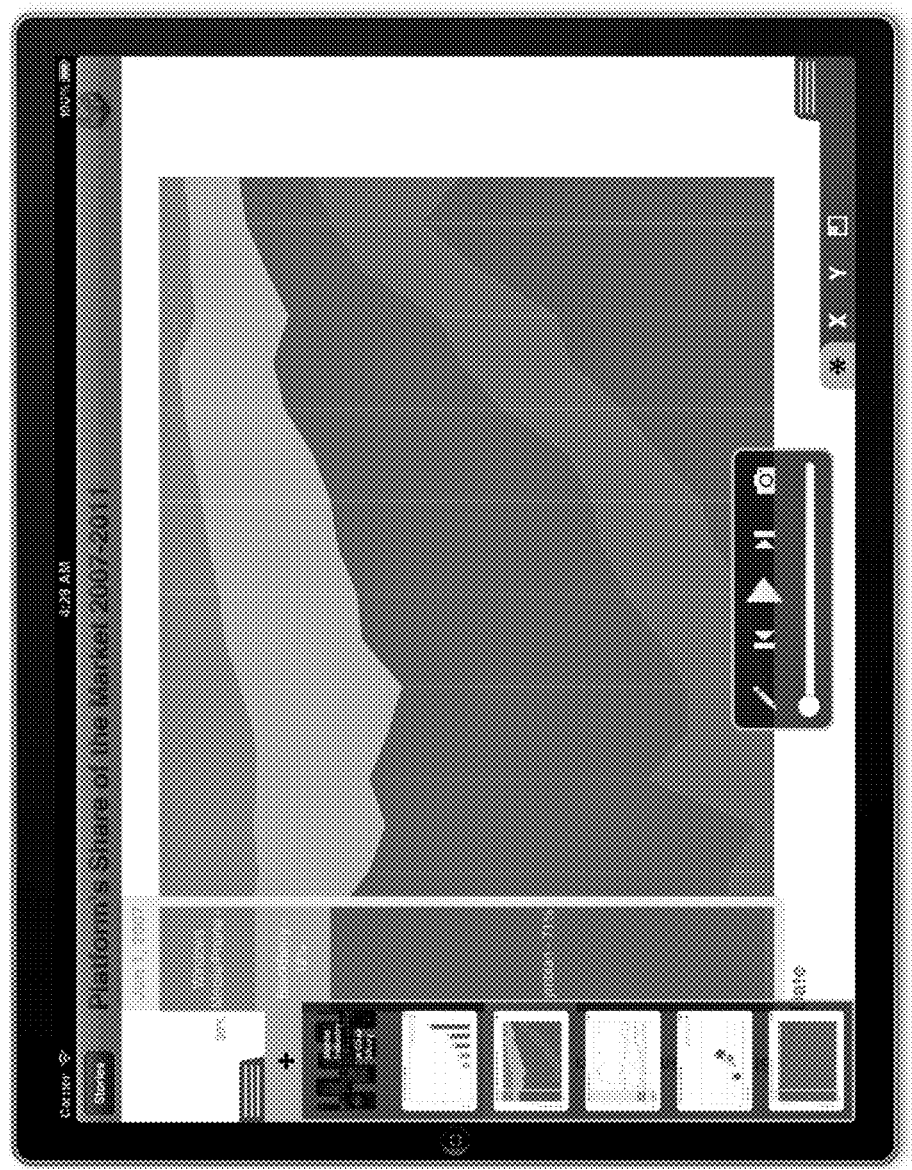
FIG. 36 shows an example of shows an example of switching scenes.

FIG. 36 shows an example of switching scenes by tapping on different scene thumbnails.

Figure 37:
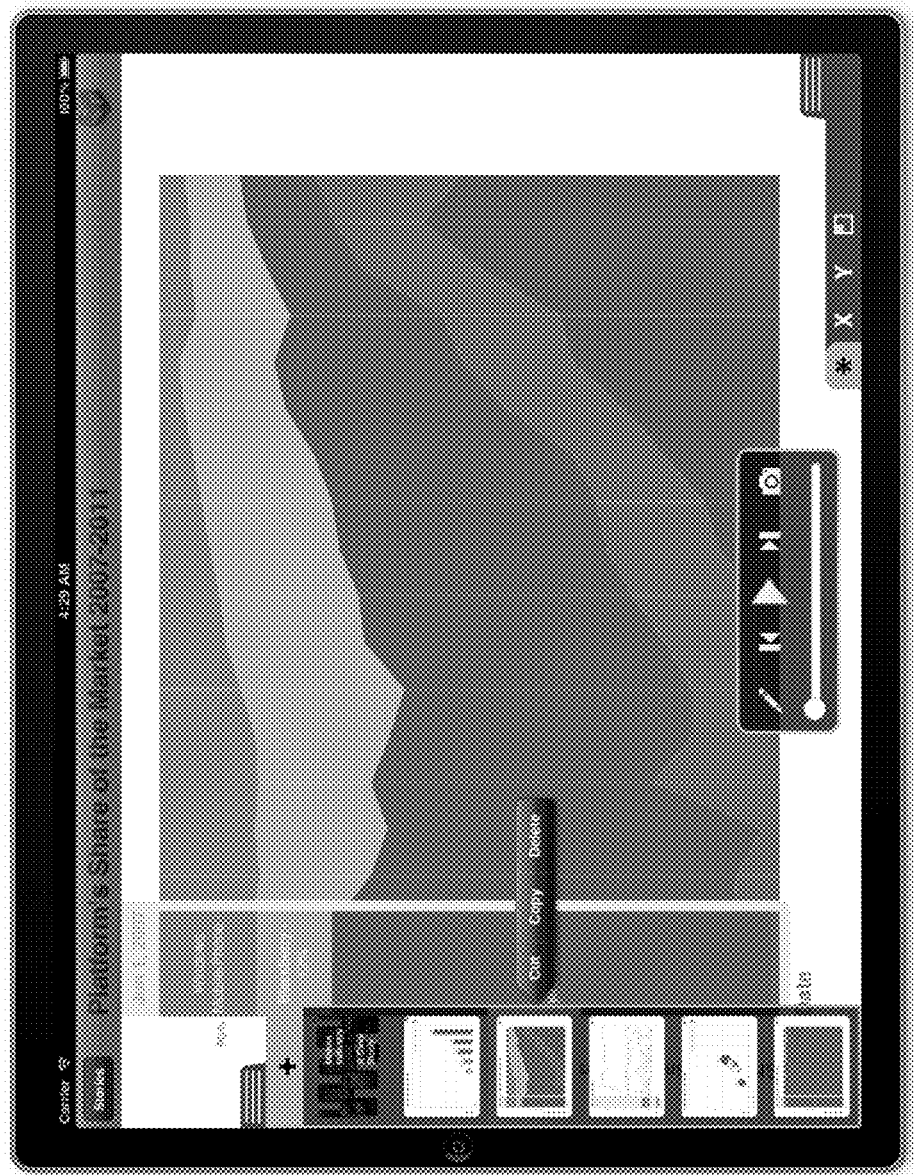
FIG. 37 shows an example of operating on a scene by tapping on its thumbnail and holding.

FIG. 37 shows an example of operating on a scene by tapping on its thumbnail and holding. Selecting a thumbnail causes a popup menu to populate with inputs: cut, copy, and delete. Selecting an input manipulates the scene accordingly.

Figure 38:
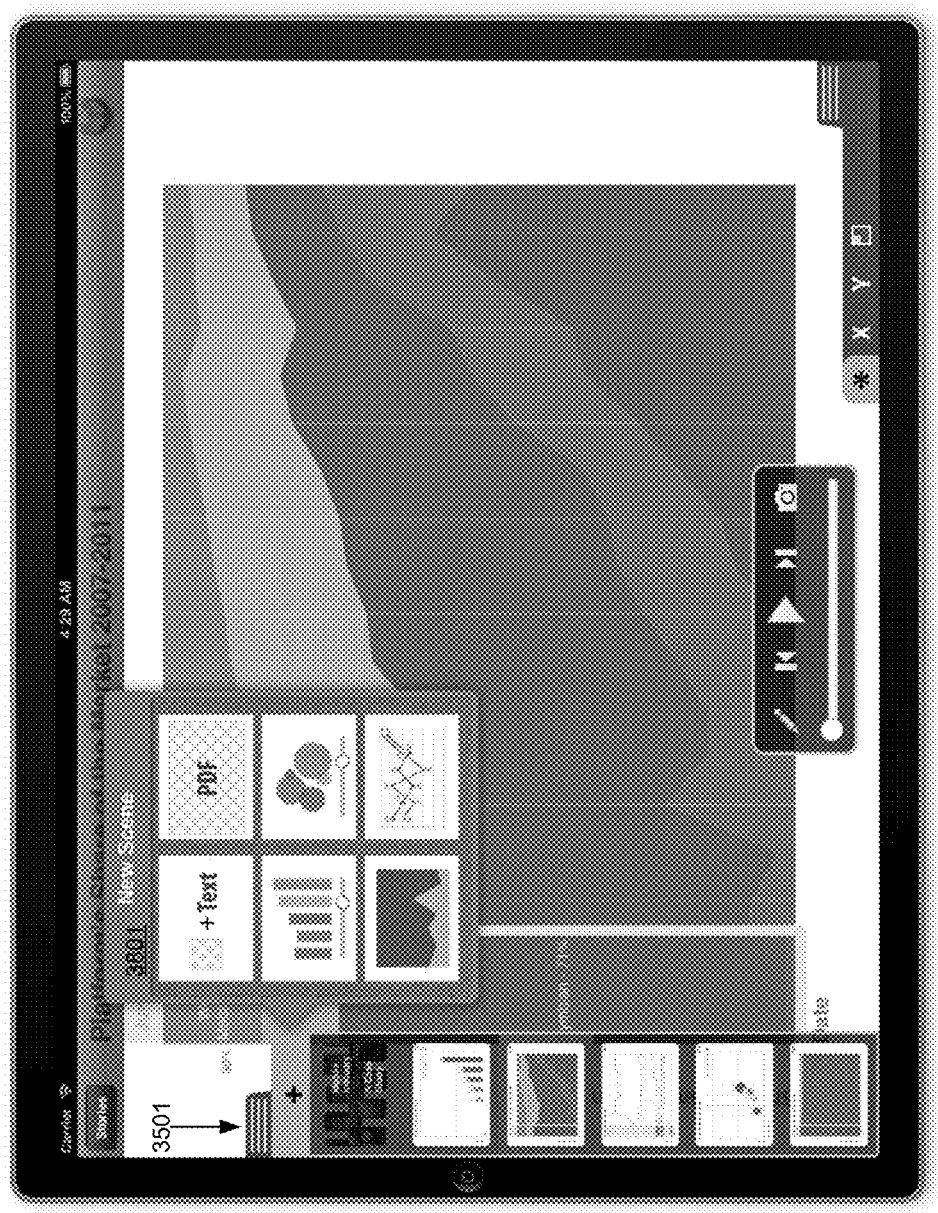
FIG. 38 shows an example of creation of a new scene right after the current scene by tapping the Create (+) button.

FIG. 38 shows an example of creation of a new scene right after the current scene by tapping the create scene (+) button 3505. Selecting the create scene button causes a popup menu 3801 to populate with thumbnails depicting several preconfigured scene types, such as image plus text, pdf, bar chart, bubble chart. The user chooses what type of scene to create by selecting a thumbnail. In another example, the Perspective application can decide what type of scene to create for the particular dataset(s) that has been imported (e.g., as described in the auto configuration section.)

Figure 39:
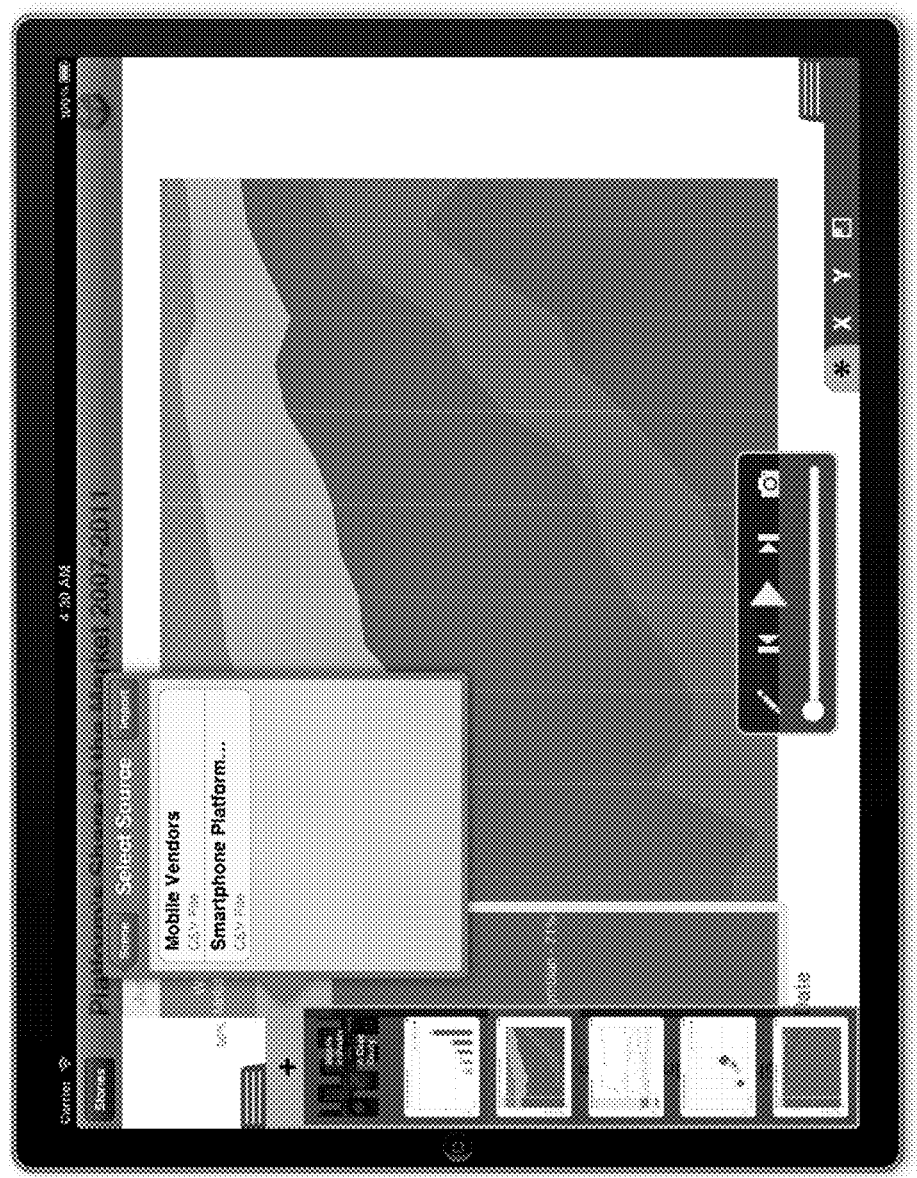
FIG. 39 shows an example of picking a dataset to be imported.

FIG. 39 shows an example of picking a dataset to be imported for a particular scene. Datasets may reside on the device or they may be downloaded from other servers over the network, or may be shared via the network.

Figure 40:
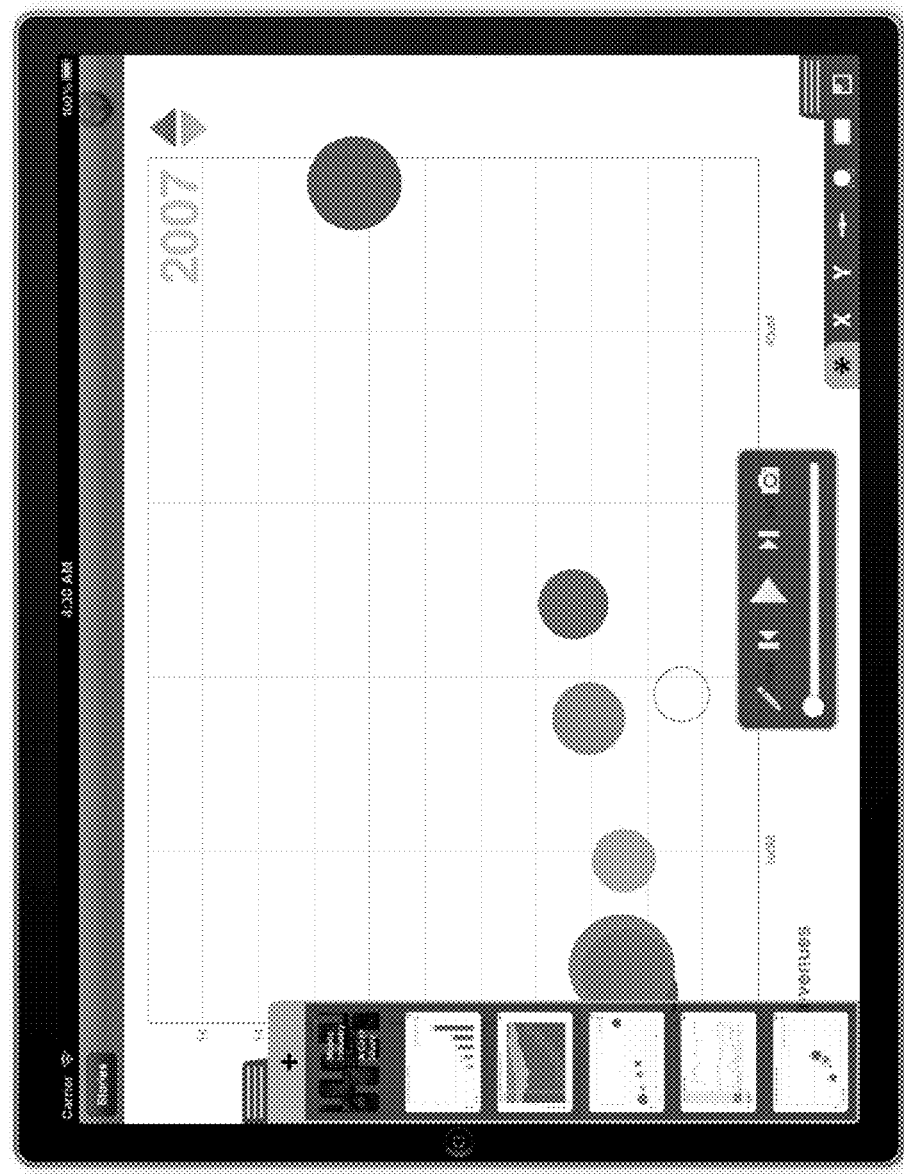
FIG. 40 shows an example of a Scene that is automatically created from imported data.

FIG. 40 shows an example of a Scene that is automatically created from imported data. The Perspective application uses the digest service to load different kinds of data, perform statistical analysis over a sample of the data, and use heuristics to make an informed deduction to configure a chart properly (e.g., a discussed above in the digest service section.) The digest service may be defined in the client or on the server (which may require content or a sample of the content to be transferred from the client to the server the server does not have the content or peering is not enabled). Digest services also can learn from user behavior to pick appropriate defaults for different data sets. A title for this scene is generated using digest service.

FIGS. 41-53 show importation and manipulation of datasets for scenes in a story. In this example, the story is about coffee.

Figure 41:
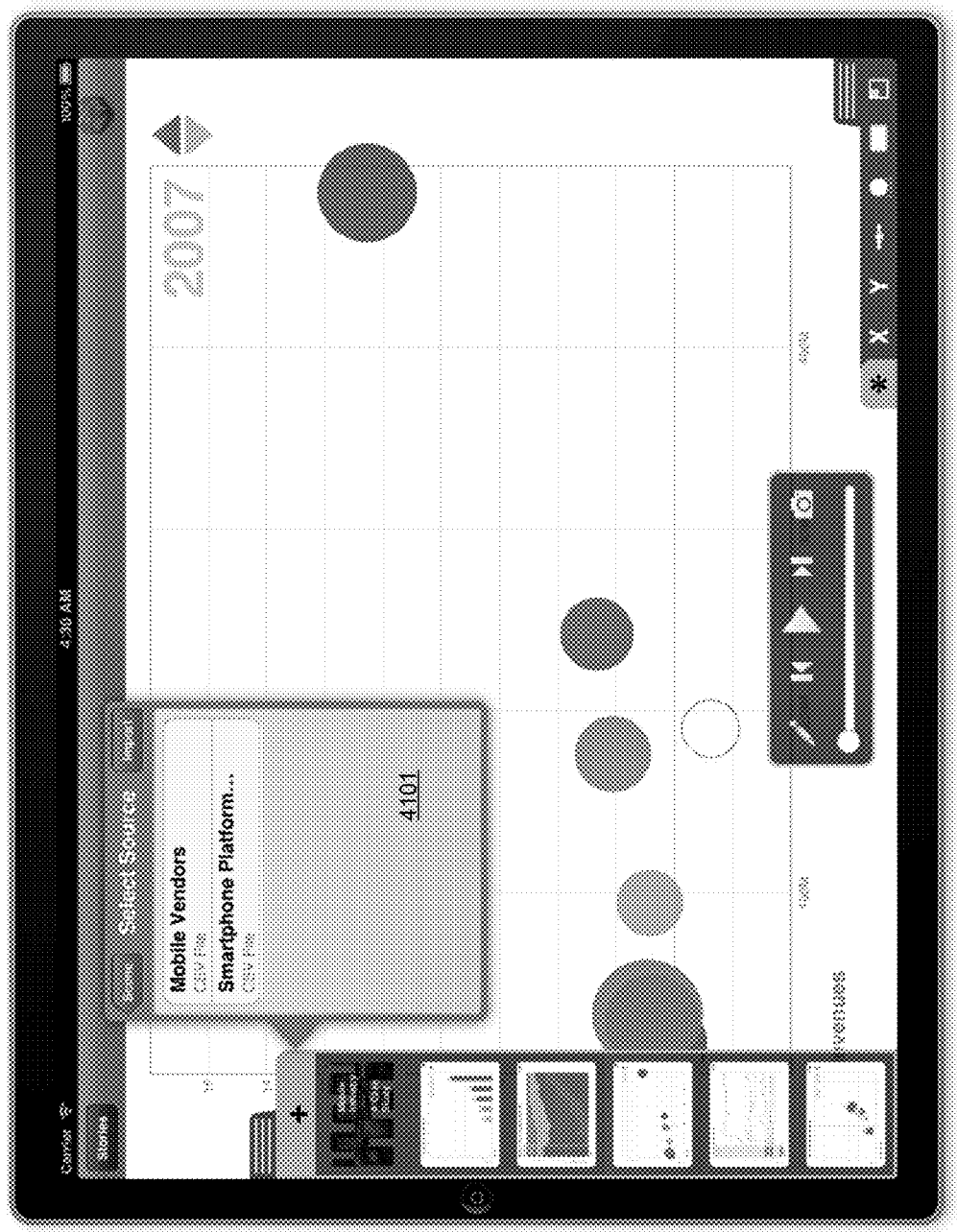
FIG. 41 shows an example of importation of datasets from other sources.

FIG. 41 shows an example of importation popup interface 4101 used to import datasets from other sources. The interface includes a scene selection input, a list of possible datasets (e.g., Mobile vendors and Smartphone Platform), and an import input used to import the dataset selected from the list. This interface provides Search and Browse as additions allowing a multiplicity of back ends to be integrated and loading of datasets from other sources of information, for example, a NASDAQ dataset, which shows the value of a NASDAQ stock, or a weather dataset which shows weather in different locations or regions in the country.

Figure 42:
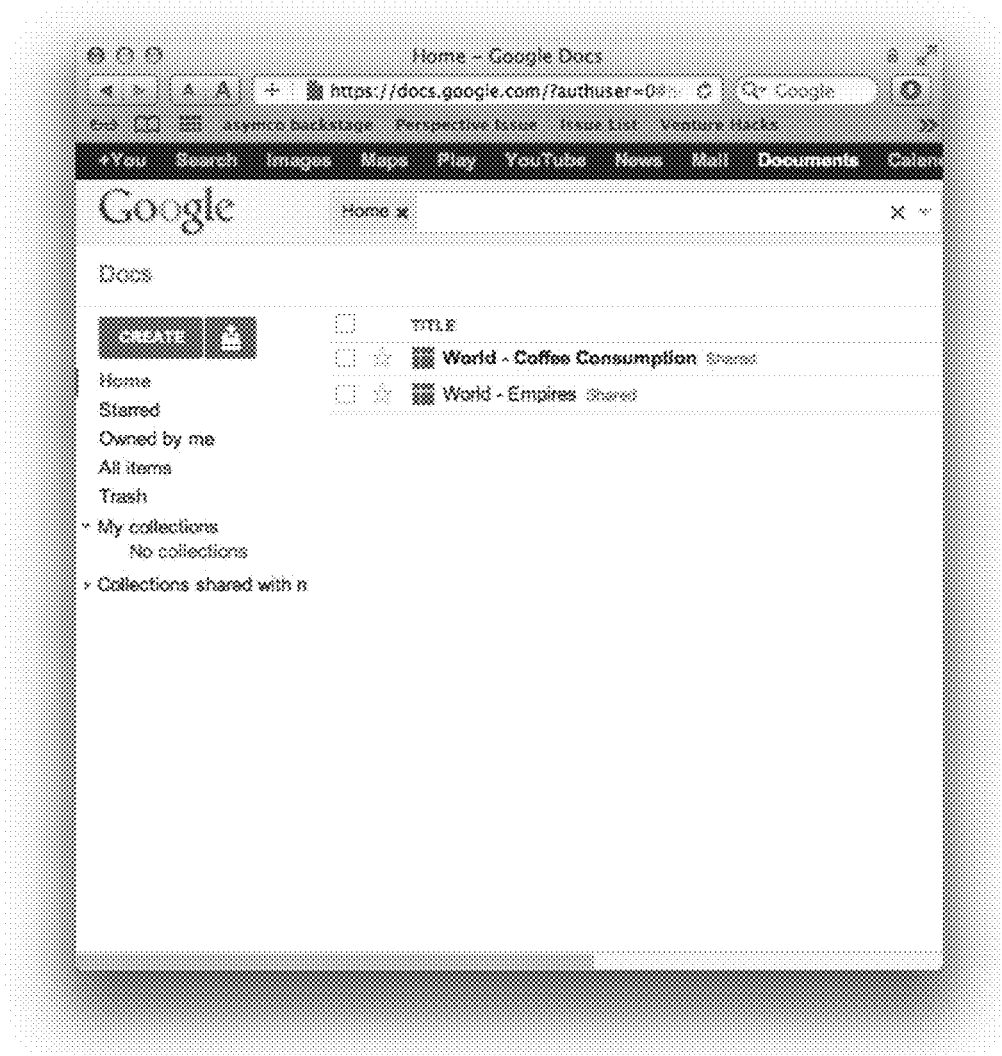
FIG. 42 shows an example of data source provider.

FIG. 42 shows an example of data source provider. A user may access a data source provider to obtain a dataset in its raw data format. In this example: GOOGLE Docs with its Spreadsheet document provides two datasets: World Coffee Consumption and World Empires.

Figure 43:
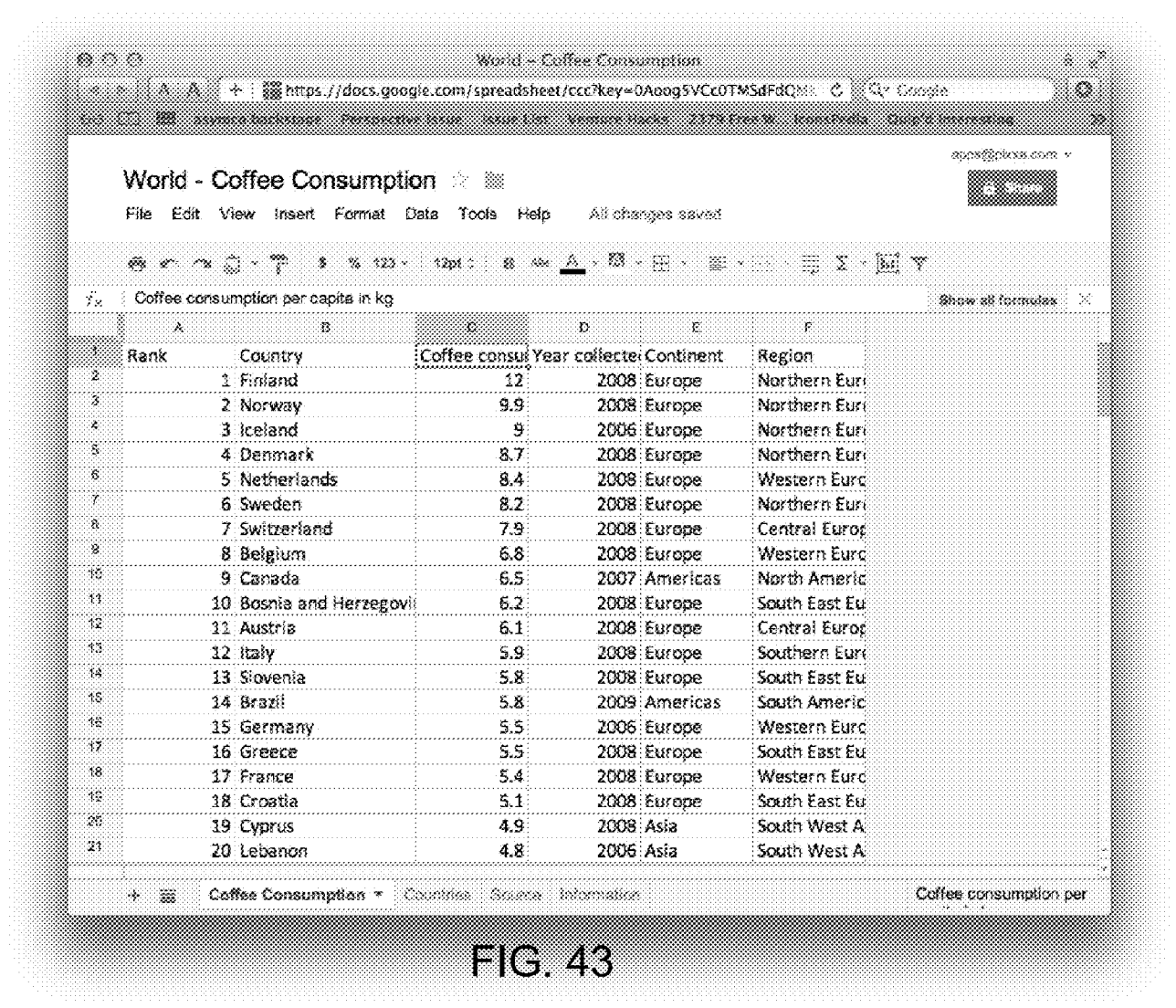

FIG. 43 shows an example of the dataset associated with World Coffee Consumption. In this example, World Coffee Consumption is a spreadsheet (i.e., "structured data") each column having a certain type. As explained above, using the Perspective application, the user does not have to indicate what type each column is or what to do with it before importing. The Perspective application analyses the dataset to deduce dimensions and fields based on available heuristics data organization/types, as described above using the digest service. The digest service digests or processes the dataset in its raw format to generate a native dataset for use with any scene in a story performed the Perspective application.

Figure 44:
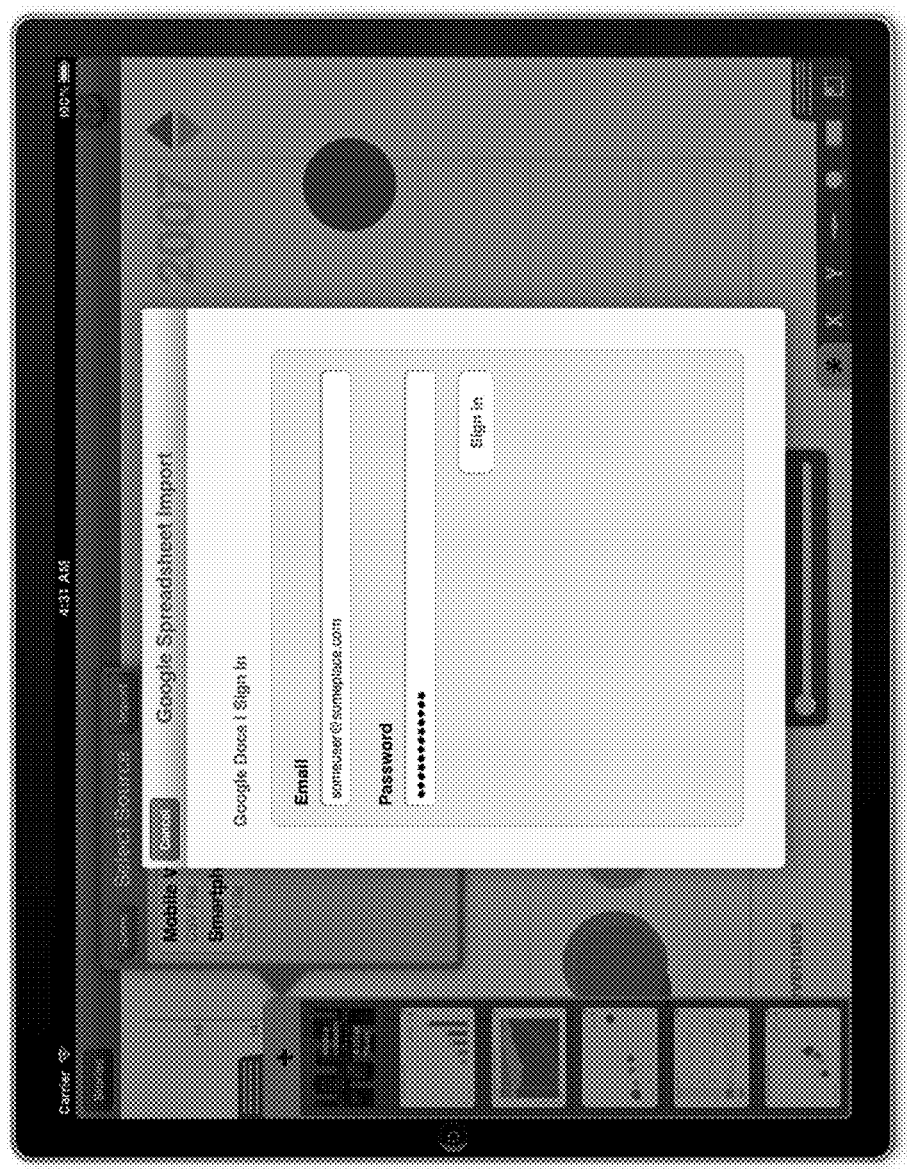
FIG. 44 shows an example of authentication.

FIG. 44 shows an example of authentication. In one example, a user may be required to enter third-party service credentials to authenticate and see the list of authorized documents provided by the data source provider. After authentication, the data is downloaded to the App. If a server-based digest service is required, the server receives a copy of the raw data from the client, and returns the appropriate interpreted data as a native dataset through a secure channel.

Figure 45:
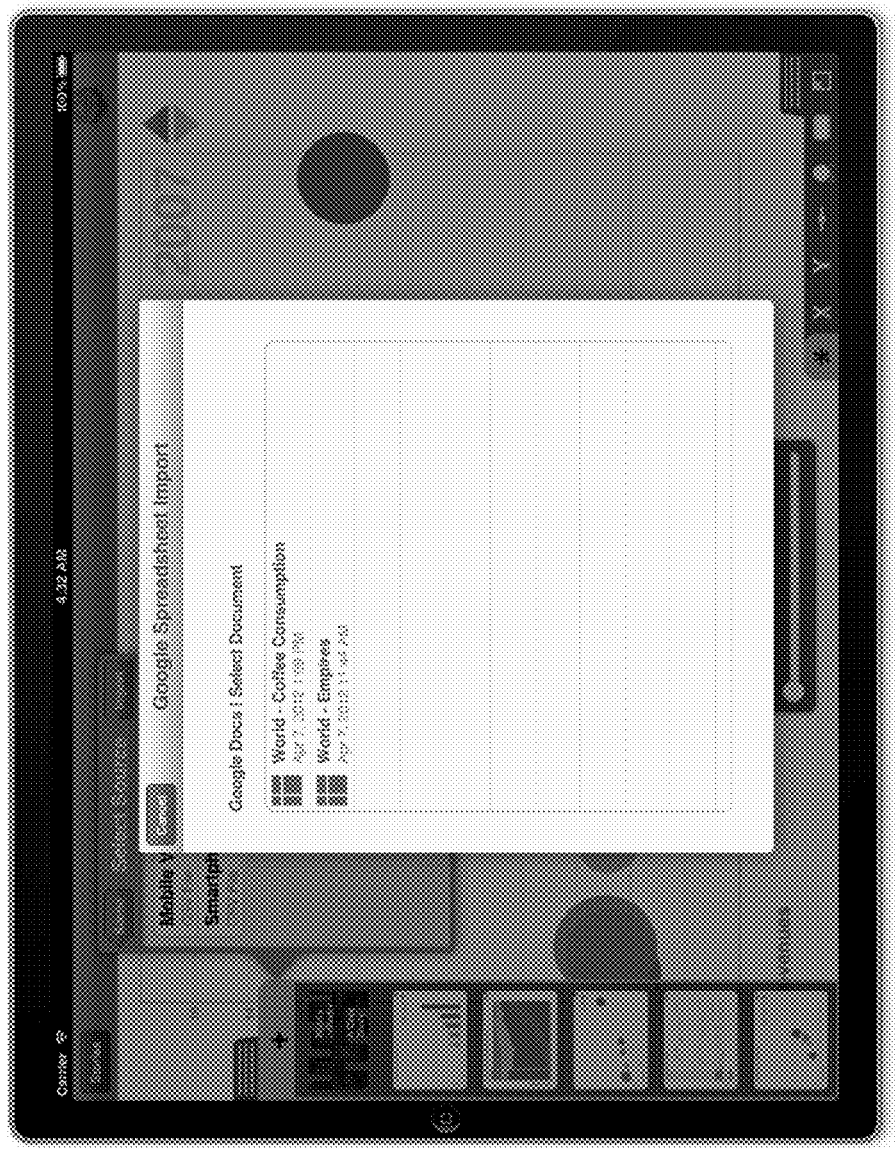
FIG. 45 shows an example of selecting documents for importation.

FIG. 45 shows an example of selecting documents for importation. In this Example: two datasets are available: World Coffee Consumption and World Empires. In the following examples, the user has selected "World Coffee Consumption" for importation.

Figure 46:
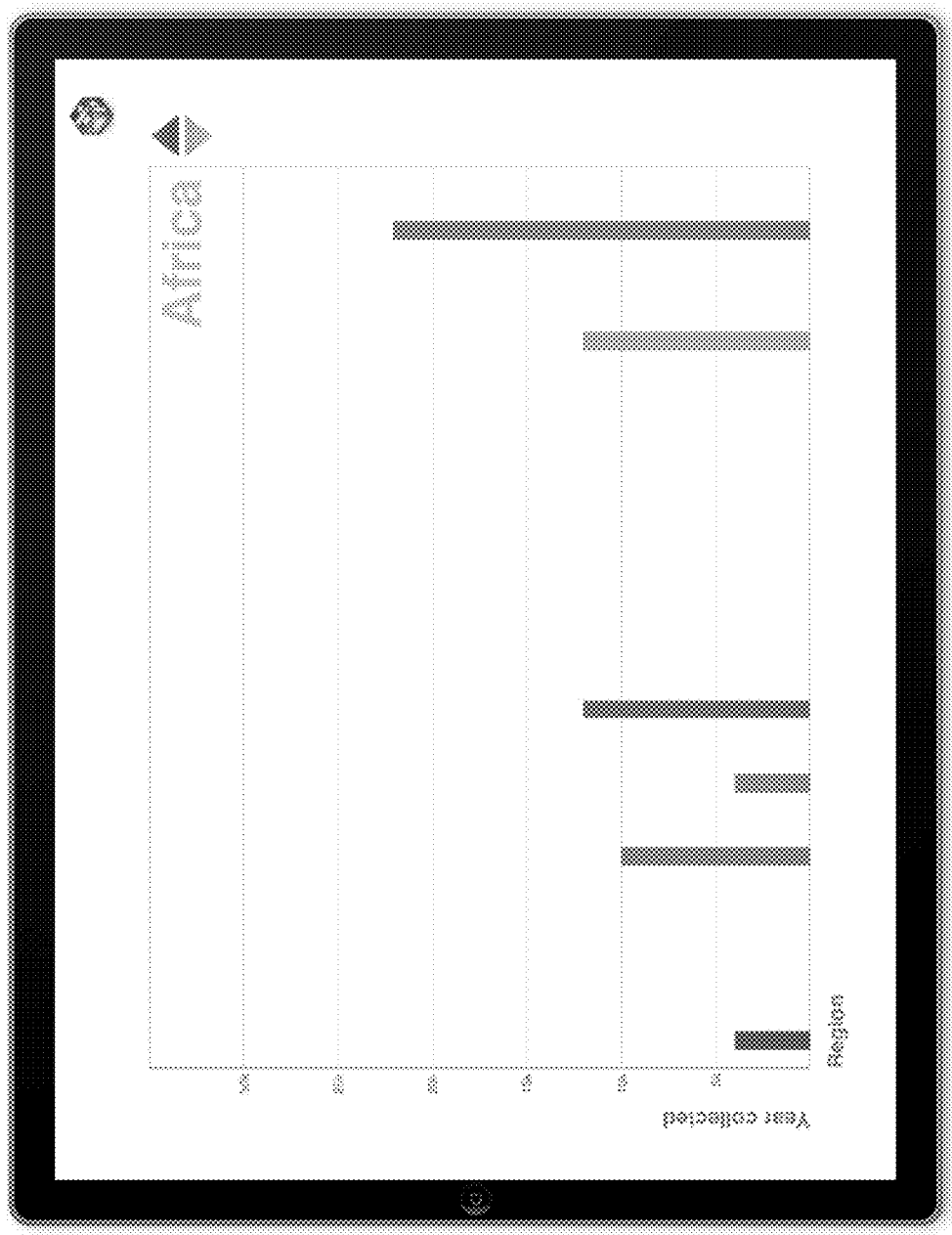
FIG. 46 shows an example of scene in which the software automatically picked the dimensions based on the chart type.

FIG. 46 shows an example of scene in which the Perspective application automatically picked the dimensions based on the chart type. In this example, for the dataset World Coffee Consumption, the Perspective application picked the fields "continents" for the lever, and "region" for the X Axis, and "Year Collected" for Y Axis as the dimensions for the scene.

Figure 47:
FIG. 47 shows an example of how the user may edit the scene and/or override the App's decision by changing the Y Axis in which the Chart automatically reflects the change.

FIG. 47 shows an example of how the user may edit the scene and/or override the Perspective application's decision. In this example, the user selects the field "Coffee consumption per capita in Kg for the dimension on the Y axis. By changing the Y Axis, the chart presented in the scene automatically reflects the change of field for the selected dimension.

Figure 48:
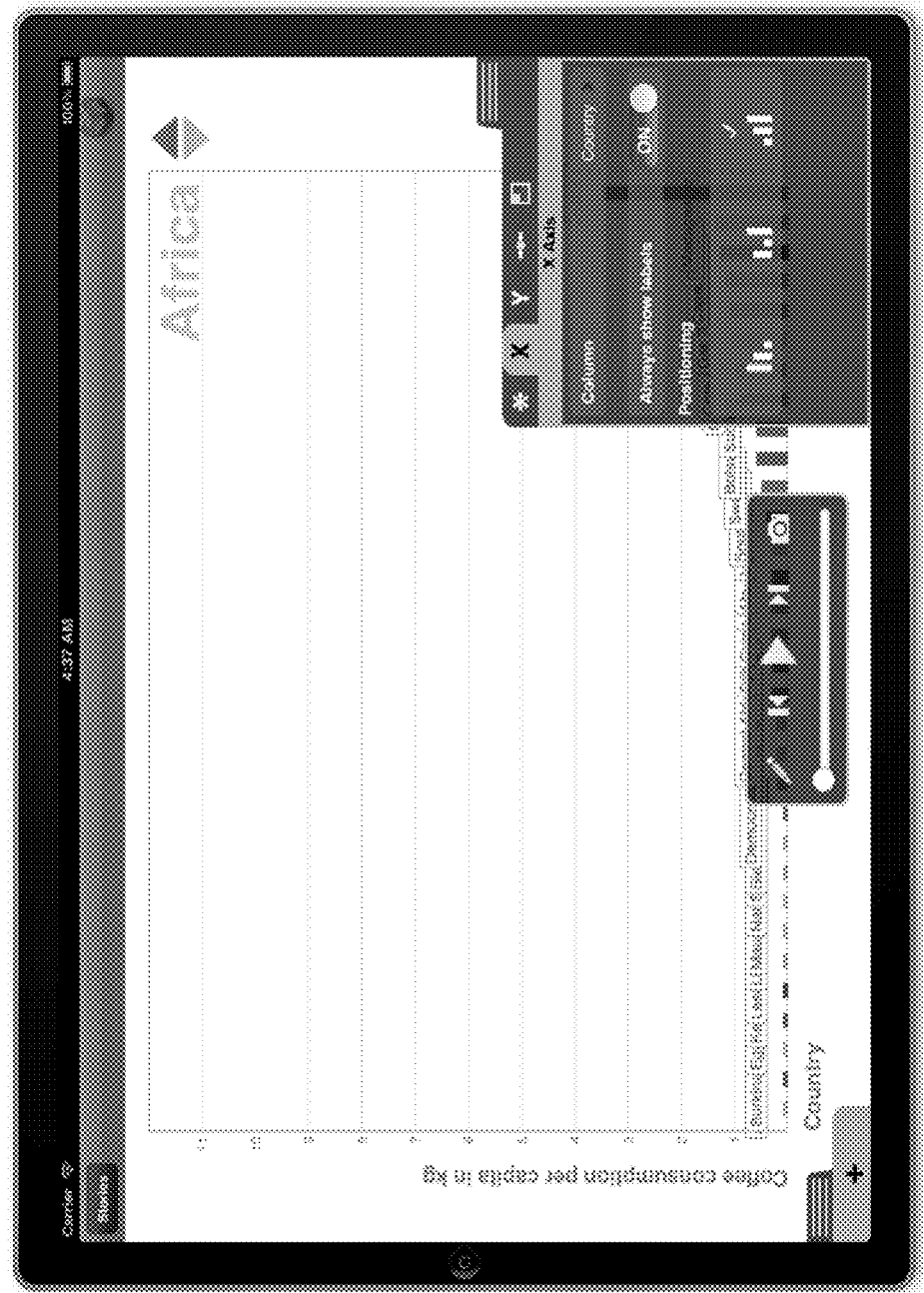

FIG. 48 shows an example of how a user may further configure the dimensions of the chart by selecting the X tab of the configuration drawer and setting the chart in ascending order and turning labels on.

Figure 49:
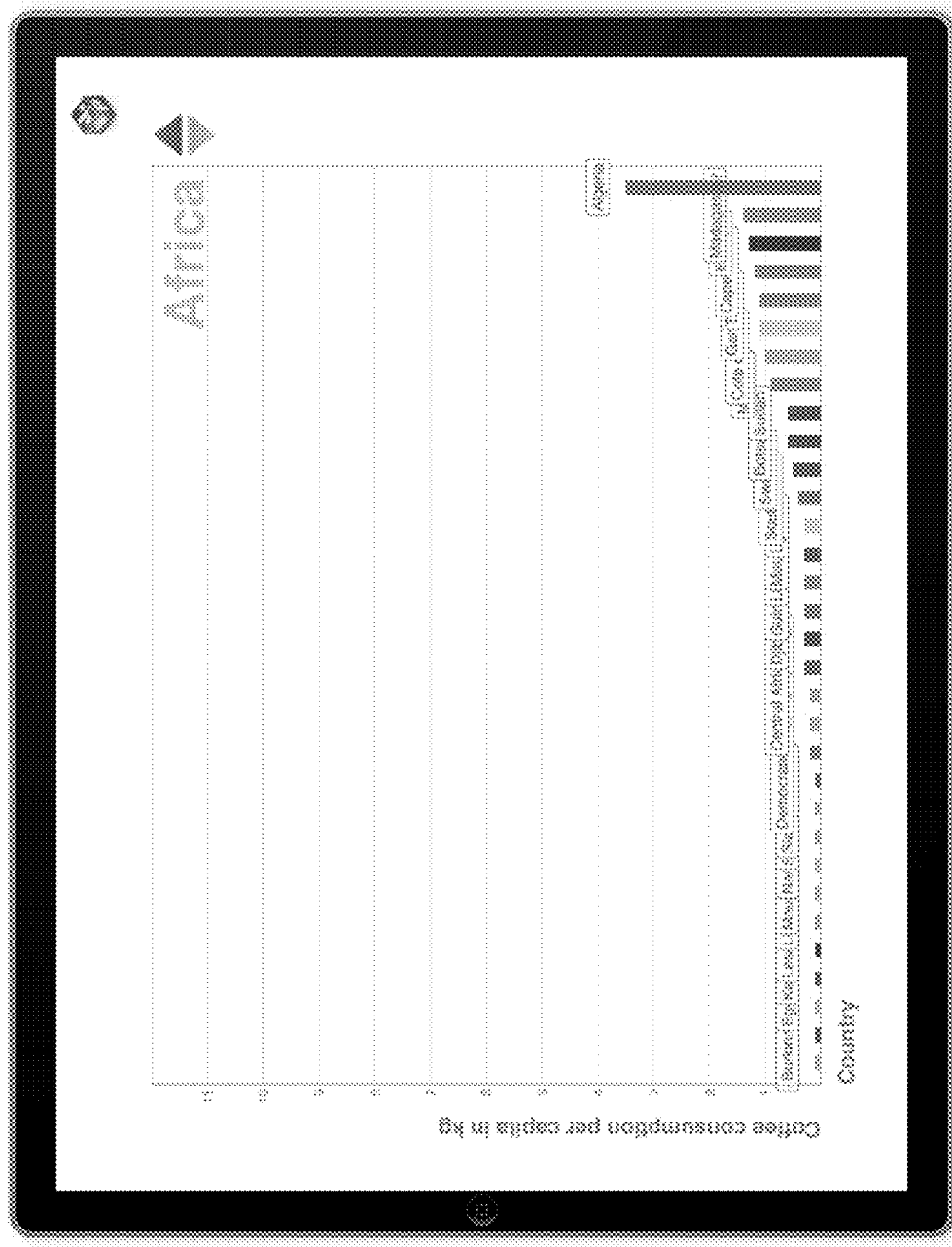
FIG. 49 shows an example of browsing the Data Set imported.

FIG. 49 shows an example of browsing the dataset imported. In this example, Algeria consumes more coffee than the rest of Africa in coffee by a large margin. So the user may limit the X Dimension while keeping sorting, (e.g., to see Top 10).

Figure 50:
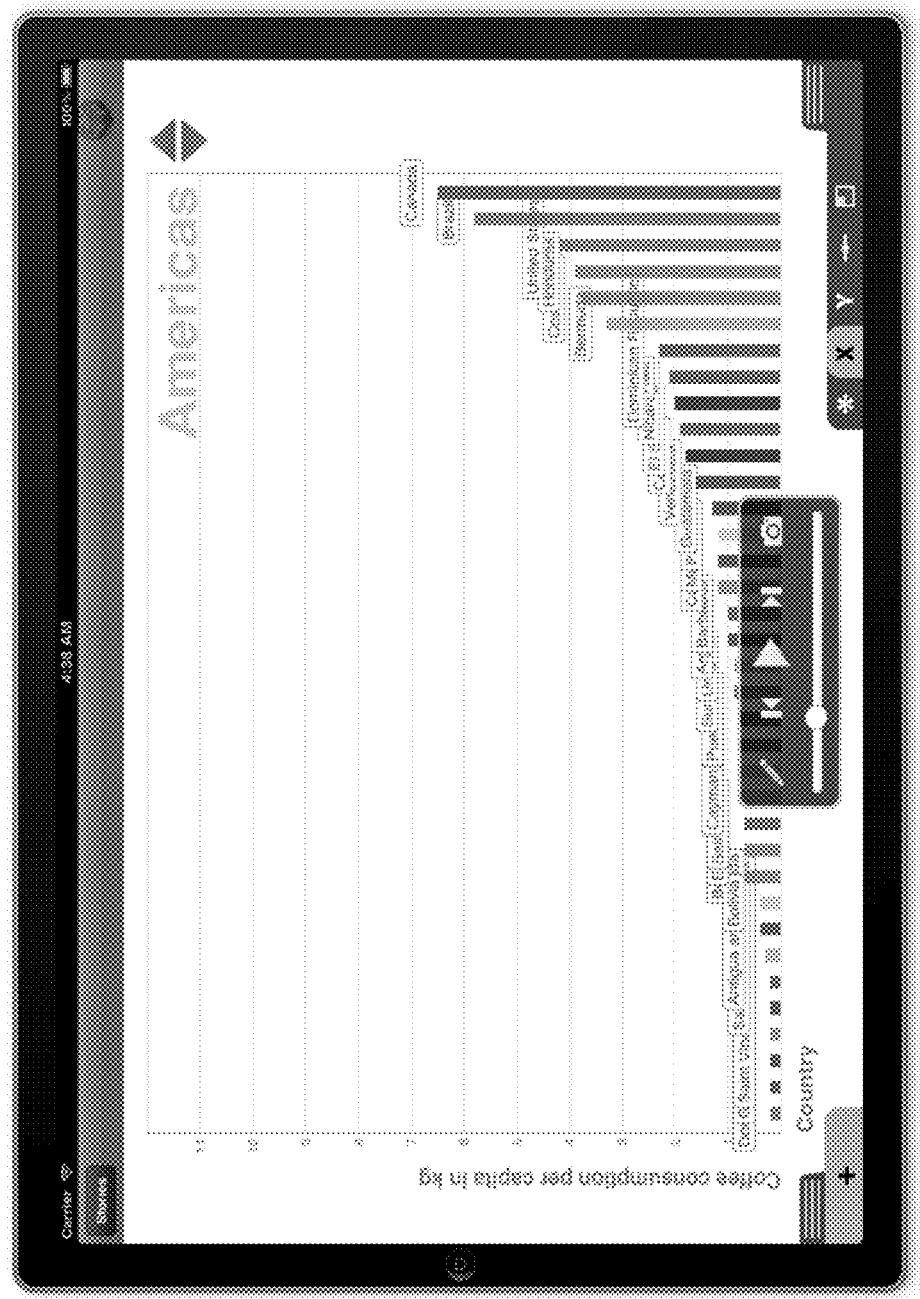
FIG. 50 shows an example of selecting for the scene for coffee consumption.

FIG. 50 shows an example of selecting for the scene for coffee consumption. Selecting play in animates a sequence of continents and corresponding chart for their coffee consumption. In this example, colors designate different regions within the Continent.

Figure 51:
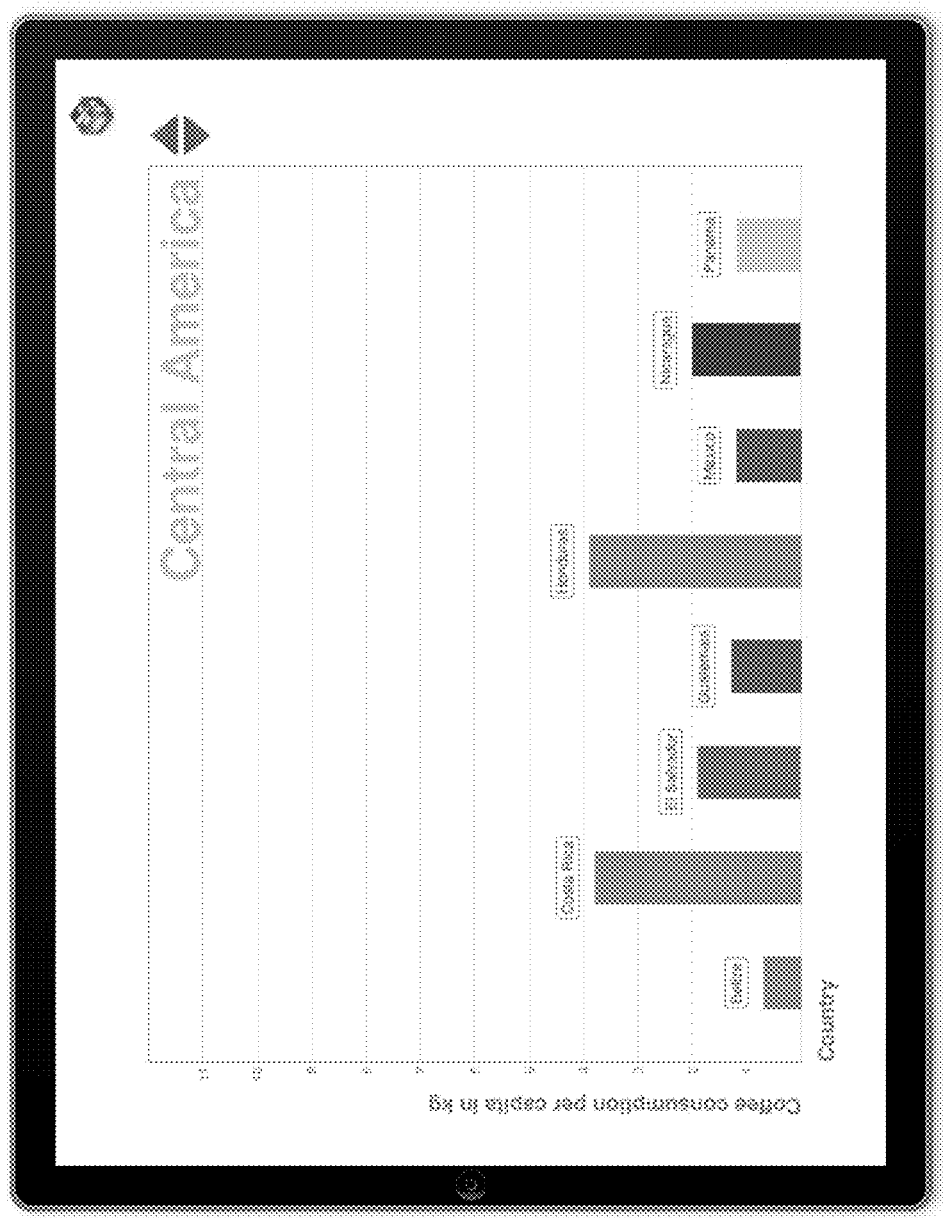
FIG. 51 shows an example of changing the Z Dimension of the coffee consumption example to another field of the dataset, such as region.

FIG. 51 shows an example of changing the Z dimension of the coffee consumption example to another field of the dataset. In this example, the user has switched from Continents to region.

Figure 52:
FIG. 52 shows an example of notification.

FIG. 52 shows an example of notification of changes to dataset. In the example, shown the notification is presented in the general tab of the configuration drawer. If a corresponding dataset is changed for any reason, the user is notified (e.g., by the system or by another user). In this example, a reload or refresh symbol/icon is presented in the drawer next to the dataset. Selecting the reload icon on the dataset reference seamlessly downloads the latest data. The software attempts to re-use the same configuration as before. If the dataset schema has changed, the data is routed through the digest service and new values are chosen.

Figure 53:
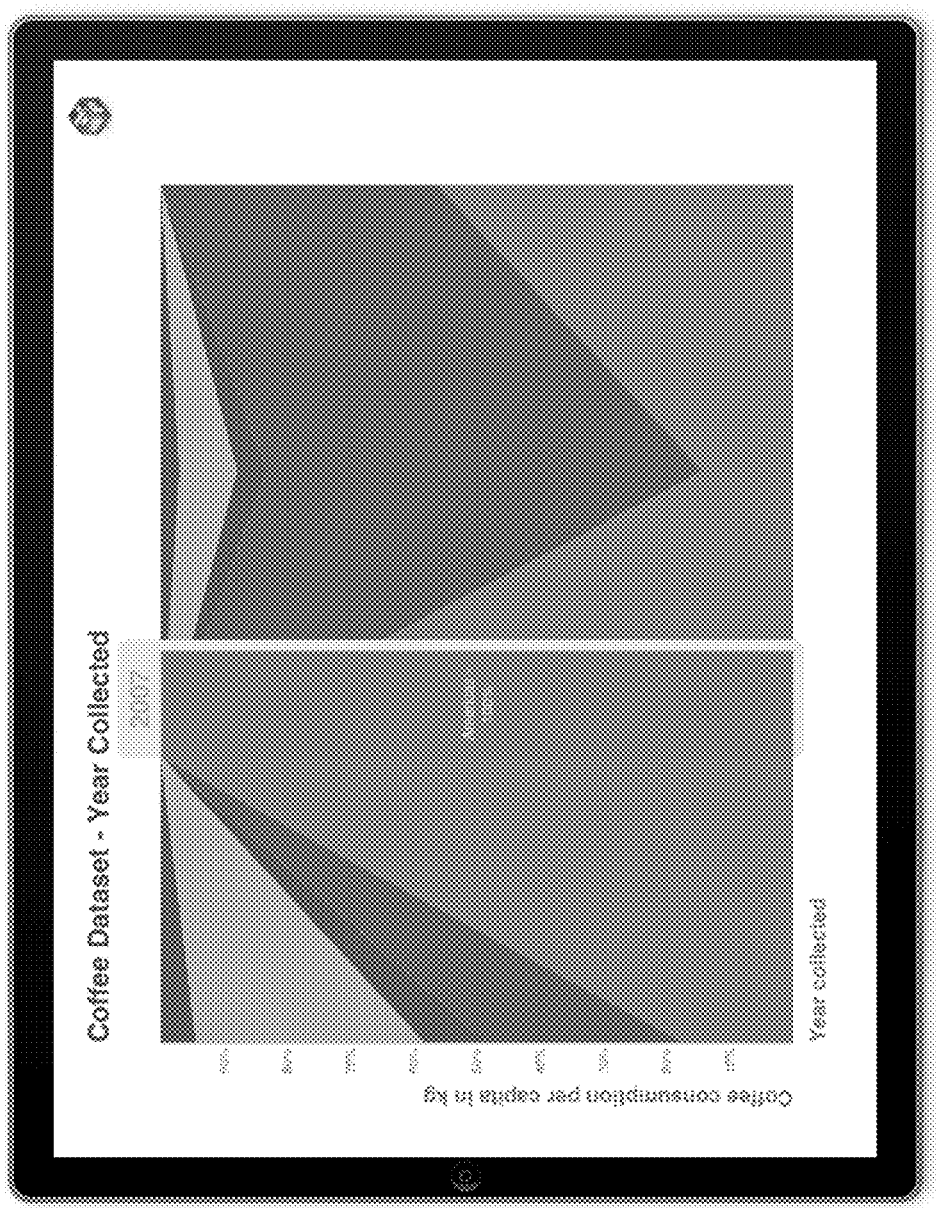
FIG. 53 shows an example of how once a dataset is loaded, the dataset can be shown in other scenes using other visualizations.

FIG. 53 shows an example of how once a dataset is loaded, the dataset can be shown in other scenes using other visualizations.

Additional Embodiments

FIGS. 54-59 show additional features and elements of the Perspective application and the underlying operations that provide these features.

Figure 54:
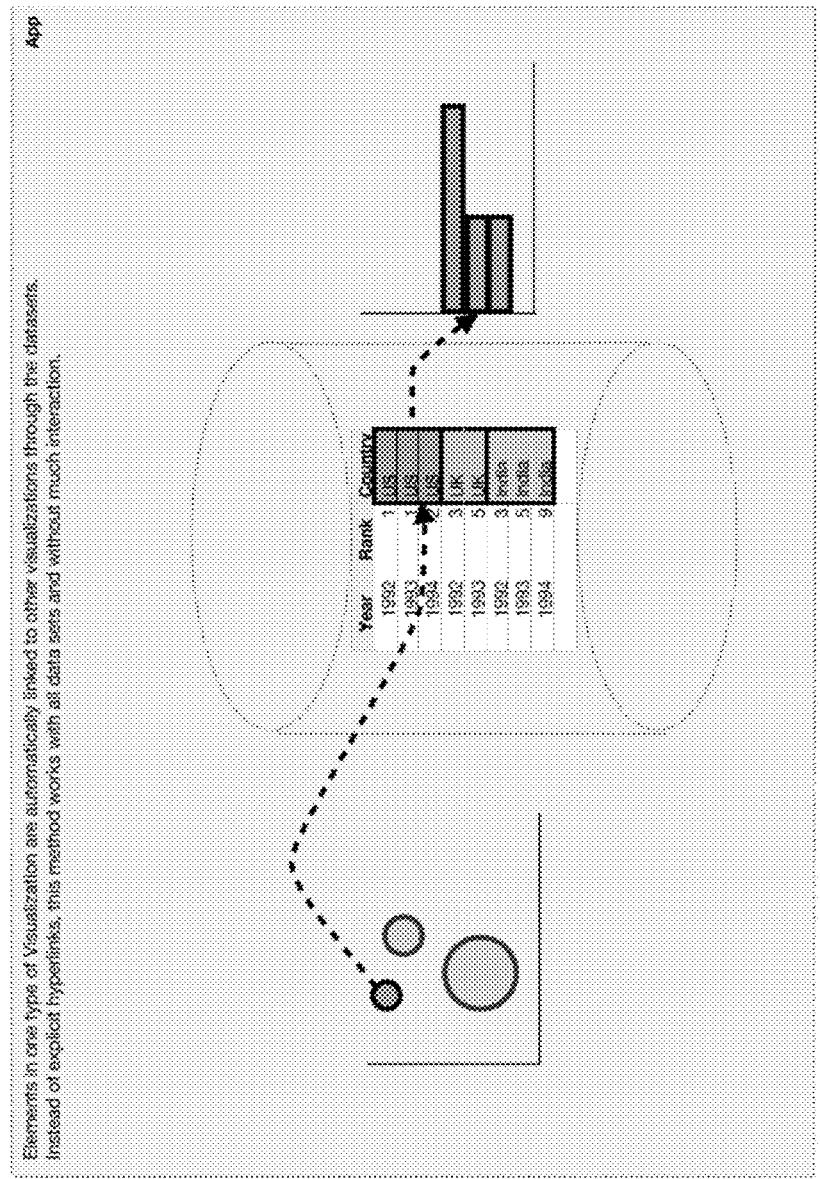
FIG. 54 shows a block flow diagram of an example of automatic context specific hyperlinks.

FIG. 54 shows a block flow diagram of automatic context specific hyperlinks. Data in one visualization may be summarized; however, the data can link to many other elements in a different visualization. The linking happens in context and via the data that is being summarized.

Figure 55:
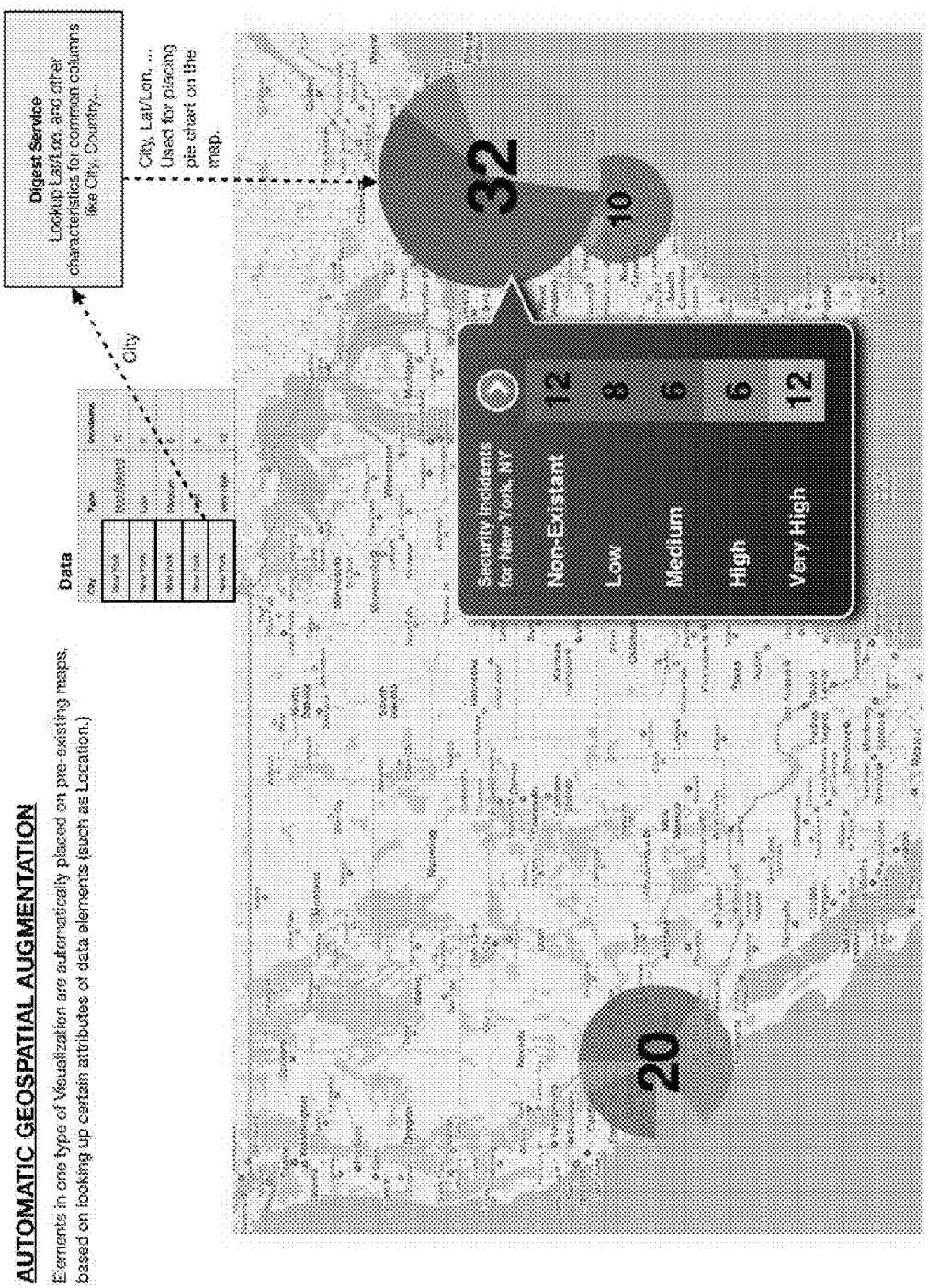
FIG. 55 shows a block flow diagram of an example of automatic geospatial augmentation.

Elements in one type of visualization may be automatically placed on pre-existing maps, based on looking up certain attributes of data elements (e.g., location). FIG. 55 shows on such example for a block flow diagram of automatic geospatial augmentation. In this example, a dataset includes security incidents for New York City including a type (e.g., non-existent, low, medium, high, and very high) and the number of incidents. The digest service automatically looks up a latitude, a longitude, and other characteristics for common columns (e.g., city and country). In this case, location names within a data source are linked to specific longitude/latitude values based on the name of the location without user involvement and are placed in a scene (e.g., a map the United States).

Figure 56:
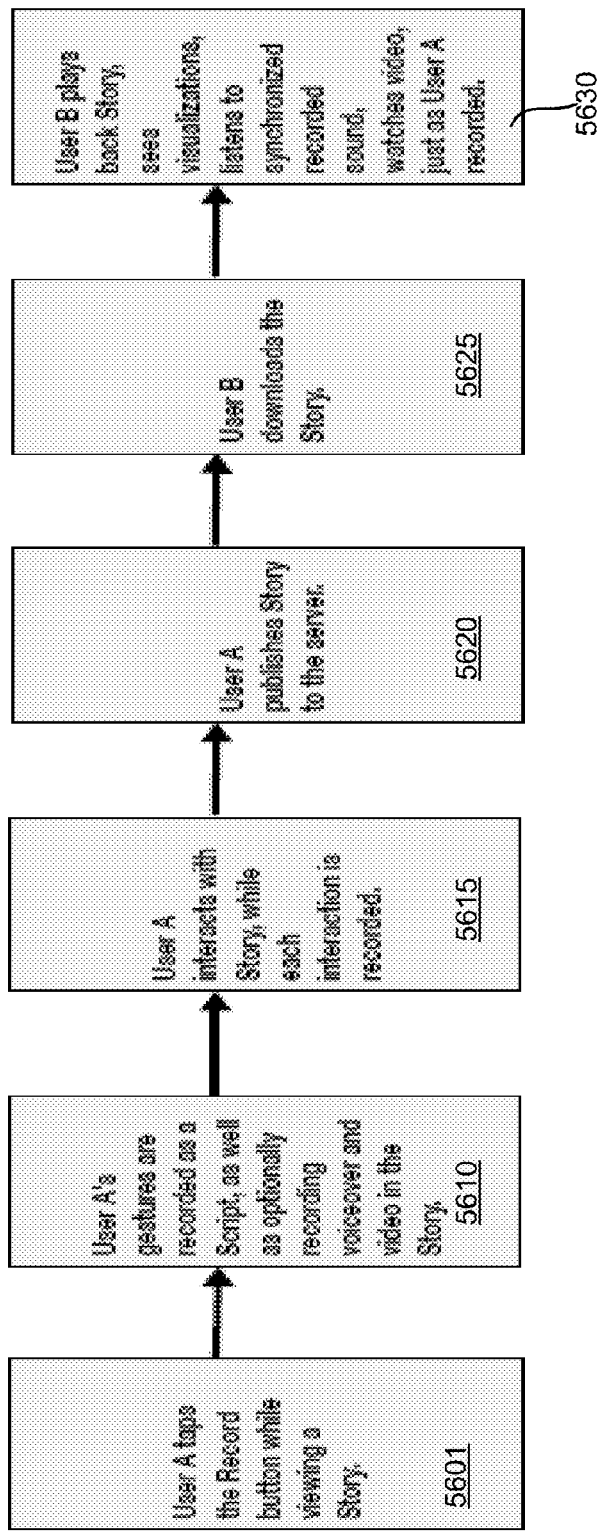
FIG. 56 shows a block flow diagram of an example of recording and playback of interactions with a story.

FIG. 56 shows a block flow diagram of recording and playback of interactions with a story. In the simplest form, the user selects a record button and interacts with the Perspective application. In this mode, the Perspective Application records every move that the user makes (e.g., the manipulation of scenes) as well as a corresponding voice track. The voice track and the "recorded script" are combined so that other users able to watch a performance by the original user. As a result, the Perspective application is a good platform in which to "talk to" when doing Podcasts, so that the Podcast listeners can tune into the appropriate story when they listen to the Podcast and watch the underlying data for the conversation.

A recording may or may not include the voice stream, or the voice stream may be recorded on another device and merged in later. A user can record a story performance (with interactions and voice) and post it to the cloud and have a viewer download the performance and then "watch" the performance. In addition, the user is able to pause and otherwise interact with the performance right from the user interface supplied by the Perspective Application. This is one alternative to emailing a story.

As shown in FIG. 56, a user "A" taps the record button while viewing a story with the Perspective application 5601. The Application records User A's gestures as a script, as well as optionally recording a voiceover and video into the story 5610. As User A interacts with Story, each interaction is recorded 5615. User A publishes the recorded story to the server provider system 5620. Once published, a story is given a URL by the system service provider on one of its servers, in the same manner a URL for a YouTube or Web page is provided. For example, the URL can reference a story that resides on a central server of the service provider or on another server (e.g., in an Enterprise installation at a business, a school, a government or other entity.) The URL may be private, public, or unlisted. User B downloads the recorded story 5625, and plays back the story and sees the visualizations, listens to synchronized recorded sound, watches video, just as User A recorded them 5630. When this URL is invoked (on the appropriate client device that has Perspective application installed) a browser automatically opens perspective. Perspective checks with the server to determine whether the user has the right permissions to load the story. If so, the Perspective application downloads the story content and the performance from the server.

Figure 57:
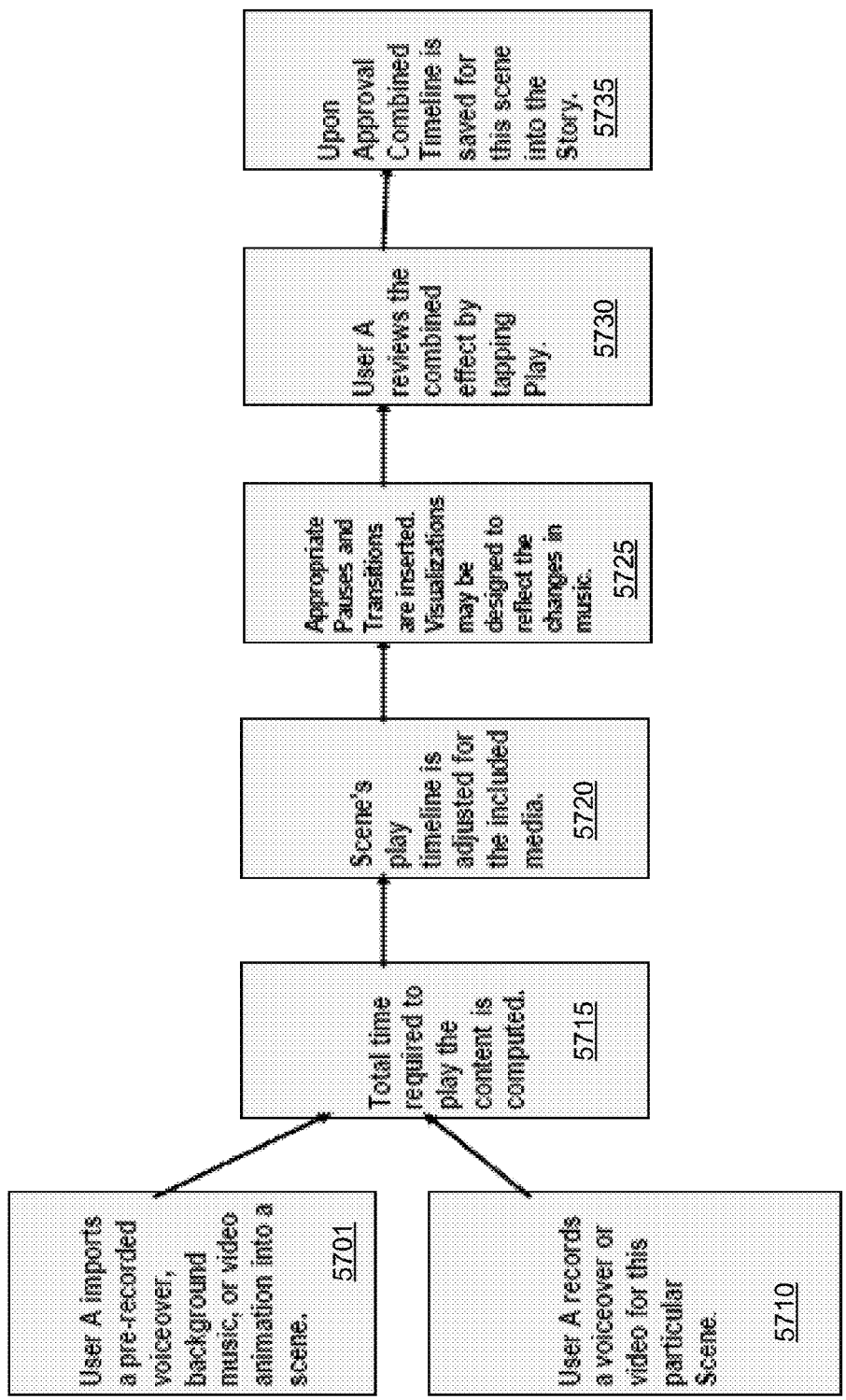
FIG. 57 shows a block flow diagram of an example of using voiceover and/or background music or video to adjust visualization.

FIG. 57 shows a block flow diagram of using voiceover and/or background music or video to adjust visualization. With convention animation, oftentimes animation scenes do not fit properly into the music requiring extensive and labor intensive manual editing. However, Perspective application inverts the relationship: data visualizations are slowed or sped up to match the requirements for voiceover and background music, thus removing much time from the editing of visual stories. As shown in FIG. 57, User A imports a pre-recorded voiceover, background music, or video animation into a scene 5701. The User A records a voiceover or video for this particular Scene 5710. The total time required to play the content is computed by the Application 5715. The scene's play timeline is adjusted for the included media 5720. Appropriate pauses and transitions are the inserted. Visualizations may be designed to reflect the changes in music 5725. User A can review the combined effect by tapping Play selection 5730. Upon approval, the combined timeline is saved for this scene into the story 5735.

Figure 58:
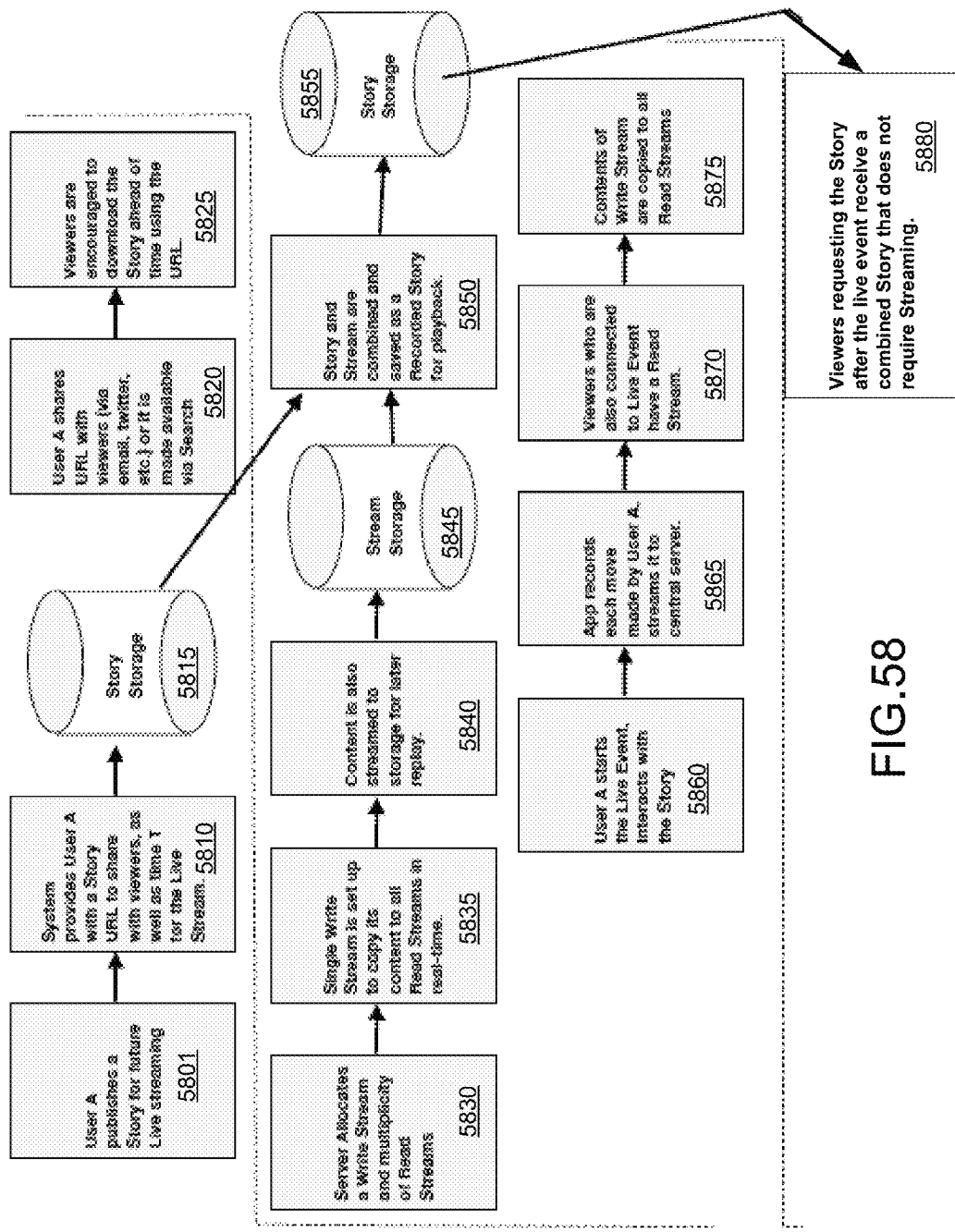
FIG. 58 shows a block flow diagram of an example of storycast-scalable story sharing-live.

FIG. 58 shows a block flow diagram of "air show" or story cast, a scalable story sharing-live. An extension of the Record & Playback allows streaming of the recording for one user (the Storyteller) as well as streaming of replaying of the visual story to an entire audience of watchers. Since most of the content is fixed as part of the story, the protocol is designed to be very efficient, as it only has to communicate the gestures made by the Storyteller, as such, it has need for very low bandwidth, and thus it can broadcast to a large group of people. The "live" session allows participants receive a copy of the story, as well as a stream that embodies the presenter's set of actions on the story. The underlying mechanism for the live communication may work with an intermediary server or peer-to-peer network using a message delivery platform. The messages arrive at the participants instance and are replayed as a live stream. The participant is watching live and is able to listen to the voice of the presenter (e.g., on some other channel, such as a phone). When present a live record, the presenter has an "invite URL" which is shared with one or more participants through a communication means (e.g., a text message, TWITTER, or email) and then one or more participants can "join" the live session. Participants may be late to a meeting, drop and get back on, etc. Unlike conventional online "live meetings", the Perspective application does not send screen pixels from one place to another. In marked contrast, everything is being re-interpreted at the destination and re-rendered from the story content, data, and the live-recorded actions. An extended version of this live sharing allows multiple presenters to be in the same session.

In addition, live or recorded performance may be implemented as a paid product. For example, every time someone wants to consume a performance or story they have to pay. At the time of registering, the presenter sets a price to either a recorded performance or live performance. Anyone who receive the URL for the story then has to pay to see the live or recorded performance.

As shown in FIG. 58, four levels: live event preparation, live event server, live event storyteller, and post event viewers. For live event preparation: A User A publishes a story for future live streaming 5801. The service provider system provides User A with a Story URL to share with viewers, as well as time T for the Live Stream 5810, and the story is stored 5815. User A then shares URL with viewers (via email, TWITTER, etc.) or the URL is made available via search engine or other publication 5820. Viewers are encouraged to download the story ahead of time using the URL 5825.

For the live event server, the server allocates a write stream and multiplicity of read streams 5830. A single write stream is set up to copy its content to all read streams in real-time 5835. Content is also streamed to storage for later replay 5840 and stored in as a stream storage 5845. The story and stream are combined and saved as a recorded story for playback 5850 and are stored in the story storage 5855.

For the live event storyteller, when User A starts the Live Event and interacts with the story 5860, the Perspective application records each move made by User A and streams it to a central server 5865. Viewers who are also connected to the Live Event have a read stream 5870. Contents of write stream are copied to all read streams 5875.

For the pose event viewers, viewers requesting the story after the live event receive a combined story that does not require streaming 5880. Storycasting is made efficient because most of the bulk of the communication happens prior to the live event. Only the live gestures by the user are required to be transferred live (as well as their voice or video).

Figure 59:
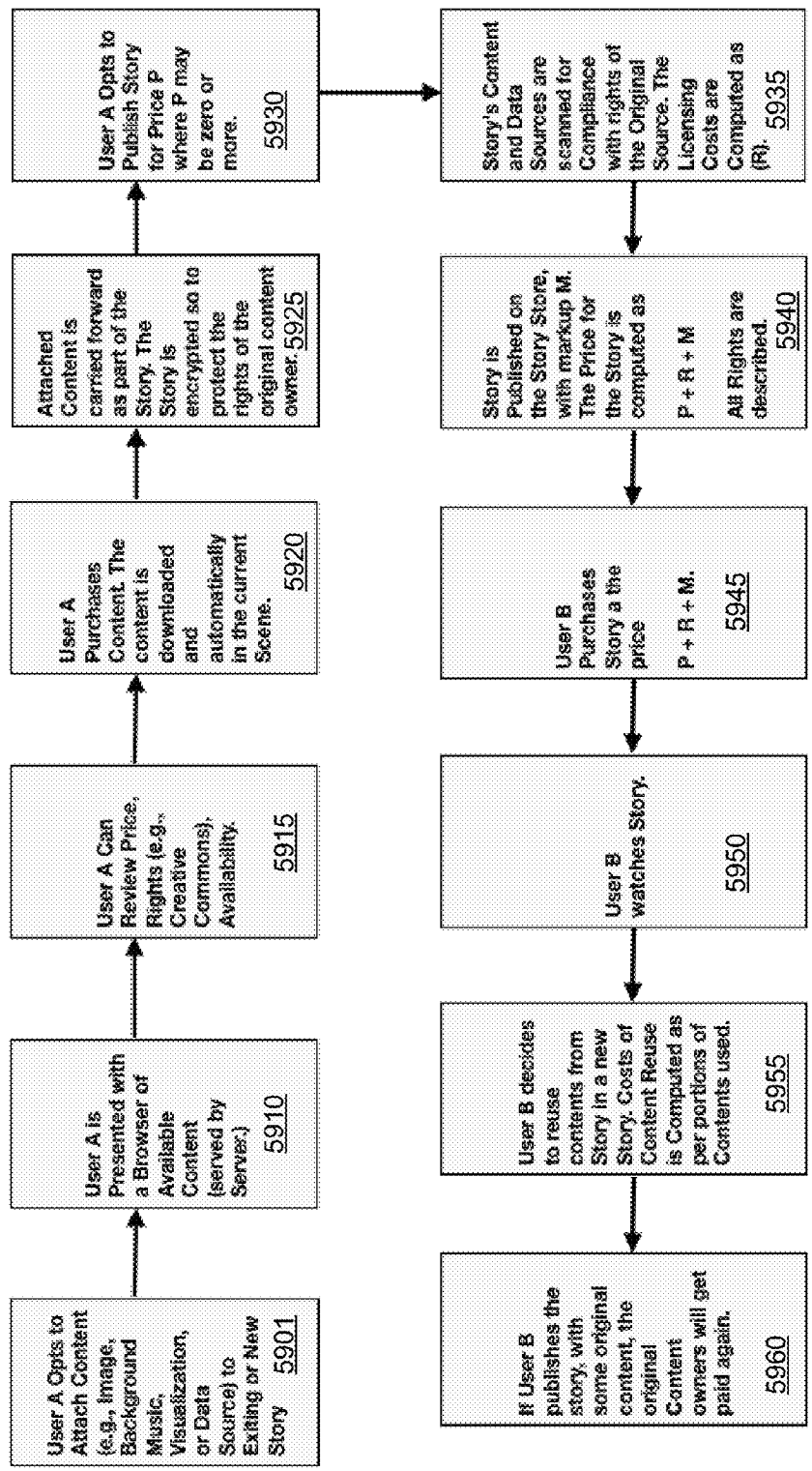
FIG. 59 shows a block flow diagram of an example of monetary system for sharing and reusing story content.

FIG. 59 shows a block flow diagram of monetary system for sharing and reusing story content. A monetary system is defined to allow content owners to continue to be paid for their original work. Proscribed derivative work is also possible to allow "mixins" by people who may take someone's story, add their own perspective or other content to the story, and republish the story. The stories are protected and encrypted so rights of the content and data owners are preserved. Content sharing policies such as Creative Commons are enforced by the Perspective application, as such unauthorized use or editing of the content is well protected.

As shown in FIG. 59, a User A opts to attach content (e.g., image, background music, visualization, or data source) to an existing or new story 5901. User A is presented with a browser of available content (served by server) 5910. User A can review price, rights (e.g., according to a creative commons), and availability 5915. User A purchases the content. The content is downloaded and automatically integrated in the current scene 5920. Attached content is carried forward as part of the story 5925. The story is encrypted to protect the rights of the original content owner. User A opts to publish story for price P where P may be zero or more 5930. The story's content and data sources are scanned for compliance with rights of the original source 5935. The licensing costs are computed as (R). The story is published on the story store, with a markup M 5940. The price for the story is computed as P+R+M. All rights are described. User B purchases the story for the price P+R+M 5945. User B watches story 5950. User B decides to reuse contents from story in a new story 5955. Costs of content reuse are computed as per portions of contents used. If User B publishes the story, with some original content, the original content owners are paid again 5960.

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claimed is:

1. A system for automating a performance derived from a raw dataset having related data elements, the system comprising:
   a communications interface;
   a storage device storing:
      an application including instructions; and
      a native dataset; and
   a processing device coupled to the communications interface and the storage device and operable to access the application stored by the storage device, and execute the instructions of the application, the instructions causing the processing device to:
      receive the raw dataset, including the related data elements, from the communications interface;
      access the raw data, the raw data having a format according to at least one schema that specifies relations between the related data elements;

digest the raw dataset without assuming any data schemas of the raw data set to create the native data set from the raw data set, the native data set including:
- multiple dimensions, where each data element of the raw data set is stored in one of the multiple dimensions of the native data set one or more times; and
- a relation across the multiple dimensions between the data elements of the native data set; and interpret the stored native data set according to a scene, wherein the scene specifies at least one pivot point for data elements having the same value within one of the multiple dimensions and interpreting includes:
- automatically grouping the data elements in the other multiple dimensions corresponding to the pivot point;
- automatically summarizing the data elements of the group in one or more of the other multiple dimensions; and
- mapping multiple dimensions of the native data set and their corresponding data elements including the summarized data elements to visual aspects of the scene;

receive an input from a user device in response to a user action to automatically vary the visual aspects of the scene by pivoting between dimensions of the native data set or data elements within a dimension of the native data set; and render visualizations of the mapped data elements as interpreted according to the scene as a visual performance on a display device, wherein the visual aspects of the rendered visualizations varied by the pivoting are perceived by a viewer of the visual performance as motion.

2. The system of claim 1, wherein the processing device is further operable to execute instructions causing the processing device to: interpret the stored native data set according to another scene providing a different pivot without changing the data elements of the native dataset or the relation between data elements of the native dataset.

3. The system of claim 1, wherein the visual aspects of the rendered visualizations are varied between a sequence of beats of a timeline of the scene.

4. The system of claim 1, wherein the processing device is further operable to execute instructions that cause the processing device to provide a user interface to generate the input and present the rendering of the visualizations in the performance.

5. The system of claim 4, wherein the user interface includes a tool to add multiple scenes for interpreting the native dataset to the performance to create a story.

6. The system of claim 4, wherein the processing device is further operable to execute instructions that cause the processing device to record user interaction with a performance of a scene and store the user interaction for replay with the scene during a future performance.

7. The system of claim 5, wherein the user interface includes a tool to publish the story to a server and share the story wherein the processing device is further operable to execute instructions that cause the processing device to provide the native dataset and the scenes of the story configured to interpret the native dataset to the server in response to an input to publish the story and transmit a link to access the publication of the story from the server in response to receiving an input to share the story.

8. The system of claim 6, wherein the user interface includes a tool to publish the story to a server and share the story wherein the processing device is further operable to execute instructions that cause the processing device to provide the native dataset, the scenes of the story configured to interpret the native dataset and the recorded user interaction, and a link to access the publication of the story from the server in response to receiving an input to share the story.

9. A computer implemented method for automating a performance derived from a raw dataset having related data elements, the method comprising:
- accessing, by a processing device, the raw dataset including the related data elements, the raw data having a format according to at least one schema that specifies relations between the related data elements;
- digesting, by a processing device, the raw dataset including the related data elements without assuming any data schemas of the raw data set to create the native data set from the raw data set, the native data set including:
  - multiple dimensions, where each data element of the raw data set is stored in one of the multiple dimensions of the native data set one or more times; and
  - a relation across the multiple dimensions between the data elements of the native data set;
- storing the native dataset; and
- interpreting, by a processing device, the stored native data set according to a scene, wherein the scene specifies at least one pivot point for data elements having the same value within one of the multiple dimensions and interpreting includes:
  - automatically grouping the data elements in the other multiple dimensions corresponding to the pivot point;
  - automatically summarizing the data elements of the group in one or more of the other multiple dimensions; and
  - mapping multiple dimensions of the native data set and their corresponding data elements including the summarized data elements to visual aspects of the scene;
- receiving an input from a user device in response to a user action to automatically vary the visual aspects of the scene by pivoting between dimensions of the native data set or data elements within a dimension of the native data set; and;
- rendering, by a processing device, visualizations of the mapped data elements as interpreted according to the scene as a visual performance on a display device, wherein the visual aspects of the rendered visualizations varied by the pivoting are perceived by a viewer of the visual performance as motion.

10. The method of claim 9 further comprising interpreting the stored native data set according to another scene providing a different pivot without changing the data elements of the native dataset or the relation between data elements of the native dataset.

11. The method of claim 9, wherein the visual aspects of the rendered visualizations are varied between a sequence of beats of a timeline of the scene.

12. The method of claim 9, further comprising providing a user interface to generate the input and present the rendering of the visualizations in the performance.

13. The method of claim 12, wherein providing a user interface includes providing a tool to add multiple scenes for interpreting the native dataset to the performance to create a story.

14. The method of claim 12, further comprising recording user interaction with a performance of a scene and storing the user interaction for replay with the scene during a future performance.

15. The method of claim 13, further comprising:
publishing the story to a server by providing the native dataset and the scenes of the story configured to interpret the native dataset to the server; and
providing a link to access the story from the server.

16. The method of claim 14, further comprising:
publishing the story to a server by providing the native dataset, the scenes of the story configured to interpret the native dataset, and the recorded user interaction to the server, and
providing a link to access the story from the server.

17. Software stored in a non-transitory storage device to automate a performance from a raw dataset having related data elements, the software including instructions configured to cause one or more processing devices to:
access the raw dataset including the related data elements, the raw data having a format according to at least one schema that specifies relations between the related data elements;
digesting the raw dataset including the related data elements without assuming any data schemas of the raw data set to create the native data set from the raw data set, the native data set including:
multiple dimensions, where each data element of the raw data set is stored in one of the multiple dimensions of the native data set one or more times; and
a relation across the multiple dimensions between the data elements of the native data set;
store the native dataset; and
interpret the stored native data set according to a scene, wherein the scene specifies at least one pivot point for data elements having the same value within one of the multiple dimensions and interpreting includes:
automatically grouping the data elements in the other multiple dimensions corresponding to the pivot point;
automatically summarizing the data elements of the group in one or more of the other multiple dimensions; and
mapping multiple dimensions of the native data set and their corresponding data elements including the summarized data elements to visual aspects of the scene;
receive an input from a user device in response to a user action to automatically vary the visual aspects of the scene by pivoting between dimensions of the native data set or data elements within a dimension of the native data set; and
render visualizations of the mapped data elements as interpreted according to the scene as a visual performance on a display device, wherein the visual aspects of the rendered visualizations varied by the pivoting are perceived by a viewer of the visual performance as motion.

18. The software of claim 17 further comprising instructions configured to cause one or more processing devices to interpret the stored native data set according to another scene providing a different pivot without changing the data elements of the native dataset or the relation between data elements of the native dataset.

19. The software of claim 18, wherein the visual aspects of the rendered visualizations are varied between a sequence of beats of a timeline of the scene.

20. The software of claim 17, further comprising instructions configured to cause one or more processing devices to:
provide a user interface to generate the input and present the rendering of the visualizations in the performance.

21. The software of claim 20, further comprising instructions configured to cause one or more processing devices to:
provide a tool for the interface to add multiple scenes for interpreting the native dataset to the performance to create a story.

22. The software of claim 20, further comprising instructions configured to cause one or more processing devices to:
record user interaction with a performance of a scene and store the user interaction for replay with the scene during a future performance.

23. The software of claim 21, further comprising instructions configured to cause one or more processing devices to:
publish the story to a server by providing the native dataset and the scenes of the story configured to interpret the native dataset to the server; and
provide a link to access the story from the server.

24. The software of claim 22, further comprising instructions configured to cause one or more processing devices to:
publish the story to a server by providing the native dataset, the scenes of the story configured to interpret the native dataset, and the recorded user interaction to the server; and
provide a link to access the story from the server.

* * * * *